US005986042A

United States Patent [19]

Irizato et al.

[11] Patent Number: 5,986,042

[45] Date of Patent: Nov. 16, 1999

[54] CROSS-LINKED POLYMER

[75] Inventors: Yoshihiro Irizato; Makoto Sukegawa, both of Kanagawa; Toshio Katoh, Saitama; Hiroaki Tamatani, Kanagawa, all of Japan

[73] Assignee: Mitsui Chemicals, Inc., Japan

[21] Appl. No.: 09/014,421

[22] Filed: Jan. 27, 1998

[30] Foreign Application Priority Data

| | | | |
|---|---|---|---|
| Jan. 30, 1997 | [JP] | Japan | 9-016991 |
| Apr. 24, 1997 | [JP] | Japan | 9-107772 |
| Apr. 24, 1997 | [JP] | Japan | 9-107773 |

[51] Int. Cl.[6] .......... C08G 69/10

[52] U.S. Cl. .......... 528/328; 528/322; 528/332; 528/363; 528/480; 528/492

[58] Field of Search .......... 528/328, 322, 528/332, 363, 480, 492

[56] References Cited

U.S. PATENT DOCUMENTS

| | | | |
|---|---|---|---|
| 4,389,513 | 6/1983 | Miyazaki | 525/186 |
| 5,461,085 | 10/1995 | Nagatomo et al. | 521/183 |

FOREIGN PATENT DOCUMENTS

| | | |
|---|---|---|
| 0683177 | 11/1995 | European Pat. Off. . |

*Primary Examiner*—Duc Truong

*Attorney, Agent, or Firm*—Burns, Doane, Swecker & Mathis, L.L.P.

[57] ABSTRACT

A cross-linked polymer containing, in its molecule, recurring units represented by the following formula (1), and having biodegradability and high water-absorbency:

(1)

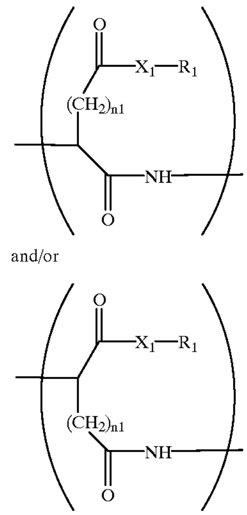

wherein $R_1$ is a pendant group having at least one functional group selected from the group consisting of acidic groups and salts thereof, a glycino group and salts thereof, cationic groups and betaine groups; $X_1$ is NH, $NR_1'$, $R_1'$ being an alkyl, aralkyl or aryl group, O or S; and $n_1$ is 1 or 2.

12 Claims, No Drawings

CROSS-LINKED POLYMER

This application claims priority under 35 U.S.C. §§119 and/or 365 to 016991/1997, 107772/1997 and 107773/1997 filed in Japan on Jan. 30, 1997, Apr. 24, 1997 and Apr. 24, 1997, respectively; the entire content of which is hereby incorporated by reference.

BACKGROUND OF THE INVENTION

1. Field of the Invention

This invention relates to a novel cross-linked polymer having biodegradability. More specifically, the present invention is concerned with a cross-linked, acidic polyamino acid polymer having biodegradability and high water-absorbency. Specifically, this invention pertains to a polymer, which is compatible with the global environment in terms of its biodegradation after its use as a water absorbent in disposable diapers, agricultural or horticultural applications or the like or after its disposal.

2. Description of the Related Art

[Technical Background of Superabsorbent Polymers]

A superabsorbent polymer is a resin capable of absorbing water from several tens of times to several thousands of times as much its own weight, and is used in sanitary products, such as sanitary napkins and disposable diapers, and also in a variety of other fields.

[Related Art on Superabsorbent Polymers]

Known examples of superabsorbent polymers employed in such applications include partial neutralization products of cross-linked polyacrylic acids (JP Kokai No. 55-84304, U.S. Pat. No. 4,625,001), partial hydrolysis products of starch-acrylonitrile copolymers (JP Kokai 46-43995), starch-acrylic acid graft copolymers (JP Kokai 51-125468), hydrolyzation products of vinyl acetate-acrylate ester copolymers (JP Kokai 52-14689), cross-linked copolymers of 2-acrylamido-2-methylpropanesulfonic acid and acrylic acid (EP 0068189), cross-linked polymers of cationic monomers (U.S. Pat. No. 4,906,717), and hydrolysis products of cross-linked isobutylene-maleic anhydride copolymers (U.S. Pat. No. 4,389,513).

These superabsorbent polymers however are accompanied by the problem that they do not degrade following disposal after use.

Under the circumstances, these superabsorbent polymers are currently disposed of by incineration or reclamation. However, it is indicated that disposal in incinerators is a cause of global warming and acid rain in addition to a cause of damage to incinerator materials due to heat occurring during incineration. On the other hand, reclamation disposal is accompanied by problems such as poor stabilization of reclaimed grounds due to the bulky and undegradable nature of plastics and, moreover, is facing a serious problem in that there are no longer many sites suited for reclamation.

Described specifically, these polymers are poor in degradability and remain semipermanently in water or soil. Their disposal presents a very serious problem from the viewpoint of environmental preservation. For example, in the case of polymers for disposable applications, led by sanitary products such as disposable diapers and sanitary napkins, their recycling, if tried, would require substantial expenditure while their incineration, if attempted, would significantly affect the global environment due to the enormous quantities involved. On the other hand, it has been reported that use of a cross-linked polyacrylic acid resin as an agricultural and horticultural water-holding material leads to the formation of complexes with multivalent ions such as $Ca^{2+}$ in soil and hence results in the formation of an insoluble layer [Matsumoto et al., KOBUNSHI (High Polymer, Japan), 42, August, 1993]. Such a layer is considered to have low toxicity by itself but is not found at all in the natural world. Nothing is known about their influence on the ecosystem resulting from an accumulation of such polymers in soil over a long period and therefore, a thorough investigation is needed. A cautious attitude towards their use is hence desirable. Likewise, non-ionic resins have a potential problem of accumulating in soil due to their undegradable nature although they do not form complexes. It is therefore likely that they would have adverse effects on the natural world.

Furthermore, these polymerized resins use monomers which are highly toxic to human skin and the like. A great deal of work has been conducted to eliminate such monomers from polymerized products. Nonetheless, their complete elimination is difficult. Still higher difficulties are expected especially in the production on an industrial scale.

[Technical Background of Superabsorbent Polymers Having Biodegradability]

On the other hand, biodegradable polymers have been attracting interest as "globe-compatible materials" in recent years. Their use as super-absorbent polymers has also been proposed.

Known examples of biodegradable superabsorbent polymers employed in such applications include cross-linked polyethylene oxide (JP Kokai 6-157795, etc.), cross-linked polyvinyl alcohol, cross-linked carboxy-methylcellulose (U.S. Pat. No. 4,650,716), cross-linked alginic acid, cross-linked starches, and cross-linked polyamino acids. Among these, the cross-linked polyethylene oxide and cross-linked polyvinyl alcohol have small water absorption and are hence not particularly suited for use as materials in products requiring high water-absorbency such as sanitary products, disposable diapers, disposable dustcloths and paper towels.

Further, these compounds can be biodegraded only by certain particular bacteria, so that under general conditions, their biodegradation will be slow or will not take place at all. Moreover, the biodegradability will be reduced extremely as the molecular weight becomes greater.

In addition, cross-linked saccharides such as cross-linked carboxymethylcellulose, cross-linked alginic acid and cross-linked starches contain many firm hydrogen bonds in their molecules, thereby exhibiting strong interaction between molecules and/or polymers. Accordingly, molecular chains cannot be opened widely meaning that their water-absorbency is not high.

[Technical Background of Polyamino Acid Super-absorbent Polymers]

On the other hand, polymers which are available by cross-linking polyamino acids do have biodegradability and are thus compatible with the global environment. It has also been found that, even when absorbed in the body, they are digested and absorbed by enzymatic action and moreover, they do not exhibit antigenecity in the body and their metabolites are free of toxicity. These polymers are accordingly materials which are also safe for human beings.

As a disclosed example of such a polymer, a process for the production of a polymer having high water-absorbency, which comprises irradiating γ rays to poly-γ-glutamic acid, was reported by Kunioka et al. in KOBUNSHI RONBUNSHU (The Journal of the Society of Polymer Science, Japan), 50(10), 755 (1993). From an industrial viewpoint, however, a $^{60}Co$ irradiation system for use in this technology requires considerable equipment for shielding radiation, and sufficient care is also required for its control. This technology is therefore not practical. As a further problem, the high cost of polyglutamic acid as the starting substance can also be mentioned.

In addition, processes for obtaining a hydrogel by cross-linking an acidic amino acid were reported by Akamatsu et al. in U.S. Pat. No. 3,948,863 (corres. JP Kokoku 52-41309) and Iwatsuki et al. in JP Kokai 5-279416. Further, use of cross-linked amino acid polymers as superabsorbent polymers was reported by Sikes et al. in JP PCT Kokai 6-506244 (corres. U.S. Pat. No. 5,247,068 and U.S. Pat. No. 5,284,936), Suzuki et al. in JP Kokai 7-309943 and Harada et al. in JP Kokai 8-59820.

In all the above reports, however, the polymers did not have sufficient water absorbency and were not practically usable.

In the meantime, the present inventors invented superabsorbent polymers having high saline-absorbency as disclosed in JP Kokai 7-224163.

However, a high demand has remained for superabsorbent polymers having high saline-absorbency and excellent water-absorbency, resulting in an outstanding demand for polymers of still higher performance.

SUMMARY OF THE INVENTION

An object of the present invention is therefore to solve such conventional problems as described above and to provide a cross-linked polymer having biodegradability and high water-absorbency.

The above-described object can be achieved by a cross-linked polymer having, in a molecule thereof, recurring units represented by the following formula (1):

(1)

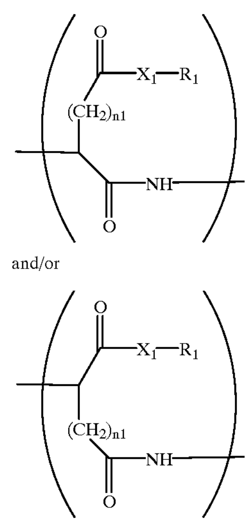

wherein $R_1$ is a pendant group having at least one functional group selected from the group consisting of acidic groups and salts thereof, a glycino group and salts thereof, cationic groups and betaine groups; $X_1$ is NH, $NR_1'$, $R_1'$ being an alkyl, aralkyl or aryl group, O or S; and $n_1$ is 1 or 2.

The cross-linked polymer according to the present invention, which has the above-described structure, is compatible with the global environment owing to its degradation after its use as a water absorbent in disposable diapers, agricultural or horticultural applications or the like or after its disposal, and is therefore very useful as a superabsorbent polymer excellent in water-absorbency.

DETAILED DESCRIPTION OF THE INVENTION AND PREFERRED EMBODIMENTS

The polymer according to the present invention is an acidic polyamic acid or a copolymer thereof. A description will hereinafter be made centering around polyaspartic acid polymers having higher utility as superabsorbent polymers, although the acidic polyamic acid can be polyglutamic acid or polyaspartic acid.

(1) Structure of the Polymer

Roughly dividing, the polymer according to the present invention is structurally composed of a basic polymer skeleton, side chain portions and cross-linking portions. These three constituents will hereinafter be described separately.

(1-1) Basic Polymer Skeleton of the Polymer

As the basic polymer skeleton of the polymer according to the present invention is an acidic polyamino acid such as polyglutamic acid or polyaspartic acid, a backbone is formed of glutamic acid or aspartic acid as recurring units.

These recurring units may also contain one or more other amino acids as additional recurring units. Specific examples of other amino acid components can include amino acids and amino acid derivatives—such as 20 types of indispensable amino acids, L-ornithine, a series of α-amino acids, β-alanine, γ-aminobutyric acid, neutral amino acids, acidic amino acids, ω-esters of acidic amino acids, basic amino acids, N-substituted derivatives of basic amino acids, aspartic acid-L-phenylalanine diner (aspartame); and aminosulfonic acids such as L-cysteic acid. Each α-amino acid may be in the form of either an optically active substance (L-form or D-form) or a racemic modification. Further, the polymer may be a copolymer containing recurring units other than an amino acid.

Illustrative of the recurring units of the copolymer can be dehydrating condensation products of aminocarboxylic acids, aminosulfonic acids, aminophosphonic acids, hydroxycarboxylic acids, mercaptocarboxylic acids, mercaptosulfonic acids, mercaptophosphonic acids, and the like. Also included can be hydrating condensation products, addition products and substituted derivatives of polyamines, polyhydric alcohols, polythiols, polycarboxylic acids, polysulfonic acids, polyphosphoric acids, polyhydrazine compounds, polycarbamoyl compounds, polysulfonamide compounds, polyphosphonamide compounds, polyepoxy compounds, polyisocyanate compounds, polythioisocyanate compounds, polyaziridine compounds, polycarbamate compounds, polycarbamic acid compounds, polyoxazoline compounds, compounds containing multivalent reactive unsaturated bonds, multivalent metals, and the like.

In the case of a copolymer, it can be either a block copolymer or a random copolymer. The copolymer can also be a graft copolymer.

Among these, use of polyaspartic acid or polyglutamic acid, which has high water-absorbency, as a basic skeleton is preferable, with polyaspartic acid homopolymer being particularly preferred for its appropriateness for industrial production.

A description will next be made about the basic polymer skeleton of the polymer according to the present invention. In the case of polyaspartic acid, amide bonds in its backbone can be either α-bonds or β-bonds. In the case of polyglutamic acid, on the other hand, amide bonds in its backbone can be either α-bonds or γ-bonds.

Namely, in the case of polyaspartic acid or a copolymer thereof, an α-bond is formed when an amino group or the like in aspartic acid or a monomer of the copolymer is bonded with the α-carboxyl group of aspartic acid, whereas a β-bond is formed when the amino group or the like is bonded with the β-carboxyl group of the aspartic acid. In the case of polyglutamic acid or a copolymer thereof, an α-bond is formed when an amino group or the like in glutamic acid or a monomer of the copolymer is bonded with the $\alpha$-carboxyl group of glutamic acid, whereas a $\gamma$-bond is formed when the amino group or the like is bonded with the $\gamma$-carboxyl group of the aspartic acid.

Such $\alpha$-bonds and $\beta$-bonds are generally found together in polyaspartic acid, and so are such $\alpha$-bonds and $\gamma$-bonds in polyglutamic acid. No particular limitation is imposed on the manner of bonding.

Side chain groups and cross-linking groups in the present invention are basically carboxylic acid derivatives formed as a result of substitution of carboxyl groups in acidic polyamino acids. A description will hereinafter be made about their details.

In the present invention, regardless of bond-style, the parts of monomer units formed from aspartic acid in the polymer are called "polyaspartic acid residual groups", the parts of monomer units formed from glutamic acid are called "polyglutamic acid residual groups", and they are called "acidic polyamino acid residual groups" as a general term for them.

(1-2) Side Chain Structure of the Polymer

The polymer according to the present invention contains, as indicated by the formula (1), specific recurring units of an acidic polyamino residual group with its carboxylic acid derived further.

The side chain of the polymer according to the present invention has a structure formed by derivation of the carboxyl groups in the acidic polyamino acid residual groups as a backbone.

In the present invention, each polymer side chain other than a moiety through which the polymer side chain is bonded to the polymer backbone [i.e., $R_1$ in the formula (1)] will be called a "pendant group". The polymer according to this invention features that the pendant group ($R_1$) has at least one functional group selected from the group consisting of acidic groups and salts thereof, a glycino group and salts thereof, cationic groups and betaine groups. In the present invention, the functional groups selected from the group consisting of acidic groups and salts thereof, a glycino group and salts thereof, cationic groups and betaine groups are called "specific functional groups".

In the polymer of the present invention, the recurring units represented by the formula (1) may preferably account, in number, for 1 to 99.8% of entire recurring units which make up the molecule, with 10 to 99.8% being more preferred.

In the polymer of this invention, each pendant group ($R_1$) is bonded with a carbonyl group of the polymer backbone via N, O or S ($X_1$). In other words, an amide, ester or thioester bond is formed. Relative to each amide bond in the backbone of the polymer according to this invention, its associated side chain group may be substituted at an $\alpha$-position or a $\gamma$-position in the case of an aspartic acid residual group or at an $\alpha$-position or a $\gamma$-position in the case of a glutamic acid residual group.

Each pendant group in the polymer of the present invention contains the above-mentioned specific functional group. The pendant group other than the functional group is mostly composed of carbon and hydrogen and, accordingly, will be called a "hydrocarbon group" for the sake of convenience in the present invention.

No particular limitation is imposed on the hydrocarbon group, but its illustrative examples can include inter alia alkyl, aralkyl, alkyloxy, phenyl and naphthyl groups. They may have linear or branched structures or even cyclic structures.

In the hydrocarbon group, a part of its carbon atoms may each be replaced by one or more substituent groups containing O, N, S, P, B, Si and/or the like. Namely, in the case of a cyclic structure, a part of its carbon atoms may be replaced by O, N, S, P, B, Si and/or the like, or may be replaced by substituent groups with O, N, S, P, B. Si or the like introduced therein, such as ether groups, ester groups, carbonyl groups, urea groups, thioester groups, thiocarbonyl groups, sulfone groups, sulfonyl groups, sulfonamide groups, secondary amino groups, tertiary amino groups, amide groups, phosphone groups or phosphonamide groups.

No particular limitation is imposed on the position of substitution by the specific functional group in the hydrocarbon group. The following examples are illustrative of the hydrocarbon group in the pendant group. Each pendant group in the present invention has a structure that a hydrogen atom of such a hydrocarbon group has been substituted by the specific functional group.

Alkyl groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl; cycloalkyl groups such as cyclopropyl, cyclobutyl, cyclopentyl, cyclohexyl, cycloheptyl, and cyclooctyl; aralkyl groups such as benzyl, phenylethyl, phenylpropyl, and phenylbutyl; phenyl groups such as phenyl, tolyl, xylyl, chlorophenyl, and biphenyl; aryl groups such as naphthyl and methylnaphthyl; aryloxyalkyl groups such as methoxyethyl, ethoxyethyl, propoxyethyl, butoxyethyl, pentyloxyethyl, hexyloxyethyl, heptyloxyethyl, octyloxyethyl, decyloxyethyl, undecyloxyethyl, dodecyloxyethyl, tridecyloxyethyl, tetradecyloxyethyl, pentadecyloxyethyl, hexadecyloxyethyl, heptyldecyloxyethyl, and octyldecyloxyethyl; polyoxyalkylene groups such as polyoxyethylene and polyoxypropylene; aryloxyalkyl groups such as phenoxyethyl; aralykyloxayalkyl groups such as benzyloxyethyl and tolyloxyethyl; alkylthioalkyl groups such as methylthioethyl, ethylthioethyl, propylthioethyl, butylthioethyl, pentylthioethyl, hexylthioethyl, heptylthioethyl, octylthioethyl, nonylthioethyl, decylthioethyl, undecylthioethyl, dodecylthioethyl, tridecylthioethyl, tetradecylthioethyl, pentadecylthioethyl, hexadecylthioethyl, heptyldecylthioethyl, and octyldecylthioethyl; polythioalkylene groups such as polythioethylene and polythiopropylene; arylthioalkyl groups such as phenylthioethyl and tolylthioethyl; aralkylthioalkyl groups such as benzylthioethyl; alkylaminoalkyl groups such as methylaminoethyl, ethylaminoethyl, propylaminoethyl, butylaminoethyl, pentylaminoethyl, hexylaminoethyl, heptylaminoethyl, octylaminoethyl, nonylaminoethyl, decylaminoethyl, undecylaminoethyl, dodecylaminoethyl, tridecylaminoethyl, tetradecylaminoethyl, pentadecylaminoethyl, hexadecylaminoethyl, heptyldecylaminoethyl, and octyldecylaminoethyl; dialkylaminoalkyl groups such as dimethylaminoethyl, diethylaminoethyl, dipropylaminoethyl, dibutylaminoethyl, dipentylaminoethyl, dihexylaminoethyl, diheptylaminoethyl, dioctylaminoethyl, dinonylaminoethyl, didecylaminoethyl, diundecylaminoethyl, didodecylaminoethyl, ditridecylaminoethyl, ditetradecylaminoethyl, dipentadecylaminoethyl, dihexadecylaminoethyl, diheptyldecylaminoethyl, dioctyldecylaminoethyl, ethylmethylamioethyl, and methylpropylaminoethyl; trialkylammonium groups such as trimethylammonio, triethylammonio, tripropylammonio, tributylammonio, tripentylammonio, dimethylethylammonio, dimethylbenzylammonio, and methyldibenzylammonio; alkyloxycarbonylalkyl groups such as methyloxycarbonylethyl, ethyloxycarbonylethyl, propyloxycarbonylethyl, butyloxycarbonylethyl, pentyloxycarbonylethyl, hexyloxycarbonylethyl, heptyloxycarbonylethyl, octyloxycarbonylethyl, nonyloxycarbonylethyl, decyloxycarbonylethyl, undecyloxycarbonylethyl, dodecyloxycarbonylethyl, tridecyloxycarbonylethyl, tetradecyloxycarbonylethyl, pentadecyloxycarbonylethyl, hexadecyloxycarbonylethyl, heptyldecyloxycarbonylethyl, and octyldecyloxycarbonylethyl; and alkylcarbonyloxyalkyl groups such as methylcarbonyloxyethyl, ethylcarbonyloxyethyle propylcarbonyloxyethyl, butylcarbonyloxyethyl, pentylcarbonyloxyethyl, hexyl carbonyloxyethyl, heptylcarbonyloxyethyl, octylcarbonyloxyethyl, nonylcarbonyloxyethyl, decylcarbonyloxyethyl, undecylcarbonyloxyethyl, dodecylcarbonyloxyethyl, tridecylcarbonyloxyethyl, tetradecylcarbonyloxyethyl, pentadecylcarbonyloxyethyl, tetradecylcarbonyloxyethyl, pentadecylcarbonyloxyethyl, hexadecylcarbonyloxyethyl, heptyldecylcarbonyloxyethyl, and octyldecylcarbonyloxyethyl.

In addition, the following specific examples can also be mentioned:

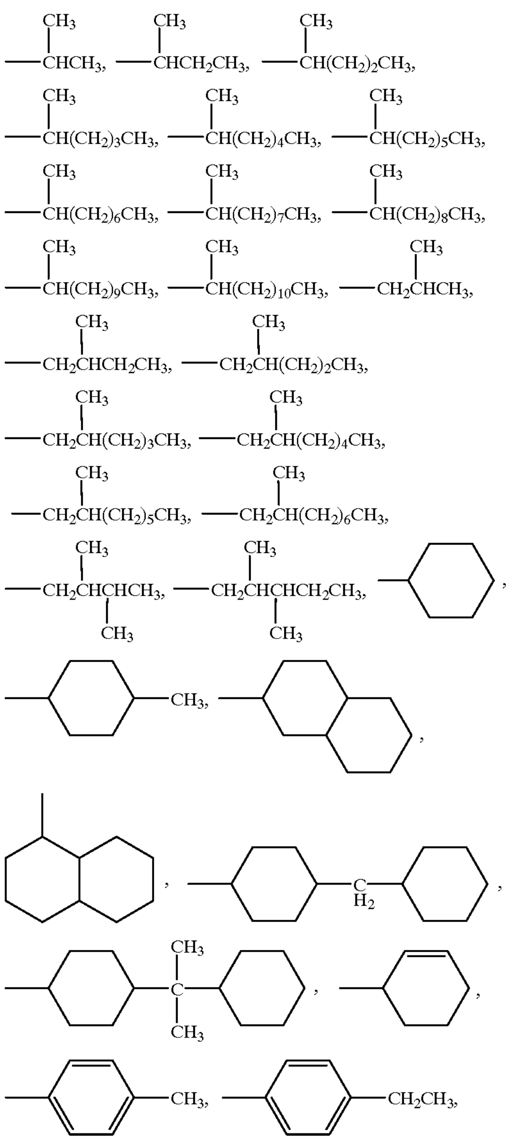

-continued

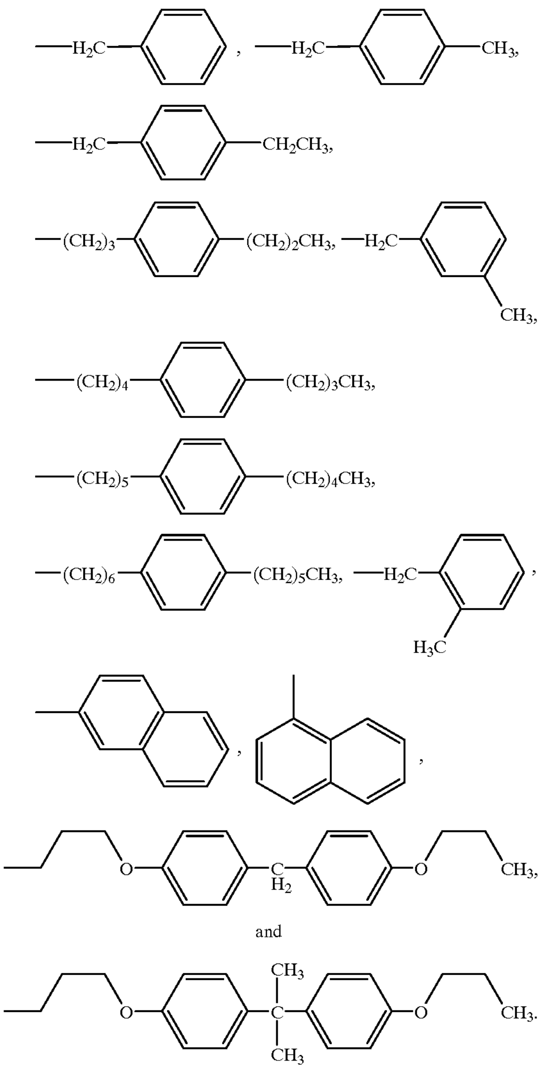

The above-mentioned hydrocarbon groups may further contain one or more substituent groups in addition to the specific functional group. Illustrative examples of the substituent groups can include linear or branched alkyl groups having 1–18 carbon atoms, cycloalkyl groups having 3–8 carbon atoms, aralkyl groups, substituted or unsubstituted phenyl groups, substituted or unsubstituted naphthyl groups, linear or branched alkoxy groups having 1–18 carbon atoms, aralkyloxy groups, phenylthio groups, linear or branched alkylthio groups having 1–18 carbon atoms, linear or branched alkylamino groups having 1–18 carbon atoms, dialkylamino groups in which each alkyl group is either linear or branched and has 1–18 carbon atoms, trialkylammonio groups in which each alkyl group is either linear or branched and has 1–18 carbon atoms, hydroxyl group, amino group, mercapto group, alkoxycarbonyl groups, and alkylcarbonyloxy groups.

A description will next be made about the specific functional group (an acidic group or a salt thereof, a glycino group or a salt thereof, a cationic group, or a betaine group) contained in each pendant group.

Illustrative of the acidic group contained in each pendant group of the polymer according to the present invention are carboxyl, sulfonic, thiocarboxylic, dithiocarboxylic, thiocarbonic, phosphoric, phosphonic, phosphinic, sulfuric, sulfurous, sulfinic, amidosulfuric, sulfamic, and boric groups. These acidic groups may be in the form of salts. Carboxyl, sulfonic, phosphonic, sulfamic, thiocarboxylic, dithiocarboxylic and phosphoric groups are particularly preferred.

Illustrative counter ions for such acidic groups can include, but are not limited to, alkali metal salts such as sodium, potassium, and lithium; ammonium salts such as ammonium, tetramethylammonium, tetraethylammonium, tetrapropylammonium, tetrabutylammonium, tetrapentylammonium, tetrahexylammonium, ethyltrimethylammonium, trimethylproylammonium, butyltrimethylammonium, pentyltrimethylammoniuma, hexyltrimethylammonium, cyclohexyltrimethylammonium, benzyltrimethylammonium, triethylpropylammonium, triethylbutylammonium, triethylpentylammonium, triethylhexylammonium, cyclohexyltriethylammonium, and benzyltriethylammonium; and amine salts such as trimethylamine, triethylamine, tripropylamine, tributylamine, tripentylamine,trihexylamine, triethanolamine, tripropanolamine, tributanolamine, tripentanolamine, trihexanolamine, dimethylamine, diethylamine, dipropylamine, dibutylamine, dipentylamine, dihexylamine, dicyclohexylamine, dibenzylamine, ethylmethylamine, methylpropylamine, butylmethylamine, methylpentylamine, methylhexylamine, methylamine, ethylamine, propylamine, butylamine, pentylamine, hexylamine, octylamine, decylamine, dodecylamine, and hexadecylamine.

Among these counter ions, those having smaller molecular weights are preferable because, as the molecular weight of a counter ion increases, the molecular weight per monomer unit relatively becomes greater and the water absorption per unit weight relatively becomes smaller. Where there is possibility of being brought into contact with human skin or the like, those having lower toxicity are desirable, meaning that alkali metal salts, such as sodium, potassium and lithium, and ammonium are preferred.

A glycino group, which may be contained in each pendant group of the polymer according to the present invention, is a group which contains a carboxyl group and an amino group at an end thereof. Specifically, the glycino group can be in the form of a glycino group as a tautomer represented by the following formula (2) or in the form of a salt thereof.

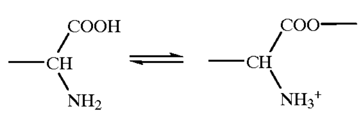

Glycino group

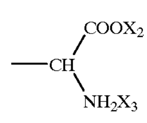

(2)

Salt of glycino group wherein $X_2$ is a hydrogen, alkali metal, ammonium, phosphonium or sulfonium; $X_3$ is hydrogen or a protonic acid; and $X_2$ or $X_3$ may optionally be omitted.

No particular limitation is imposed on the form of the carboxyl group in the glycino group. Described specifically, the carboxyl group may be in the form of a counter ion (betaine) associated with the amino group in the glycino group or in the form of a free carboxyl group or a carboxylic acid salt. Of these, either a counter ion (betaine) associated with the amino group in the glycino group or a free carboxyl group is preferred. Illustrative of a salt-forming counter ion in the carboxylic acid salt can be counter ions similar to those exemplified above as counter ions for acidic groups.

Likewise, no particular limitation is imposed on the form of the amino group in the glycino group. Described specifically, the amino group may be in the form of a counter ion (betaine) associated with the carboxyl group in the glycino group, a free amino group or an ammonium salt. Of these, either a counter ion (betaine) associated with the carboxyl group in the glycino group or a free amino group is preferred.

Specific examples of the salt-forming counter ion in the ammonium salt can include inorganic anions, for example, halogen ions such as chlorine, bromine and iodine ions, and mineral acid ions such as sulfuric, sulfurous, nitric, nitrous and phosphoric ions; and organic anions, for example, carboxylic ions such as formic, acetic, propionic and benzoic ions, sulfonic ions such as methanesulfonic, trifluoromethanesulfonic, benzenesulfonic and toluenesulfonic ions, and phosphonic ions such as benzenephosphonic ion. Among these salt-forming counter ions, those having smaller molecular weights are preferable because, as the molecular weight of a counter ion increases, the molecular weight per monomer unit relatively becomes greater and the water absorption per unit weight relatively becomes smaller. Where there is possibility of being brought into contact with human skin or the like, those having lower toxicity are desirable, meaning that ions such as chlorine, bromine, sulfuric and phosphoric ions are preferred. Of these, a chlorine ion is particularly preferred.

Illustrative of a cationic group, which may be contained in each pendant group of the polymer according to the present invention, can be ammonium, oxonium, sulfonium, phosphonium, selenonium, chloronium, bromonium, and iodonium. From the standpoint of the stability, safety and production of the compound, an ammonium is preferred.

No particular limitation is imposed on the ammonium, but a quaternary ammonium is particularly preferred. Specific examples of the quaternary ammonium will be described below, in which the specific examples will be indicated as substituent groups.

Trimethylammonio, triethylammonio, tripropylammonio, tributylammonio, tripentylammonio, trihexylammonio, triheptylammonio, trioctylammonio, trinonylammonio, tridecylammonio, triundecylammonio, tridodecylammonio, tritetradecylammonio, tripentadecylammonio, trihexadecylammonio, triheptyldecylammonio, trioctyldecylammonio, dimethylethylammonio, dimethylcyclohexylammonio, dimethylbenzylammonio, methyldibenzylammonio, dimethyl (methyloxycarbonylmethyl)ammonio, dimethyl (ethyloxycarbonylmethyl)ammonio, dimethyl (propyloxycarbonylmethyl)ammonio, dimethyl (butyloxycarbonylmethyl)ammonio, dimethyl (pentyloxycarbonylmethyl)ammonio, dimethyl (hexyloxycarbonylmethyl)ammonio, dimethyl (octyloxycarbonylmethyl)ammonio, dimethyl (phenyloxycarbonylmethyl)ammonio, dimethyl (benzyloxycarbonylmethyl)ammonio, dimethyl (cyclohexyloxycarbonylmethyl)ammonio, dimethyl (naphthyloxycarbonylmethyl)ammonio, methyl-bis (methyloxycarbonylmethyl)ammonio, tris (methyloxycarbonylmethyl)ammonio, dimethyl (methyloxyethyl)ammonio, dimethyl(ethyloxyethyl) ammonio, dimethyl(butyloxyethyl)ammonio, dimethyl (hexyloxyethyl)ammonio, dimethyl(phenyloxyethyl)

ammonio, dimethyl(cyclohexyloxyethyl)ammonio, dimethyl(naphthyloxyethyl)ammonio, dimethyl (methyloxypropyl)ammonio, dimethyl(methyloxybutyl) ammonio, dimethyl(methyloxyoctyl)ammonio, dimethyl (methyloxyethyloxyethyl)ammonio, dimethyl (methyloxyethyloxybutyl)ammonio, dimethyl (methylthioethyl)ammonio, dimethyl(methylthiobutyl) ammonio, dimethyl(methylaminoethyl)ammonio, dimethyl (dimethylaminoethyl)ammonio, dimethyl (methylaminoethyl)ammonio, dimethyl (methylcarbonyloxyethyl)ammonio, dimethyl (methylcarbonylthioethyl)ammonio, dimethyl (methylthiocarbonylethyl)ammonio, dimethyl(N-acetylaminoethyl)ammonio, dimethyl(N,N-diacetylaminoethyl)ammonio, dimethyl (methylcarbonylthioethyl)ammonio, dimethyl (carbamoylethyl)ammonio, dimethyl(N-methylcarbamoylethyl)ammonio, dimethylphenylammonio, and methyldiphenylammonio groups.

Further, the following specific examples will be mentioned, in which they will be indicated as substituted products.

Quaternized products of nitrogen-containing cyclic compounds such as pyrrole, oxazole, isoxazole, thiazole, isothiazole, imidazole, pyrazole, furazane, pyridine, pyridazine, pyrimidine, pyrazine, pyrroline, pyrrolidine, imidazoline, imidazolidine, pyrazoline, pyrazolidine, piperidine, piperazine, morpholine, quinuclidine, indole, isoindole, indolizine, quinoline, isoquinoline, quinolizine, purine, indazole, quinazoline, cinnoline, quinoxaline, phthalazine, pteridine, carbazole, acridine, phenanthridine, phenazine, phenothiazine, phenoxazine, indoline, and isoindoline. No particular limitation is imposed on the position of their substitution in the pendant group.

As cationic groups, those practically acting as cations, such as guanidyl group, are also included.

Each of these quaternary ammoniums has a smaller water absorption per weight as the molecular weight of its cationic group becomes greater, and also has a smaller water absorption as its hydrophobicity becomes higher. From the viewpoint of these features and safety, preferred are trimethylammonio, triethylammonio, tripropylammonio, tributylammonio, dimethyl(methyloxycarbonylmethyl) ammonio, dimethyl(ethyloxycarbonylmethyl)ammonio and guanidyl groups, which contain cationic groups of smaller molecular weights and high hydrophilicity.

Illustrative of a counter ion for the cationic group can be counter ions similar to those exemplified above as counter ions for the ammonium salt of glycino group.

The betaine group, which may be contained in each pendant group of the polymer according to the present invention, is an amphoteric group, so that a cationic group and an anionic group are simultaneously contained in the same pendant group. A pendant group, which contains both a cationic group and an anionic group at a small distance therebetween, is preferred because ionic stabilization takes place in a region containing both the ions.

Preferred examples of the betaine group are those containing moieties represented by the following formula (3):

(3)

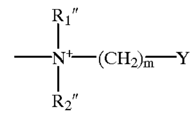

wherein Y is an anionic group, $R_1''$ and $R_2''$ are each independently an alkyl, aralkyl or aryl group, and m is an integer of from 1 to 10.

As the cationic group which forms the pendant group, a group, which is always charged positive irrespective of pH is preferable. Groups such as primary amino groups and secondary amino groups become cations under acidic conditions but become nonionic under alkaline conditions. They hence act as cations on the acidic side as cations for the present invention.

As examples of the cationic group in the betaine group, groups similar to those mentioned above as examples of the cationic group alone can be mentioned.

Further, as examples of the anionic group in the betaine group, groups similar to those mentioned above as examples of the acidic group alone can also be mentioned. Among these, carboxyl, sulfonic and phosphonic groups are preferred for their easy production and excellent stability, with carboxyl and sulfonic groups being particularly preferred.

When the polymer according to the present invention contains pendant groups with acidic groups and pendant groups with cationic groups, they may act as counter ions so that ionic cross-links may be formed.

In the present invention, the pendant group may further contain substituent groups similar to those mentioned above for the hydrocarbon groups, in addition to the specific functional group.

The polymer of the present invention may contain other side chains in addition to pendant groups each of which contains the specific functional group. Illustrative of such other side chains are those having a structure, which has been formed by simply opening an imide ring, and containing a carboxyl group; those having a pendant group which contains a substituent group besides the specific functional groups; those having a pendant group which contains no substituent group; and the like. Examples of the pendant group which contains a substituent group besides the specific functional groups are groups containing a substituent group similar to those mentioned above for the hydrocarbon groups.

(1-3) Cross-linking Portions of the Polymer

The polymer of the present invention structurally features that portions of its backbone or side chains are cross-linked. These cross-links are covalent bonds but may also make combined use of ionic bonds or hydrogen bonds.

Each of the cross-linking portions in the polymer according to the present invention takes a structure derived from a carboxyl group of an acidic polyamino acid as a polymer backbone.

Each cross-linking group is bonded to the associated carbonyl group in the polymer backbone via N, O or S. Namely, each cross-linking group is in the form of an amide, ester or thioester bond. This bond can be either a single bond alone or a combination of plural bonds.

In the polymer of the present invention, each cross-linked side chain may be substituted to the α-position or the β-position of the associated amide bond in the polymer backbone in the case of a residual group of aspartic acid and to the α-position or the γ-position of the associated amide bond in the polymer backbone in the case of a residual group of glutamic group.

Although no particular limitation is imposed on the proportion of side chain groups in the polymer of the present invention, the preferred proportion can range from 1 to 99.8% in terms of monomer units based on the whole polymer, with 10 to 99.8% being more preferred.

A portion flanked by each adjacent amide bonds or the like in each cross-linking group in the polymer according to the present invention will be called a "connecting group" for the sake of convenience.

No particular limitation is imposed on the connecting group, but examples can include alkylene, aralkylene, phenylene and naphthylene groups. The following specific examples can also be mentioned.

$—CH_2—$, $—CH_2CH_2—$, $—CH_2CH_2CH_2—$, $—CH_2CH_2CH_2CH_2—$, $—(CH_2)_5—$, $—(CH_2)_6—$, $—(CH_2)_7—$, $—(CH_2)_8—$, $—(CH_2)_9—$, $—(CH_2)_{10}—$, $—(CH_2)_{11}—$, $—(CH_2)_{12}—$, $—(CH_2)_{13}—$, $—(CH_2)_{14}—$, $—(CH_2)_{15}—$, $—(CH_2)_{16}—$, $—(CH_2)_{17}—$, $—(CH_2)_{18}—$, $—CH_2CH_2O—CH_2CH_2—$, $—(CH_2CH_2O)_2CH_2CH_2—$, $—(CH_2CH_2O)_3CH_2CH_2—$, $—(CH_2CH_2O)_4CH_2CH_2—$, $—(CH_2CH_2O)_5CH_2CH_2—$, $—(CH_2CH_2O)_6—CH_2CH_2—$, $—CH_2CH_2CH_2OCH_2CH_2CH_2—$, $—(CH_2CH_2CH_2O)_2CH_2CH_2—CH_2—$, $(CH_2CH_2CH_2O)_3CH_2CH_2CH_2—$, $(CH_2CH_2CH_2O)_4CH_2CH_2CH_2—$, $(CH_2CH_2CH_2O)_5CH_2CH_2CH_2—$, $(CH_2CH_2CH_2O)_6CH_2CH_2CH_2—$, $—CH_2CH_2CH_2CH(COOCH_3)—$, $—CH_2CH_2CH_2CH(COOH)—$, $—CH_2CH_2CH_2CH_2CH(COOCH_3)—$, $—CH_2CH_2CH_2CH_2CH(COOH)—$, $—CH_2CH_2CH_2CH_2CH(COOC_2H_5)—$, $—CH_2CH_2CH_2CH_2CH(COOC_2H_4—)—$, $—CH_2CH(COOCH_3)—$, $—CH_2CH(COOH)—$, $—CH(CH_3)CH(COOCH_3)—$, $—CH(CH_3)CH(COOH)—$,

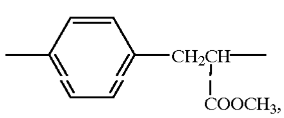

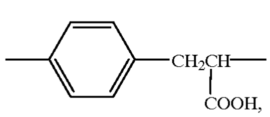

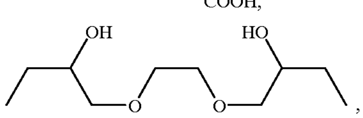

-continued

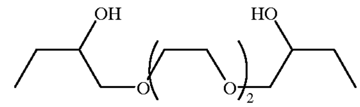

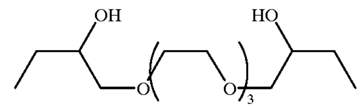

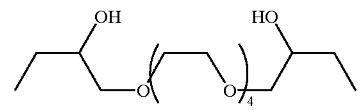

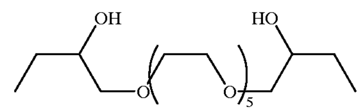

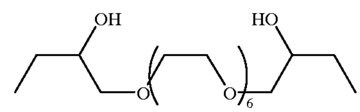

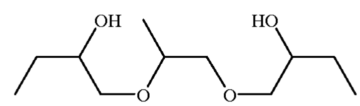

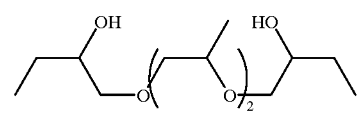

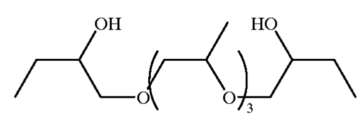

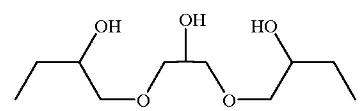

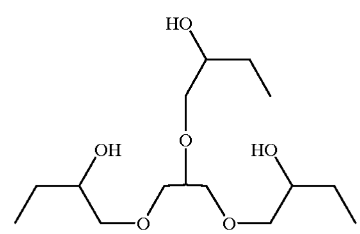

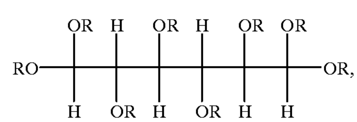

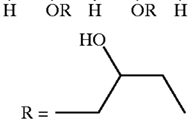

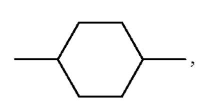

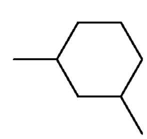

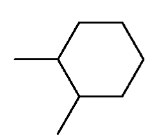

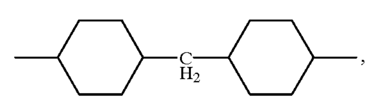

-continued

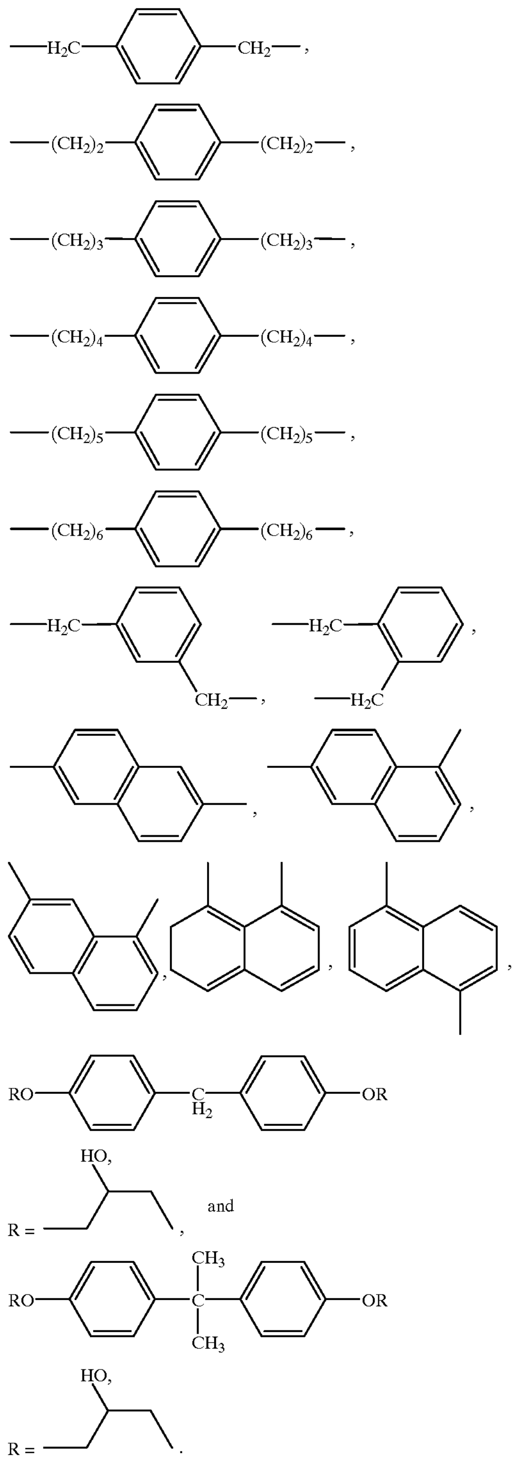

Like the above-mentioned hydrocarbon group in the pendant group, each of these connecting groups may additionally contain one or more substituent groups.

Although no particular limitation is imposed on the proportion of such cross-linking portions, recurring units in the cross-linking portions may account, in number, preferably for 0.1 to 50%, more preferably 0.5 to 10% of entire recurring units of the polymer.

(2) Production Process of the Polymer

Although no particular limitation is imposed on the process for the production of the polymer of the present invention, a description will hereinafter be made centering around a polyaspartic acid polymer having higher utility as a superabsorbent polymer.

Incidentally, production of the polyaspartic acid polymer of the presnt invention can make use of polysuccinimide, polyaspartic acid, a polyaspartate ester or a copolymer thereof.

(2-1) Production Process of the Polysuccinimide

For the cross-linked polymer, no particular limitation is imposed on the process for the production of the polyaspartic acid polymer, a production process making use of polysuccinimide or polyaspartic acid, which is available by hydrolyzing polysuccinimide, or a polyaspartate ester, which is available by esterifying it, is suited when industrial production is performed.

Although no particular limitation is imposed on the production process of polysuccinimide and polyaspartic acid, it can be easily produced by a process such as that reported in J. Amer. Chem. Soc., 80, 3361 et seq., 1958.

No particular limitation is imposed on the molecular weight of polysuccinimide to be used, but a higher molecular weight provides high ability as a water-holding material. The molecular weight is generally 30,000 or higher, preferably 60,000 or higher, more preferably 90,000 or higher.

A copolymer can be produced by adding one or more amino acids other than aspartic acid and/or one or more monomer components other than amino acids upon production of polysuccinimide for use in the present invention. Specific examples of such amino acids other than aspartic acid and those of monomer components other than amino acids are as described above.

Using the thus-obtained polysuccinimide, polyaspartic acid obtained by hydrolyzing the polysuccinimide, or a polyaspartate ester as a derivative, a cross-linked polymer is produced.

(3) Production Process of the Cross-linked Polymer

Reactions in the production of the polymer according to the present invention basically comprise three reactions, that is, a cross-linking reaction, a pendant-group-introducing reaction, and an exchange reaction to the specific functional group, although they may be practiced in an order different from the order that they are presented. In the case of acidic groups, the reaction condition is strict so that it is hard to exchange them effectively and in any fixed quantity. On the other hand, cation groups and betaine groups are preferable because the reaction easily proceeds and can be conducted under mild conditions. In the present invention, the examples will be made centering around exchange reactions to cation groups and betaine groups (they will be called “cationization reaction” and “betainization reaction, respectively).

Incidentally, in the case of acidic groups, for example, exchange reactions to carboxyl groups include a reaction of substitution of halogen atoms with carbonate ions, an oxidation reaction of an alcohol or aldehyde, a hydrolysis reaction of a nitrile, and deprotection of ester groups or amide groups. In all of them, reaction conditions are strict, and it is not useful because the principal chain and side chains are cut or deteriorated. However, the reactions can be adopted according to circumstances.

It is to be noted that one or more other reactions than the three reactions mentioned above may be used instead or may be additionally used in combination.

The production process varies depending on the order that these three reactions are conducted. Although no particular limitation is imposed on the process, its examples will hereinafter be described (incidentally, in the case of a betaine group, a description will be made of a case that both a cationic group and an anionic group are contained in the same pendant group).

(A) A process in which pendant groups containing specific functional groups are introduced either subsequent to or concurrently with cross-linking of polysuccinimide.

(B) A process in which, either subsequent to or concurrently with cross-linking of polysuccinimide, pendant groups containing precursors of specific functional groups are introduced, followed by the conversion of the precursors into the specific functional groups through their substitution into acidic groups, their cationization, or the like.

(C) A process in which cross-linking is conducted subsequent to introduction of pendant groups, which contain specific functional groups, into polysuccinimide.

(D) A process in which, subsequent to introduction of pendant groups—which contain precursors of specific functional groups—into polysuccinimide, cross-linking is conducted, followed by the conversion of the precursors into the specific functional groups.

(E) A process in which pendant groups containing specific functional groups are introduced either subsequent to or concurrently with cross-linking of an acidic polyamino acid or its ester.

(F) A process in which, either subsequent to or concurrently with cross-linking of an acidic polyamino acid or its ester, pendant groups containing precursors of specific functional groups are introduced, followed by the conversion of the precursors into the specific functional groups.

(G) A process in which cross-linking is conducted subsequent to introduction of pendant groups, which contain specific functional groups, into an acidic polyamino acid or its ester.

(H) A process in which pendant groups, which contain precursors of specific functional groups, into an acidic polyamino acid or its ester, the precursors are converted into the specific functional groups, and cross-linking is then conducted.

(I) A process in which an acidic amino acid substituted by at least one pendant group containing a specific functional group, and optionally an unsubstituted acidic amino acid and/or an acidic amino acid oligomer is polymerized in the presence of a cross-linking agent.

(J) A process in which an acidic amino acid substituted by at least one pendant group containing a precursor of a specific functional group, and optionally an unsubstituted acidic amino acid and/or an acidic amino acid oligomer is polymerized in the presence of a cross-linking agent, followed by the conversion of these precursors into specific functional groups.

Among these processes, the processes (I) and (J) are not preferred for application fields where high water-absorbency is required because the resulting polymers are not very high in molecular weight and, hence, are not high in water absorption. Moreover, they require complex steps. In addition, protection or the like is needed where acidic groups or the like are contained as specific groups. The processes (A) to (H), on the other hand, are preferred, because they can provide polymers permitting control of water absorption and gel, said control being required for a superabsorbent polymer, and having a high water absorption. Among these, the processes (A) to (D) are more preferred since they allow to conduct reactions under mild conditions.

An illustrative description will next be made about the case of betaine groups, specifically about a case that cationic groups and anionic groups are contained in different pendant groups, respectively.

(K) A process in which, subsequent to or concurrently with cross-linking of polysuccinimide, pendant groups containing cationic groups and pendant groups containing anionic groups are introduced.

(L) A process in which, subsequent to or concurrently with cross-linking of polysuccinimide, pendant groups containing precursors of cationic groups and pendant groups containing anionic groups are introduced, followed by betainization.

(M) A process in which cross-linking is conducted subsequent to introduction of pendant groups with cationic groups contained therein and pendant groups with anionic groups contained therein into polysuccinimide.

(N) A process in which, subsequent to introduction of pendant groups with precursors of cationic groups contained therein and pendant groups with anionic groups contained therein into polysuccinimide, cross-linking is conducted, followed by betainization.

(O) A process in which, either subsequent to or concurrently with cross-linking of an acidic polyamino acid or its ester, pendant groups with cationic groups contained therein and pendant groups with anionic groups contained therein are introduced.

(P) A process in which, either subsequent to or concurrently with cross-linking of an acidic polyamino acid or its ester, pendant groups with precursors of cationic groups contained therein and pendant groups containing anionic groups contained therein are introduced, followed by betainization.

(Q) A process in which cross-linking is conducted subsequent to introduction of pendant groups with cationic groups contained therein and pendant groups with anionic groups contained therein into an acidic polyamino acid or its ester.

(R) A process in which, subsequent to introduction of pendant groups with precursors of cationic groups contained therein into an acidic polyamino acid or its ester, betainization is conducted, followed by cross-linking.

(S) A process in which an acidic amino acid substituted by at least one pendant group containing a cationic group, and optionally an unsubstituted acidic amino acid and/or an acidic amino acid oligomer is polymerized in the presence of a cross-linking agent.

(T) A process in which an acidic amino acid substituted by at least one pendant group containing a precursor of an acidic group, and optionally an unsubstituted acidic amino acid and/or an acidic amino acid oligomer is polymerized in the presence of a cross-linking agent, followed by cationization.

Incidentally, the term "betainization" as used herein also includes such a situation that a precursor, which can be converted into a cationic group, becomes a betaine as a counter ion with an anionic group as a result of cationization of the precursor.

Among these processes, for the same reasons as mentioned above in connection with the processes (A) to (H), the processes (S) and (T) are not preferred but the processes (K) to (R) are preferred.

In these processes, it is preferred to conduct the cross-linking reactions in advance. Reasons for this will hereinafter be explained.

When the polymer of this invention is to be used as a superabsorbent polymer, strict control of the cross-linking reaction is needed to provide the resin with desired high water-absorbency as the water absorbency of the resulting resin varies depending on the degree of the cross-linking reaction (hereinafter called the "cross-linking degree"). Nonetheless, if a pendant-group-introducing reaction is conducted in advance and pendant groups are hence introduced in a polymer backbone, a subsequent cross-linking reaction is chemokinetically slowed down due to a decrease in reactive sites in many instances, thereby making it difficult to control the cross-linking degree. It is therefore preferred to conduct a cross-linking reaction in advance so that the cross-linking degree can be controlled.

The cross-linking reaction, the pendant-group-introducing reaction and the cationization reaction are substantially the same in basic reaction conditions, although they are different in that their reaction systems are homogeneous or non-homogeneous systems. These individual reactions will therefore be described separately.

Incidentally, if the cross-linking reaction is conducted in advance, the reactant is insolubilized as a result of cross-linking so that the subsequent reaction or reactions will often be conducted in non-homogeneous system or systems. In the case of a reaction in a non-homogeneous system, the reaction velocity may become slower than the same reaction in a homogeneous system. If this is proven to be the case, one or more known reaction-accelerating methods for non-homogeneous systems may be used, such as an increase in stirring efficiency and/or use of a phase transfer catalyst.

If the reaction is conducted in the state of gel, the reaction becomes faster than the same reaction in an ordinary liquid-solid, two-phase system because of the possibility of movement of a substance into and out of the gel although the reaction in the state of the gel is slower than the same reaction in the state of a solution. The reaction system may be a liquid-solid, two-phase system in an initial stage of the reaction provided that it becomes gel from an intermediate stage of the reaction.

A description will hereinafter be made about these production processes. The description will however be focused on the processes (A) and (B) which are suited as industrial production processes.

Incidentally, the production process of the cross-linked polymer is not limited to the above processes (A) and (B) but, instead, the processes (C) to (T) and other processes can also be used.

The description will be made by dividing the production process into the following three reactions:

(4) Cross-linking reaction;

(5) Pendant-group-introducing reaction; and (6) Cationization reaction or betainization reaction.

(4) Cross-linking Reaction

The cross-linking reaction of the polymer according to the present invention can be conducted, without any particular limitation, by the following three methods:

(4-1) Cross-linking of polysuccinimide;

(4-2) Cross-linking of acidic polyamino acid; and (4-3) Cross-linking of acidic polyamino acid ester.

Among these, methods involving fewer steps and permitting the reaction under mild conditions are preferred, with the method that polysuccinimide and a cross-linking agent such as a polyamine are reacted being especially preferred.

It is also possible to conduct the cross-linking through stepwise reactions by using cross-linking agents having reactive groups of different reactivities.

Examples of the cross-linking agent for use during the cross-linking reaction in the present invention can include polyamines, polythiols and polyhydric alcohols. In the reaction between the polysuccinimide and the cross-linking agent, no particular limitation is imposed insofar as the cross-linking agent is a polyfunctional compound which is reactive with imide rings in the polysuccinimide. Among polyamines, polythiols and polyhydric alcohols, polyamines are especially preferable because they have high reactivity with imide rings.

Concrete examples can include polyamines, for example, aliphatic polyamines such as hydrazine, ethylenediamine, propylenediamine, 1,4-butanediamine, pentamethylenediamine, hexamethylenediamine, heptamethylenediamine, octamethylenediamine, nonamethylenediamine, decamethylenediamine, undecamethylenediamine, dodecamethylenediamine, tetradecamethylenediamine, hexadecamethylenediamine, 1-amino-2,2-bis(aminomethyl)butane, tetraaminomethane, diethylenetriamine and triethylenetetramine, alicyclic polyamines such as norbornenediamine, 1,4-diaminocyclohexane, 1,3,5-triaminocyclohexane and isophoronediamine, aromatic polyamines such as phenylenediamine, tolylenediamine and xylylenediamine, basic amino acids, led by lysine and ornithine, and esters thereof, compounds formed as a result of bonding of two or more molecules of monoamino compounds through one or more disulfide bonds, such as cystamine, and derivatives thereof; aliphatic polythiols such as 1,2-ethanedithiol, 1,3-propanedithiol, 1,4-butanedithiol, 1,6-hexanedithiol and pentaerythritol; alicyclic polythiols such as cyclohexanedithiol; aromatic polythiols such as xylylenedithiol, benzenedithiol and toluenedithiol; and esters such as trimethylolpropane tris(thioglycolate), trimethylolpropane tris(3-mercaptopropionate), pentaerythritol tetrakis(thioglycolate) and pentaerythritol tetrakis(3-mercaptopropionate) polythiol.

Among these, preferred are those having less odor and high reactivity with imide rings in polysuccinimide, that is, ethylenediamine, propylenediamine, 1,4-butanediamine, heptamethylenediamine, hexamethylenediamine, lysine, ornithine and cystamine.

The amount of the cross-linking agent varies depending on the application purpose of the resulting cross-linked resin although it may also vary depending on the cross-linking degree which will be determined by the number of functional group(s) in the cross-linking agent and the molecular weight of the cross-linking agent. For the sake of convenience, the term "cross-linking degree" as used herein is defined to indicate the distance or the number of constituent monomer units between adjacent cross-links or the proportion of cross-linking portions relative to the polymer backbone.

Although no particular limitation is imposed on the amount, it is necessary to control the cross-linking degree at an appropriate level because an excessively high cross-linking degree results in a resin with a decreased water absorption whereas an excessively low cross-linking degree leads to a resin which has water solubility and cannot exhibit water absorbency.

The cross-linking degree is preferably 0.1 to 60 mole %, notably 1 to 15 mole % based on the monomer units of polysuccinimide.

Subsequent to the cross-linking reaction, the reaction product may be taken out of the reaction system or, if necessary, may be continuously subjected to the reactions (4) and (5) in the same reaction system. If the reaction product is taken out of the reaction system, the reaction product may be dried and then used in some instances.

(4-1) Method for Cross-linking Polysuccinimide

As a method for cross-linking polysuccinimide, it is general to react a cross-linking agent and polysuccinimide in an organic solvent although the cross-linking method is not specifically limited thereto.

Upon cross-linking polysuccinimide, any organic solvent can be used insofar as it can dissolve the polysuccinimide, the cross-linking agent or a reaction reagent capable of furnishing pendant groups. Conventional organic solvents useful in chemical reactions are all usable. In the case of polyaspartic acid or a polyaspartate ester, an organic solvent capable of dissolving the polymer or a cross-linking agent is also preferred.

Among these, when cross-linking polysuccinimide, one capable of polysuccinimide or a polysuccinimide derivative is preferred. Illustrative are N,N-dimethylformamide, N,N-dimethylacetamide, N-methyl-pyrrolidone, N,N'-dimethylimidazolidinone, dimethylsulfoxide, and sulforane. Of these, N,N-dimethylformamide and N-N-dimethylacetamide are particularly preferred for their high solubility of polysuccinimide. These solvents may be used either singly or in combination.

Further, with a view to slowing down the cross-linking reaction or dispersing the raw materials or the reaction product or for other purposes, it is also possible to add a poor solvent, which cannot dissolve or can only sparingly dissolve polysuccinimide, or the like as needed.

No particular limitation is imposed on the poor solvent. Solvents which are commonly employed in chemical reactions are all usable. Examples can include water; alcohols such as methanol, ethanol, propanol, isopropanol, butanol, pentanol, hexanol, heptanol, octanol, 2-methoxyethanol, and 2-ethoxyethanol; glycols such as ethylene glycol, diethylene glycol, triethylene glycol, propylene glycol, and dipropylene glycol; glycosolves such as methylglycosolve and ethylglycosolve; ketones such as acetone, methyl ethyl ketone, and methyl isobutyl ketone; cyclic ethers such as tetrahydrofuran and dioxane; petroleum ether; pentane; hexane; heptane; octane; cyclohexane; benzene; toluene; ethylbenzene; xylene; decalin; diphenyl ether; aniosole; and cresol.

The concentration of polysuccinimide in the cross-linking reaction may be, but not specifically limited to, from 0.1 to 50 wt. %, especially from 1 to 40 wt. %.

Upon cross-linking reaction, the reaction temperature may preferably be from 0 to 120° C., with 10 to 60° C. being particularly preferred, although no particular limitation is imposed thereon. When the reaction temperature is too low, the reaction rate become slow. When the reaction temperature is too high, the principal chain tends to be scissile.

(4-2) Method for Cross-linking Acidic Polyamino Acid

As a method for cross-linking an acidic polyamino acid, it is general to subject the above-described cross-linking agent and the acidic polyamino acid to dehydrating condensation.

Dehydrating condensation can be conducted by removing resulting water through its azeotropic distillation with a solvent, adding a molecular sieve as a dehydrating agent, conducting the reaction while using a dehydrating condensing agent, or using an enzyme. Further, it is also possible to combine aspartic acid and the cross-linking agent into an intimate mixture and then to conduct the reaction in a solid-phase state free of any solvent.

Illustrative of the condensing agent can be oxidation-reduction condensing agents, for example, carbodiimides such as dicyclohexylcarbodiimide and N-ethyl-N'-(3-dimethylaminopropyl)carbodiimide; 1-acylimidazolide; 2-ethoxy-1-ethoxycarbonyl-1,2-dihydroquinone; triphenylphosphine/carbon tetrachloride; triphenylphosphine/bromotrichloromethane; phosphorus-containing compounds such as bis(2-nitrophenyl ester) phenylphosphonate, diethyl cyanophosphonate and diphenylphosphoroazide; 2-fluoro-1-ethylpyridinium° tetrafluoroborate; triphenylphosphine/bis(benzothiazole) disulfide; tributylphosphine/bis(benzothiazole) disulfide. Examples of the enzyme can include penicillin acylase; and lipases such as yeast lipase.

Upon dehydrating condensation, the reaction temperature may preferably be from 20 to 250° C., with 100 to 180° C. being particularly preferred.

It is also possible to employ a method featuring esterification, amidation or thioesterification of the acidic polyamino acid.

In this method, conventional reaction conditions employed in organic chemistry are usable. To conduct the method, it is possible to convert the acidic polyamino acid into an acidic amino acid residual group and then to react its carboxyl groups with ester-, amide- or thioester-forming groups. As an alternative, such ester-, amide- or thioester-forming groups may be introduced after increasing the reactivity of the acidic polyamino acid into a derivative.

Illustrative methods can include dehydrating condensation of carboxyl groups of an acidic amino acid residual group with an alcohol, an amine or a thiol; reaction with an alcohol, amine or thiol subsequent to activation of carboxyl groups of an acidic amino acid residual group with an acid anhydride, an acid halide an acid azide or the like; reaction of carboxyl groups of an acidic amino acid residual group with an activated alcohol (for example, a halide, ester, sulfonate ester or sulfate ester of an alcohol) or with an activated amine (for example, a silicon derivative of an amine); reaction of carboxyl groups of an acidic amino acid with an epoxy compound, an isocyanate compound, an aziridine compound, an alkyl metal or the like; reaction with a halide or the like subsequent to conversion of carboxyl groups of an acidic amino acid residual group into a salt; and reaction by ester interchange or amide interchange subsequent to conversion of carboxyl groups of an acidic amino acid residual group into active ester groups.

(4-3) Method for Cross-linking an Acidic Polyamino Acid Ester

As a method for cross-linking an acidic polyamino acid ester, it is general to react a cross-linking agent and the acidic polyamino acid ester in an organic solvent although the cross-linking method is not specifically limited thereto. Illustrative of alcohol components of usable esters can be esters with alcohols containing small molecular weight groups such as methyl and ethyl, alcohols containing electron-attractive groups such as chloromethyl and dichloromethyl, and alcohols such as N-hydroxysuccinimide.

In some instances, a catalyst such as an acid catalyst, a base catalyst or the like may be used. A phase transfer catalyst may also be used provided that the reaction system becomes non-homogeneous or the raw materials are insoluble.

(5) Pendant-group-introducing Reaction

Although no particular limitation is imposed on the manner of the pendant-group-introducing reaction for the cross-linked polymer, the pendant-group-introducing reaction can be conducted as will be described hereinafter. The reaction for introducing pendant groups, which contain precursors that can become cationic groups and/or anionic groups, is also of the same principle. Hence, both the cases will be described together. In the present invention, the substituent group that can become a cationic group and/or betaine group is called a "precursor" for the sake of convenience.

Illustrative methods can include: reaction of at least one compound, which is selected from the group consisting of amines, alcohols and thiols containing at least one specific functional group, with a cross-linked polysuccinimide; hydrating condensation between a cross-linked polysuccinimide and the above compound; and ester/amide interchange reaction of the above compound with cross-linked acidic polyamino acid ester.

Including such methods, examples will be described below.

(5-1) Reaction between polysuccinimide and an amine or the like containing a specific functional group.

(5-2) Dehydrating condensation between an acidic polyamino acid and an amine or the like containing a specific functional group.

(5-3) Ester interchange between an acidic polyamino acid ester and an amine or the like containing a specific functional group.

(5-4) Introduction of pendant groups, which contain precursors of acidic groups or cationic groups, into polysuccinimide, followed by the conversion of the pendant groups into the acidic groups or cationic groups.

Among these, methods permitting efficient reactions under mild conditions are preferred. Specifically, preferred are reaction of polysuccinimide or a derivative thereof with an amine or the like containing the specific functional group; and introduction of pendant groups, which contain precursors, into polysuccinimide or a derivative thereof, followed by the cationization or betainization.

In the case of acidic groups in (5-2) and (5-3), the acidic groups themselves may react with an amine or the like in some instances. Namely, extension of side chain groups takes place but, as a consequence, hydrophilic groups become fewer, leading to a reduction in water absorption. The above reaction is therefore not preferred. There is however a case that stronger gel can be formed owing to an increased molecular weight.

A solvent which is to be used in the pendant-group-introducing reaction for the cross-linked polymer may be the same or different from the solvent employed in the cross-linking reaction.

The method for introducing pendant groups, which contain specific functional groups, into polysuccinimide and the method for introducing pendant groups, which contain precursors of specific functional groups, into polysuccinimide are common in many aspects, so that they will be described together.

A reaction reagent, which is to be used in the pendant-group-introducing reaction, contains an acidic, glycino, cationic or betaine group which may be in the form of a precursor. Typical examples of the reaction reagent can include amines, thiols and alcohols, each of which contains at least one acidic, glycino, cationic or betaine group.

First, examples of reaction reagents, which can be used in a reaction for the introduction of pendant groups containing acidic groups, will be shown below.

$H_2N—CH_2COOH$, $H_2N—(CH_2)_2COOH$, $H_2N—(CH_2)_3COOH$, $H_2N—(CH_2)_4COOH$, $H_2N—(CH_2)_5COOH$, $H_2N—(CH_2)_6COOH$, $H_2N—(CH_2)_7COOH$, $H_2N—(CH_2)_8COOH$, $H_2N—(CH_2)_9COOH$, $H_2N—(CH_2)_{10}COOH$, $H_2N—(CH_2)_{11}COOH$, $H_2N—(CH_2)_{12}COOH$,

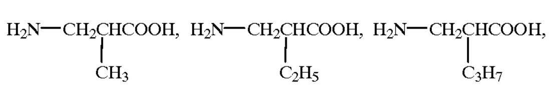

-continued

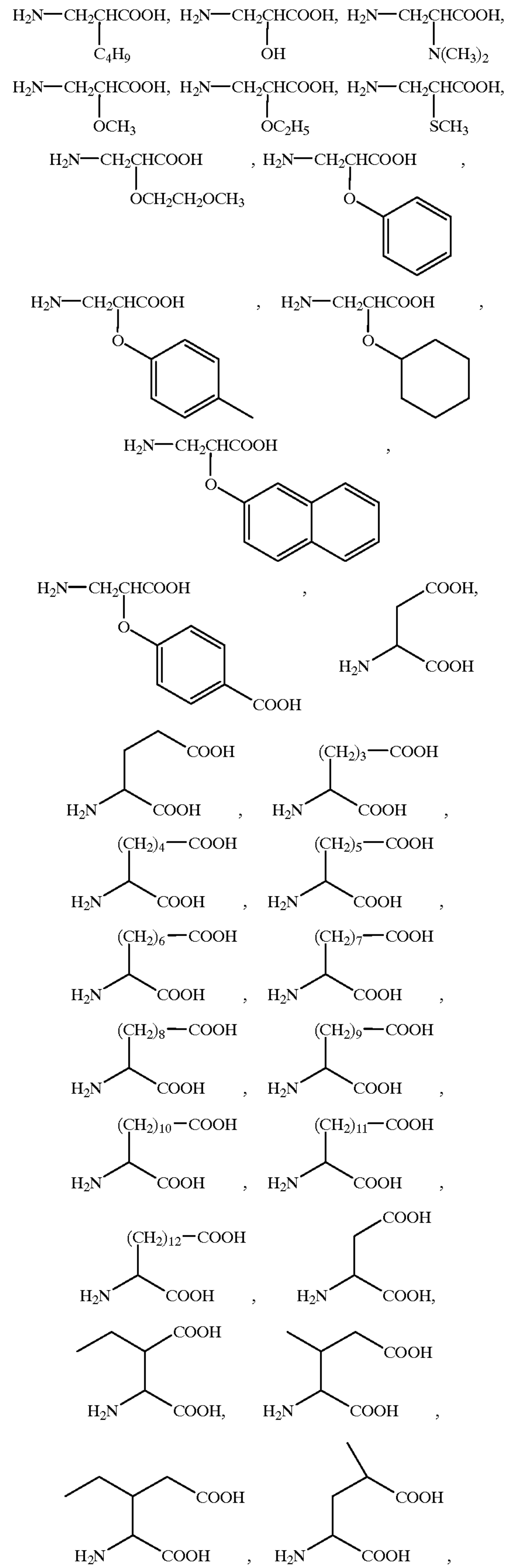

-continued
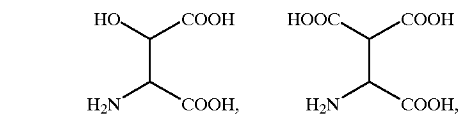
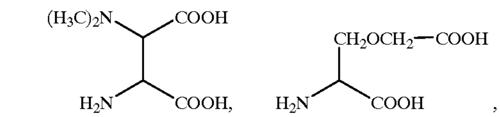
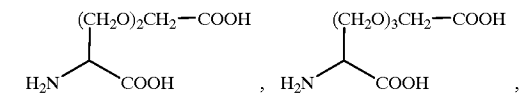
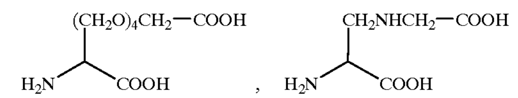
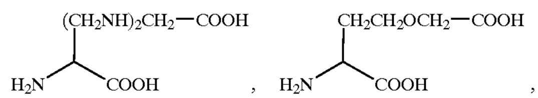
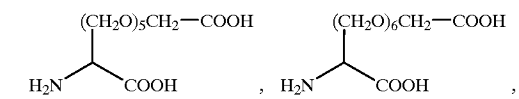
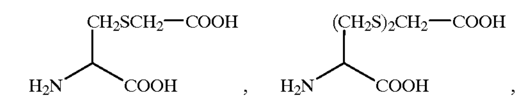
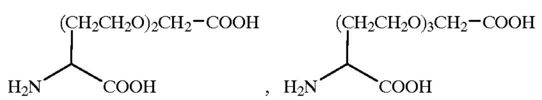
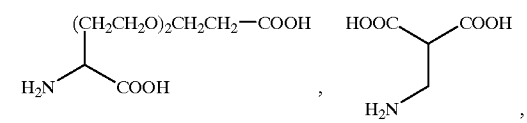
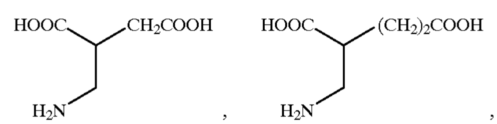
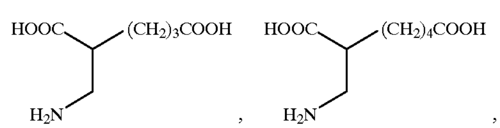
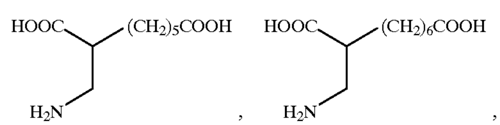
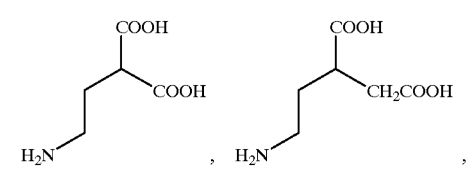
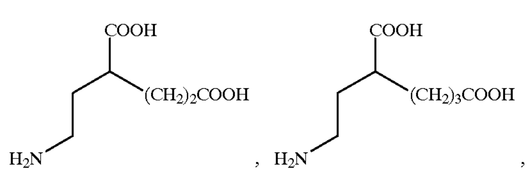
-continued
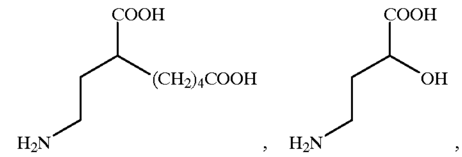
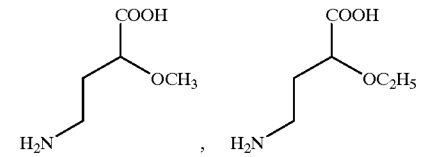
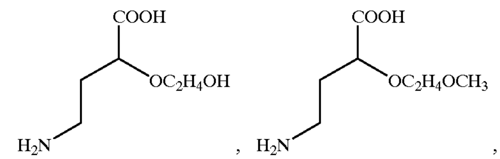
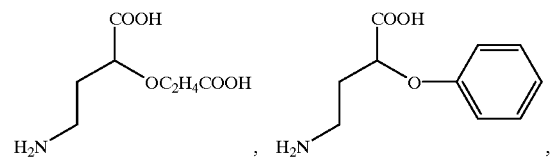
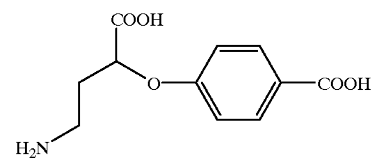
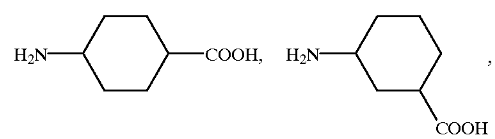
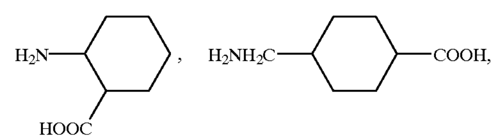
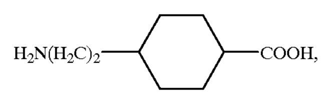
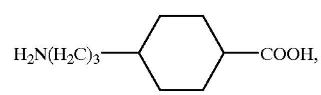
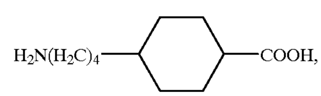
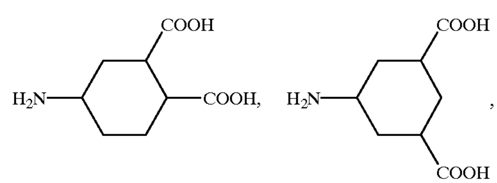
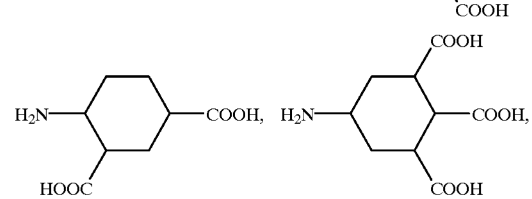

-continued
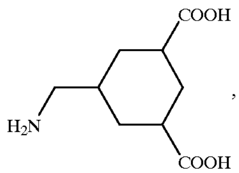
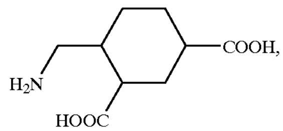
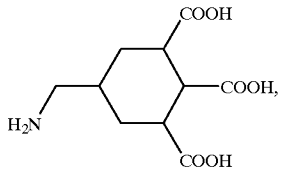
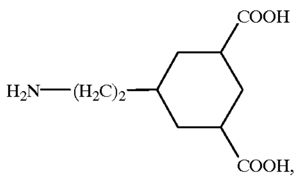
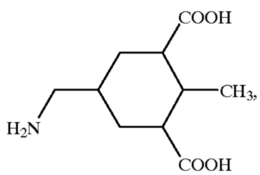
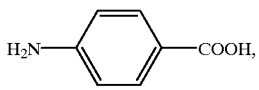
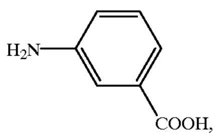
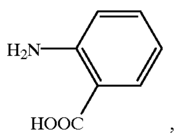
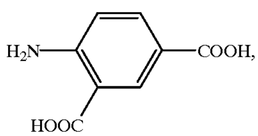
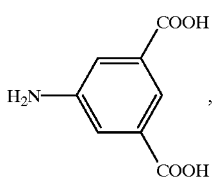
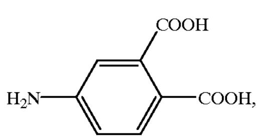
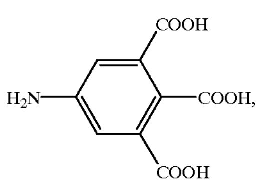
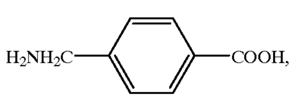
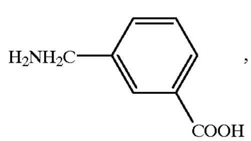
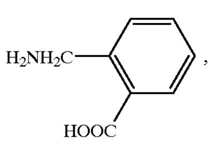
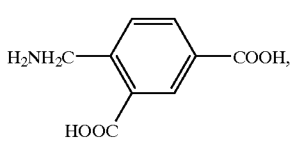
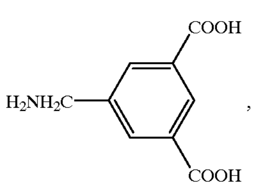
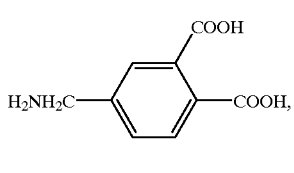
-continued
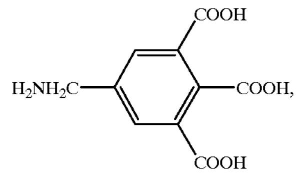
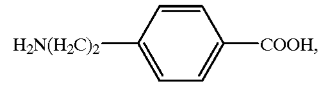
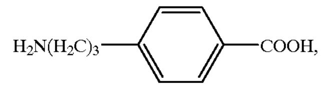
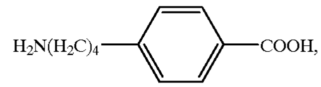
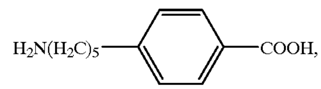
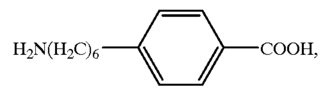
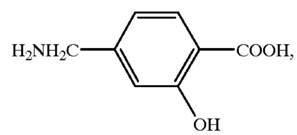
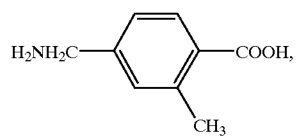
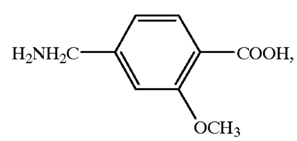
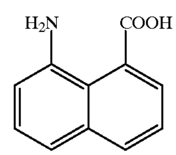
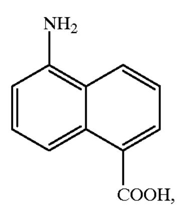
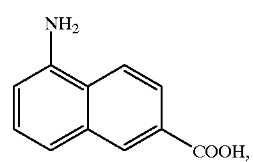
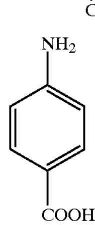
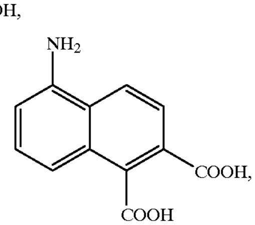
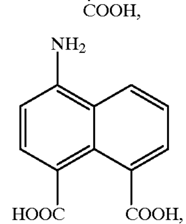
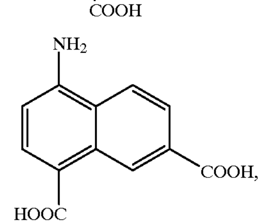

-continued
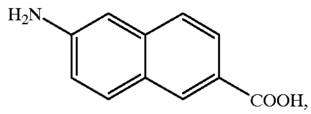
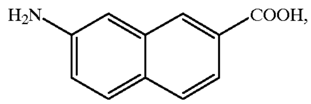
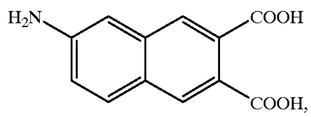
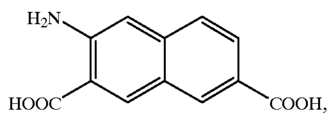
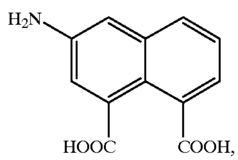
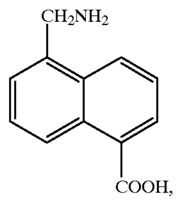
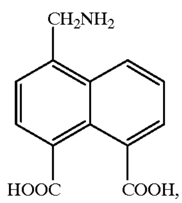
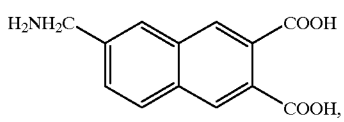
$HS—CH_2COOH$, $HS—(CH_2)_2COOH$,
$HS—(CH_2)_3COOH$, $HS—(CH_2)_4COOH$, $HS—(CH_2)_5COOH$,
$HS—(CH_2)_6COOH$, $HS—(CH_2)_7COOH$, $HS—(CH_2)_8COOH$,
$HS—(CH_2)_{10}COOH$, $HS—(CH_2)_{12}COOH$,
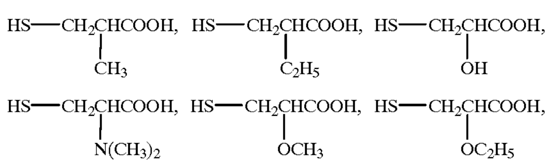
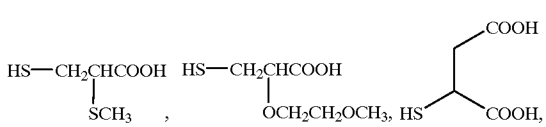
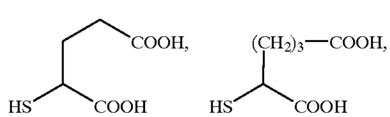
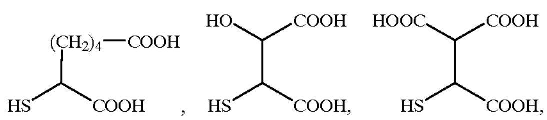
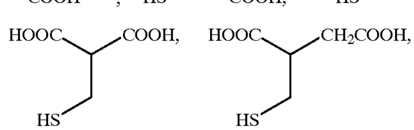
-continued
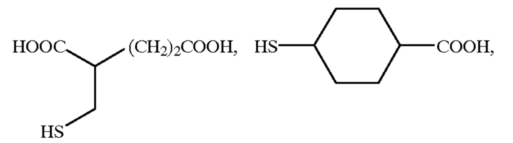
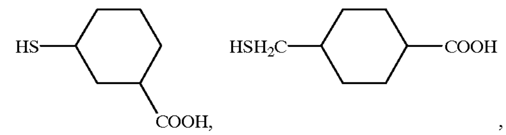
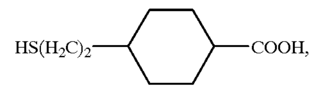
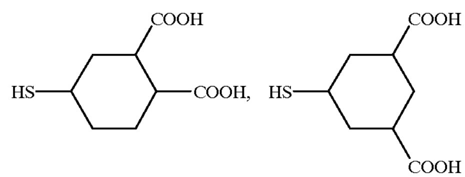
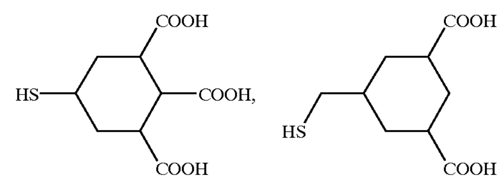
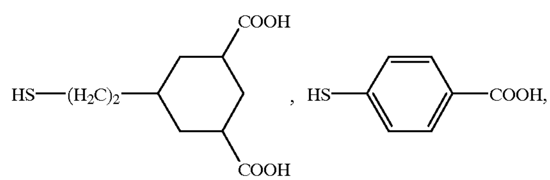
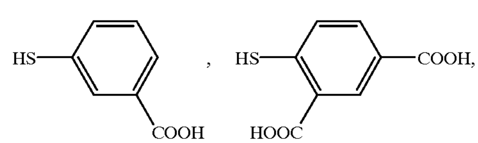
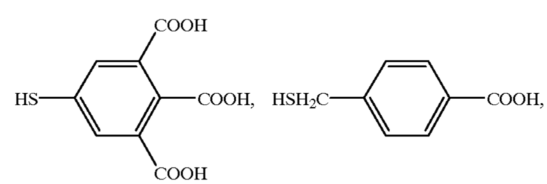
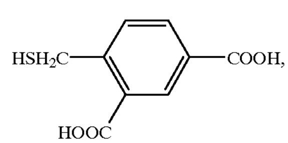
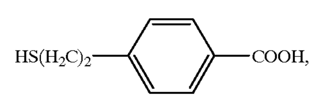
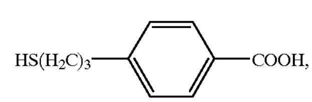
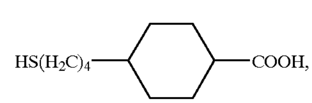

-continued

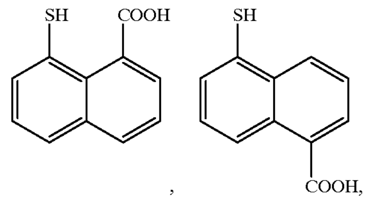

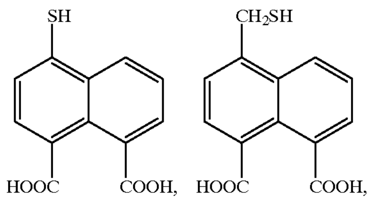

$HO-CH_2COOH$, $HO-(CH_2)_2COOH$, $HO-(CH_2)_3COOH$, $HO-(CH_2)_4COOH$, $HO-(CH_2)_5COOH$, $HO-(CH_2)_6COOH$, $HO-(CH_2)_7COOH$, $HO-(CH_2)_8COOH$, $HO-(CH_2)_{10}COOH$, $HO-(CH_2)_{12}COOH$,

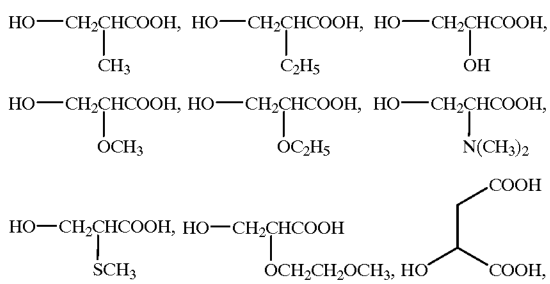

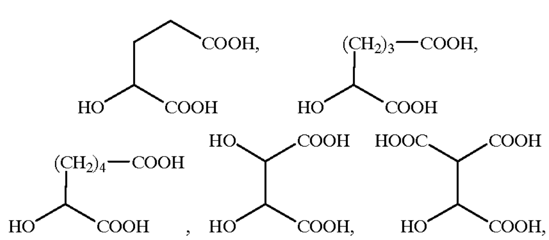

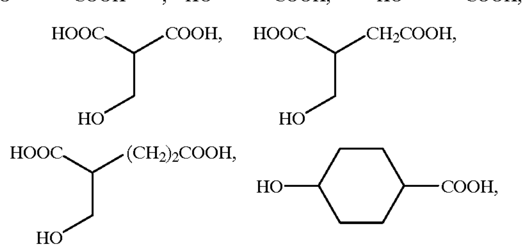

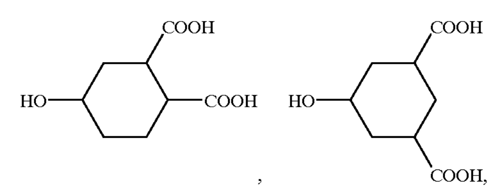

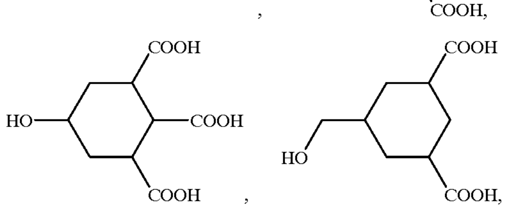

-continued

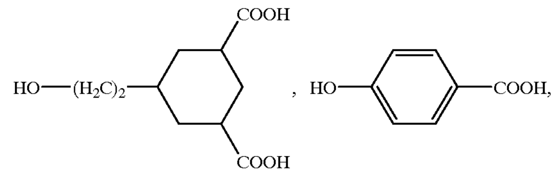

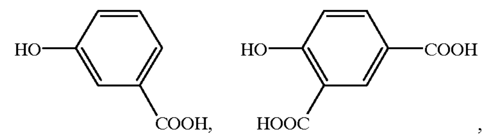

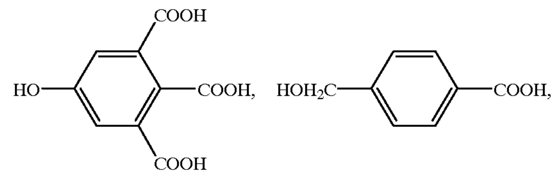

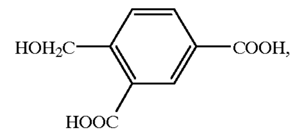

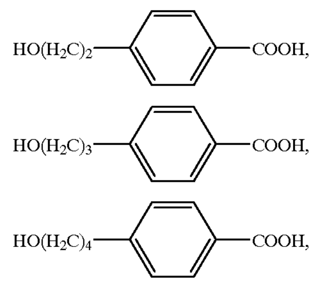

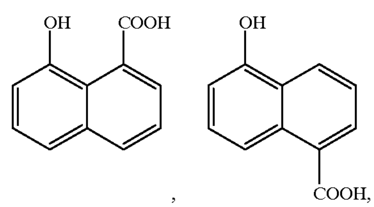

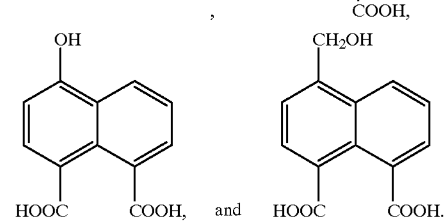

Further, when introducing carboxyl groups as acidic groups, amino acids can also be mentioned as usable reaction reagents, including 20 types of indispensable amino acids, L-ornithine, a series of α-amino acids, β-alanine, γ-aminobutyric acid, neutral amino acids, acidic amino acids, ω-esters of acidic amino acids, basic amino acids, N-substituted derivatives of basic amino acids, and aspartic acid-L-phenyl-alanine dimer (aspartame). Each α-amino acid may be in the form of either an optically active substance (L-form or D-form) or a racemic modification.

In addition, examples of reaction reagents usable upon introduction of acidic groups other than carboxyl groups, such as sulfonic groups and other acidic groups, will also be mentioned below.

$H_2N—CH_2SO_3H$, $H_2N—(CH_2)_2SO_3H$, $H_2N—(CH_2)_3SO_3H$, $H_2N—(CH_2)_4SO_3H$, $H_2N—(CH_2)_5SO_3H$, $H_2N—(CH_2)_6SO_3H$, $H_2N—(CH_2)_7SO_3H$, $H_2N—(CH_2)_8SO_3H$, $H_2N—(CH_2)_9SO_3H$, $H_2N—(CH_2)_{10}SO_3H$, $H_2N—(CH_2)_{11}SO_3H$, $H_2N—(CH_2)_{12}SO_3H$, $H_2N—CH_2CHSO_3H$,
$\quad CH_3$ $H_2N—CH_2CHSO_3H$,
$\quad C_2H_5$ $H_2N—CH_2CHSO_3H$,
$\quad C_3H_7$ $H_2N—CH_2CHSO_3H$,
$\quad C_4H_9$ $H_2N—CH_2CHSO_3H$,
$\quad OH$ $H_2N—CH_2CHSO_3H$,
$\quad N(CH_3)_2$ $H_2N—CH_2CHSO_3H$,
$\quad OCH_3$ $H_2N—CH_2CHSO_3H$,
$\quad OC_2H_5$ $H_2N—CH_2CHSO_3H$,
$\quad SCH_3$ $H_2N—CH_2CHSO_3H$
$\quad OCH_2CH_2OCH_3$,

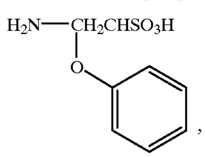

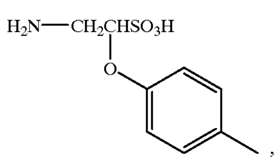

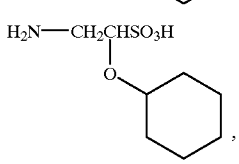

-continued

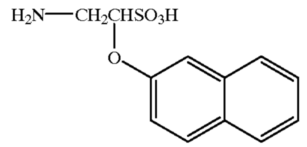

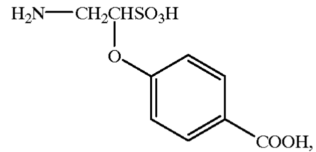

$H_2N—CHSO_3H$,
$\quad COOH$

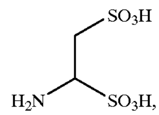

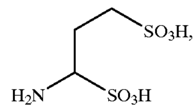

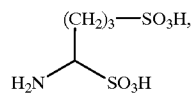

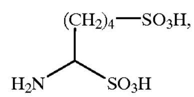

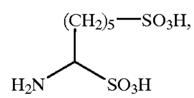

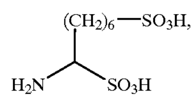

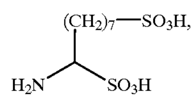

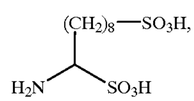

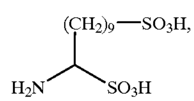

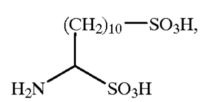

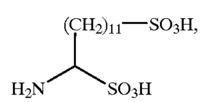

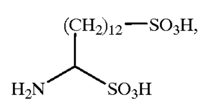

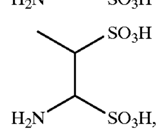

-continued
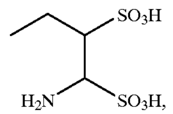
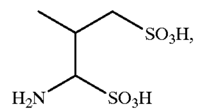
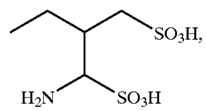
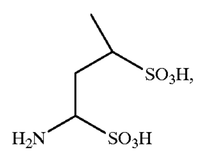
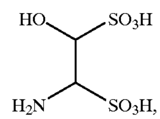
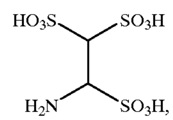
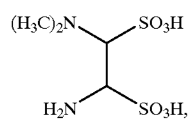
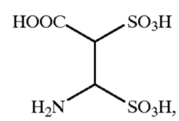
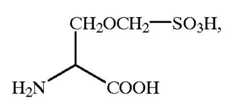
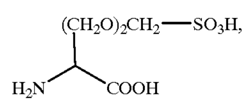
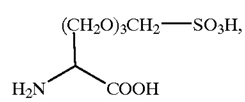
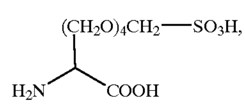
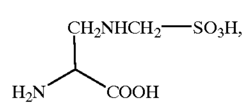
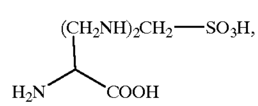
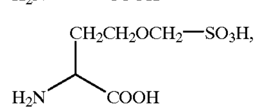
-continued
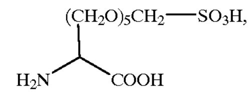
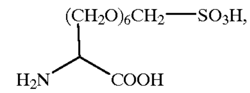
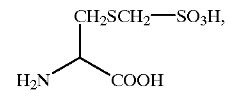
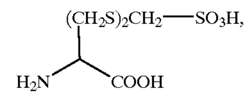
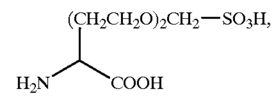
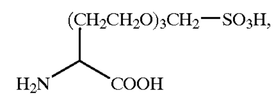
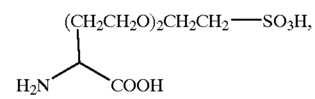
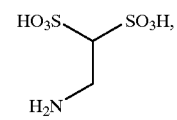
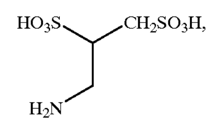
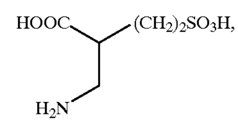
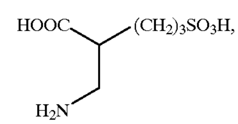
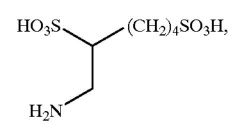
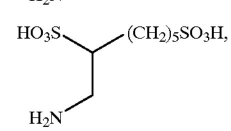
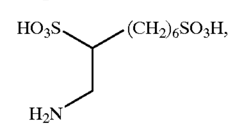
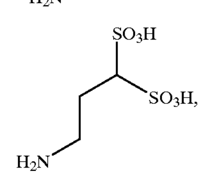

-continued
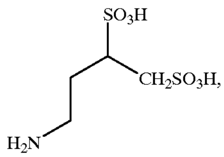
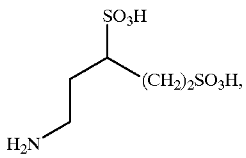
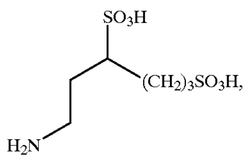
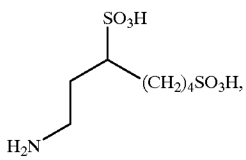
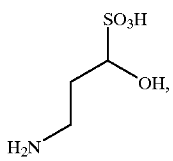
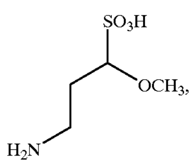
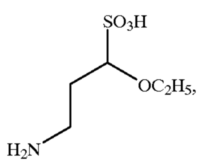
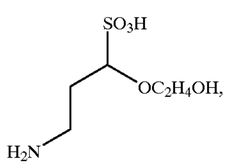
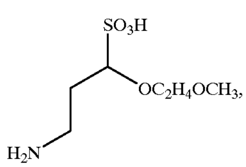
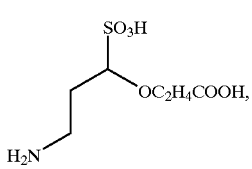
-continued
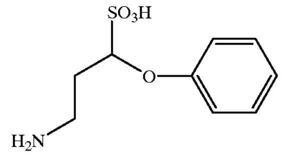
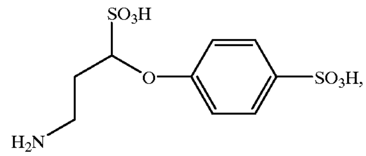
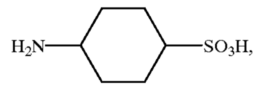
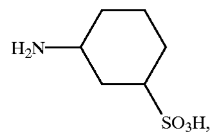
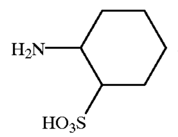
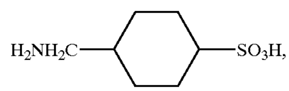
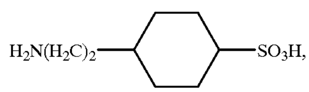
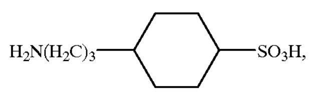
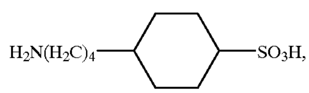
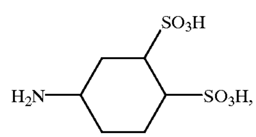
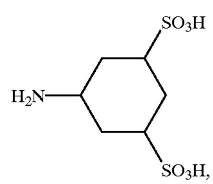
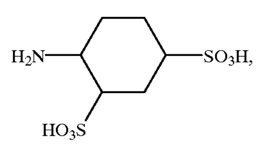
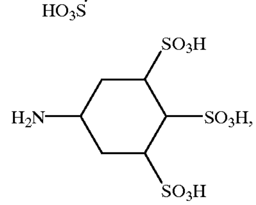

-continued
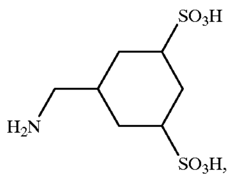
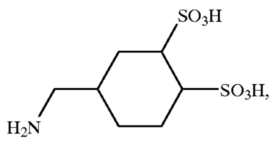
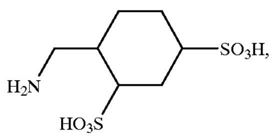
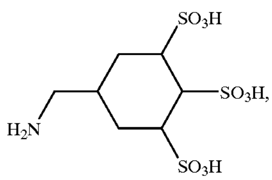
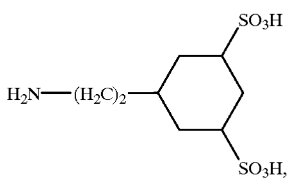
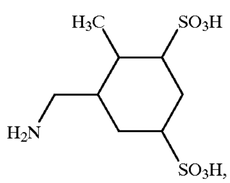
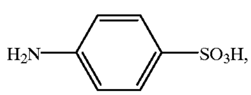
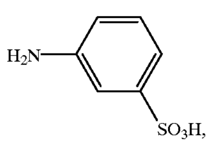
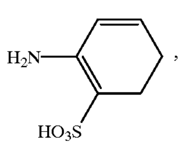
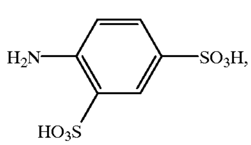
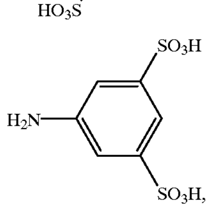
-continued
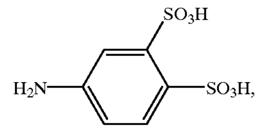
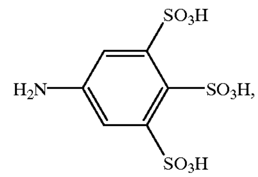
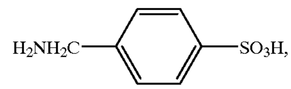
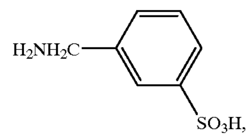
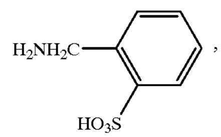
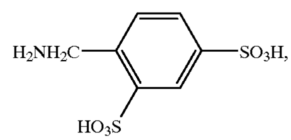
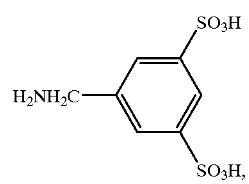
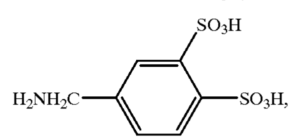
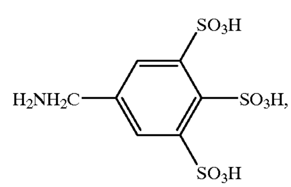
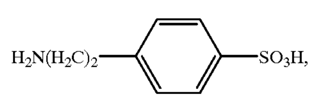
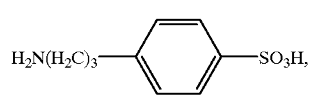
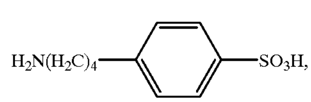
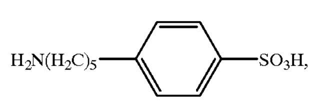

-continued
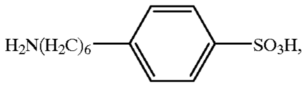
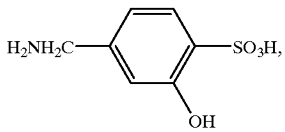
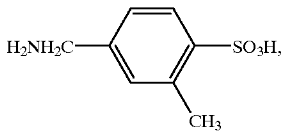
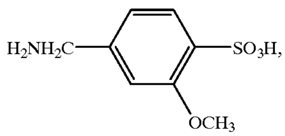
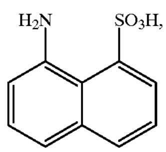
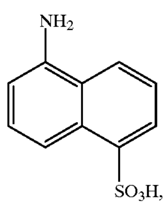
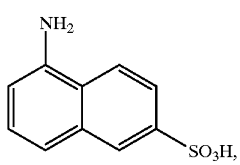
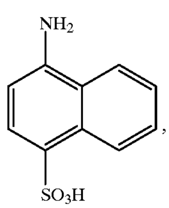
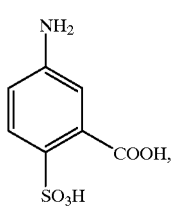
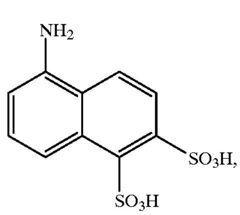
-continued
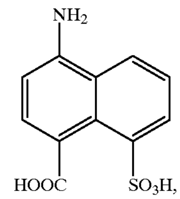
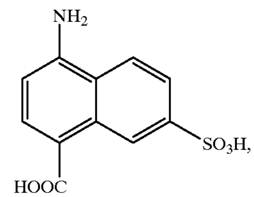
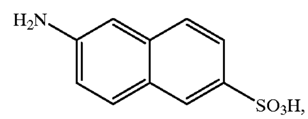
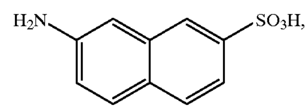
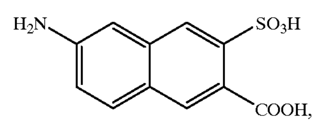
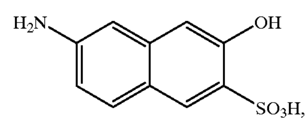
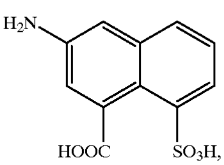
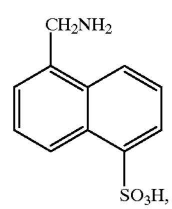
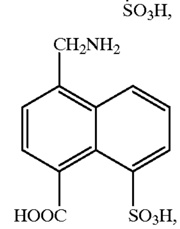
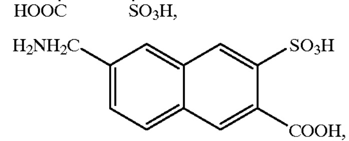
HS—$CH_2SO_3H$,
HS—$(CH_2)_2SO_3H$,
HS—$(CH_2)_3SO_3H$,
HS—$(CH_2)_4SO_3H$, -continued
$HS—(CH_2)_5SO_3H$,
$HS—(CH_2)_6SO_3H$,
$HS—(CH_2)_7SO_3H$,
$HS—(CH_2)_8SO_3H$,
$HS—(CH_2)_{10}SO_3H$,
$HS—(CH_2)_{12}SO_3H$,
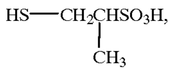
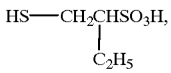
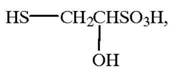
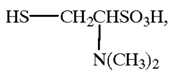
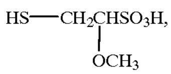
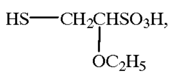
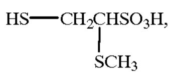
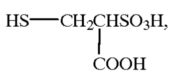
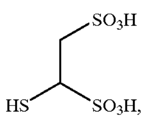
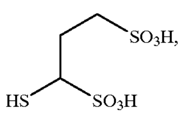
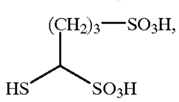
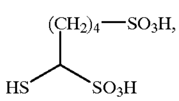
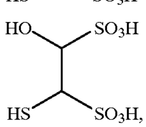
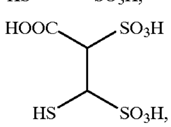
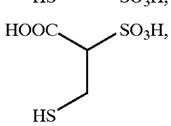
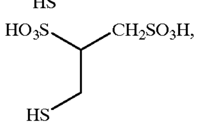
-continued
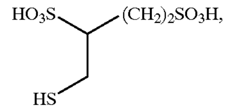
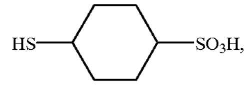
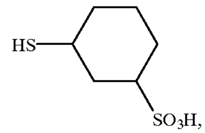
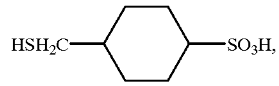
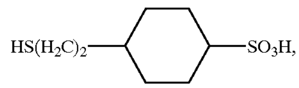
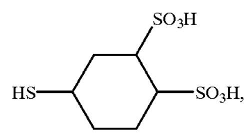
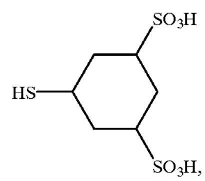
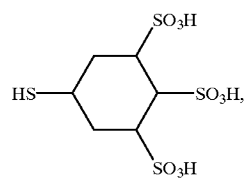
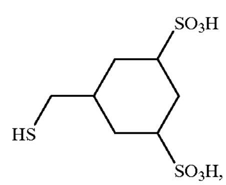
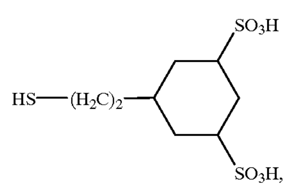
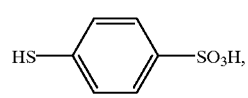
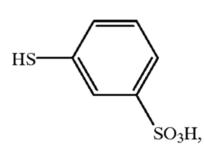

-continued
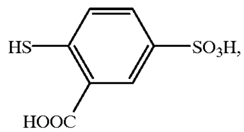
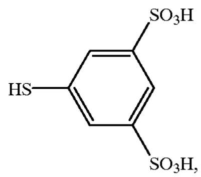
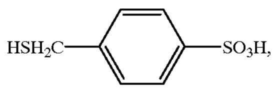
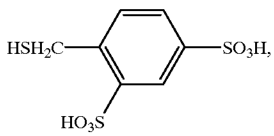
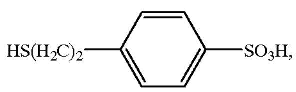
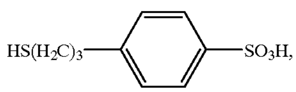
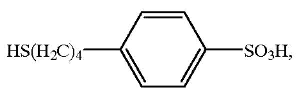
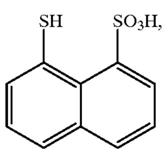
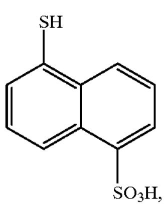
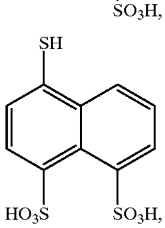
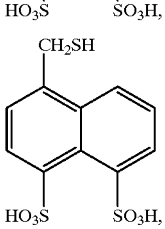
$HO—CH_2SO_3H$,
$HO—(CH_2)_2SO_3H$,
$HO—(CH_2)_3SO_3H$,
-continued
$HO—(CH_2)_4SO_3H$,
$HO—(CH_2)_5SO_3H$,
$HO—(CH_2)_6SO_3H$,
$HO—(CH_2)_7SO_3H$,
$HO—(CH_2)_8SO_3H$,
$HO—(CH_2)_{10}SO_3H$,
$HO—(CH_2)_{12}SO_3H$,
$HO—CH_2CHSO_3H$,
$CH_3$
$HO—CH_2CHSO_3H$,
$C_2H_5$
$HO—CH_2CHSO_3H$,
OH
$HO—CH_2CHSO_3H$,
$N(CH_3)_2$
$HO—CH_2CHSO_3H$,
$OCH_3$
$HO—CH_2CHSO_3H$,
$OC_2H_5$
$HO—CH_2CHSO_3H$,
$SCH_3$
$HO—CH_2CHSO_3H$
$OCH_2CH_2OCH_3$,
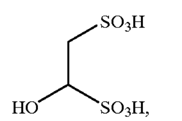
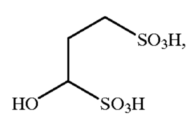
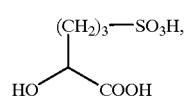
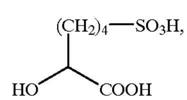
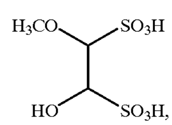
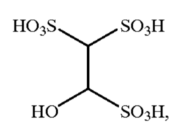
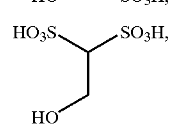

-continued
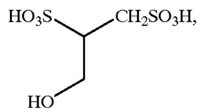
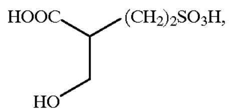
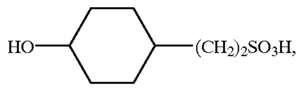
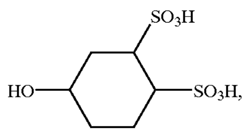
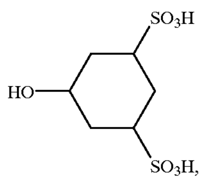
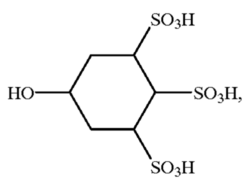
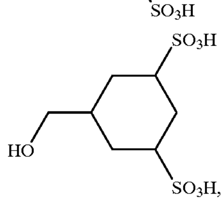
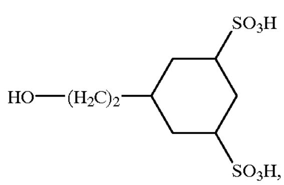
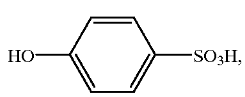
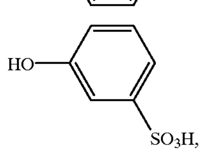
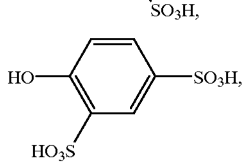
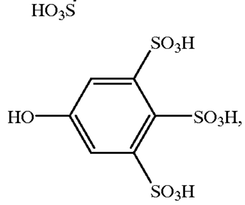
-continued
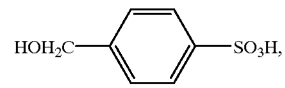
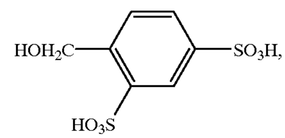
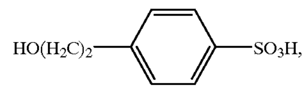
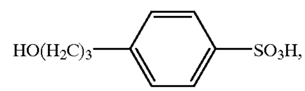
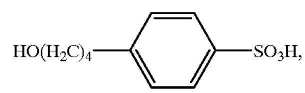
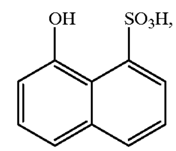
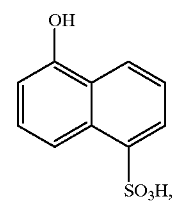
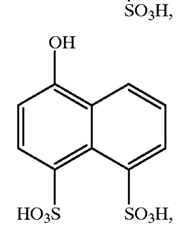
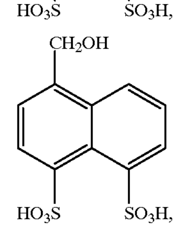
$H_2N$—$CH_2PO_4Na$,
$H_2N$—$(CH_2)_2PO_4K$,
$H_2N$—$(CH_2)_3PO_4Na$,
$H_2N$—$(CH_2)_4PO_4Li$,
$H_2N$—$(CH_2)_5PO_4Na$,
$H_2N$—$(CH_2)_6PO_4Na$,
$H_2N$—$(CH_2)_7PO_4K$,
$H_2N$—$(CH_2)_8PO_4Na$,
$H_2N$—$(CH_2)_9PO_4Na$,
$H_2N$—$(CH_2)_{10}PO_4NH_4$,
$H_2N$—$(CH_2)_{11}PO_4Na$, -continued
$H_2N—(CH_2)_{12}PO_4Na$,
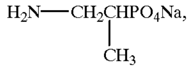
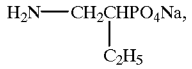
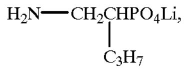
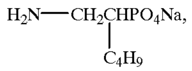
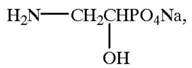
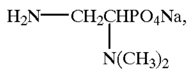
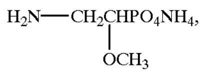
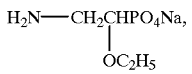
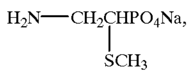
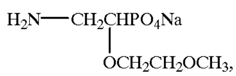
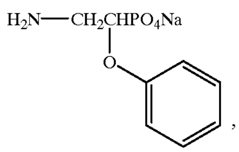
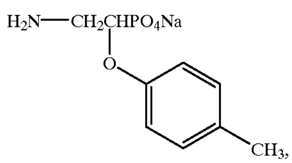
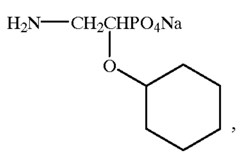
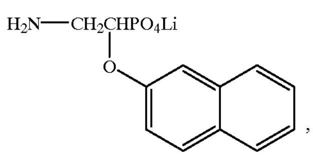
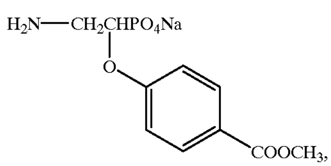
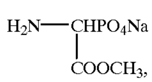
-continued
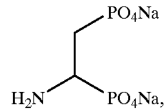
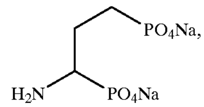
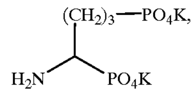
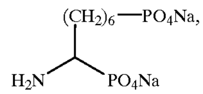
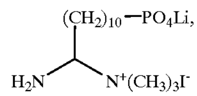
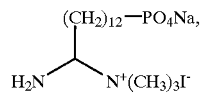
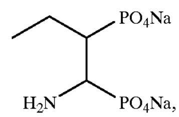
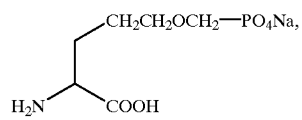
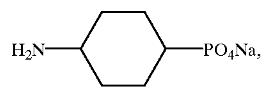
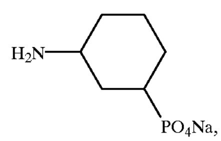
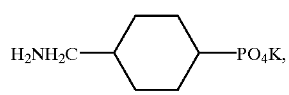
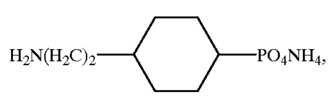
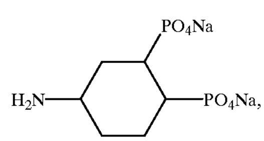
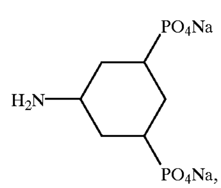

-continued

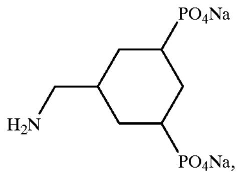

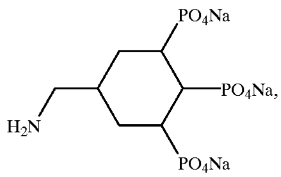

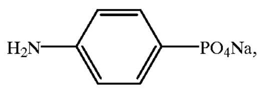

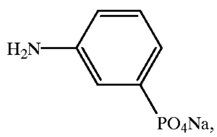

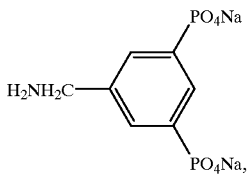

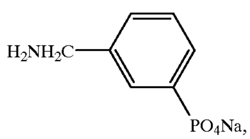

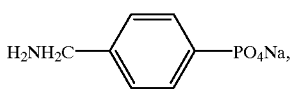

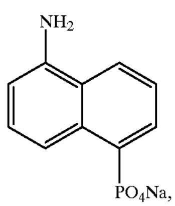

$HS—CH_2PO_4Na$, $HS—(CH_2)_2PO_4Na$, $HS—(CH_2)_3PO_4Na$, $HS—CH_2CH(CH_3)PO_4Na$, $HS—CH_2CH(C_2H_5)PO_4Na$,

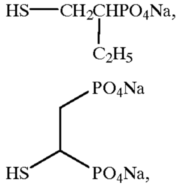

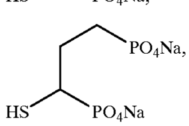

-continued

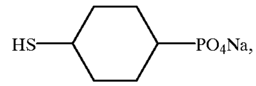

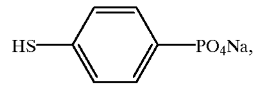

$HO—CH_2PO_4Na$, $HO—(CH_2)_2PO_4Na$, $HO—(CH_2)_3PO_4Na$, $HO—CH_2CH(CH_3)PO_4Na$, $HO—CH_2CH(C_2H_5)PO_4Na$,

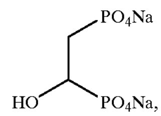

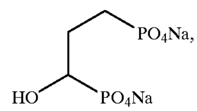

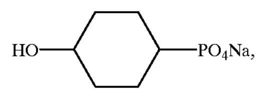

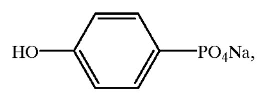

$H_2N—CH_2NHSO_3Na$, $H_2N—(CH_2)_2NHSO_3K$, $H_2N—(CH_2)_3NHSO_3Na$, $H_2N—(CH_2)_4NHSO_3Li$, $H_2N—(CH_2)_5NHSO_3Na$, $H_2N—(CH_2)_6NHSO_3Na$, $H_2N—(CH_2)_7NHSO_3K$, $H_2N—(CH_2)_8NHSO_3Na$, $H_2N—(CH_2)_9NHSO_3Na$, $H_2N—(CH_2)_{10}NHSO_3NH_4$, $H_2N—(CH_2)_{11}NHSO_3Na$, $H_2N—(CH_2)_{12}NHSO_3Na$, $H_2N—CH_2CH(CH_3)NHSO_3Na$, $H_2N—CH_2CH(C_2H_5)NHSO_3Na$, $H_2N—CH_2CH(C_3H_7)NHSO_3Li$, $H_2N—CH_2CH(C_4H_9)NHSO_3Na$, $H_2N—CH_2CH(OH)NHSO_3Na$,

-continued
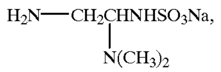
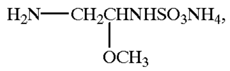
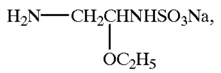
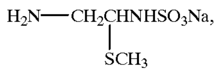
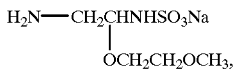
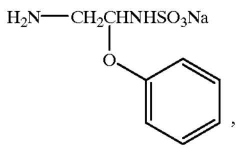
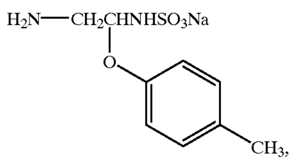
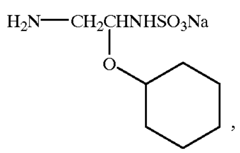
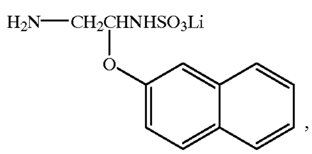
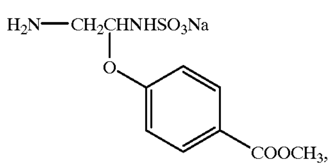
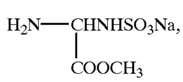
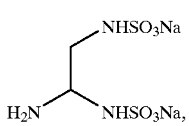
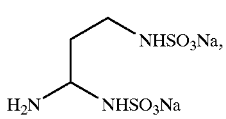
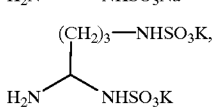
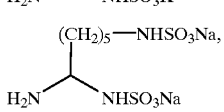
-continued
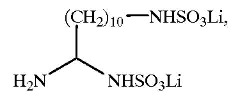
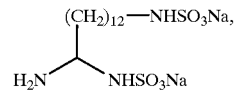
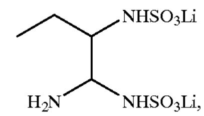
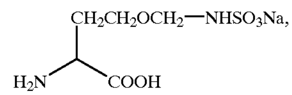
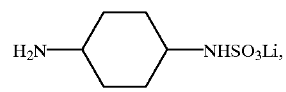
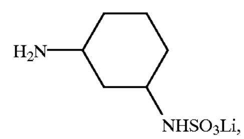
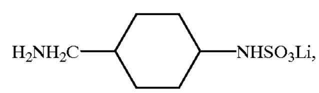
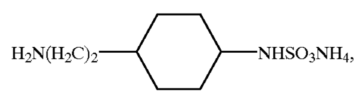
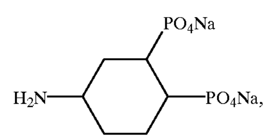
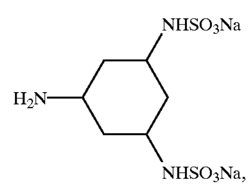
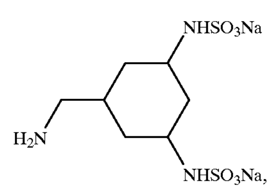
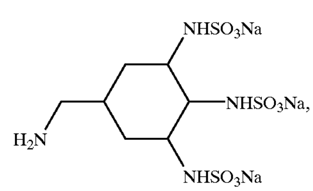
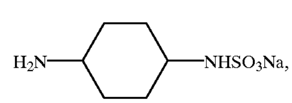

-continued

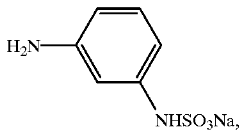

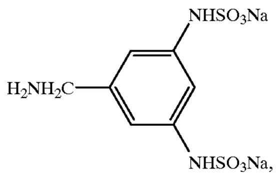

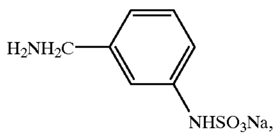

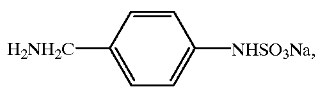

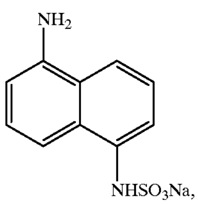

$HS-CH_2NHSO_3Na,$ $HS-(CH_2)_2NHSO_3Na,$ $HS-(CH_2)_3NHSO_3Na,$ $HS-CH_2\underset{\underset{\displaystyle CH_3}{|}}{C}HNHSO_3Na,$ $HS-CH_2\underset{\underset{\displaystyle C_2H_5}{|}}{C}HNHSO_3Na,$

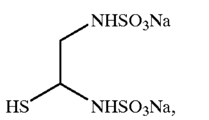

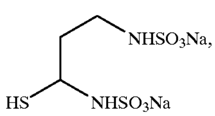

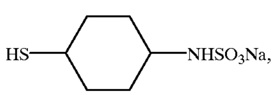

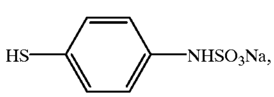

$HO-CH_2NHSO_3Na,$ $HO-(CH_2)_2NHSO_3Na,$ $HO-(CH_2)_3NHSO_3Na,$ $HO-CH_2\underset{\underset{\displaystyle CH_3}{|}}{C}HNHSO_3Na,$ $HO-CH_2\underset{\underset{\displaystyle C_2H_5}{|}}{C}HNHSO_3Na,$ -continued

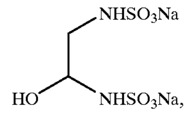

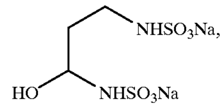

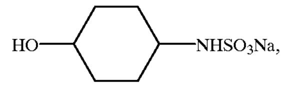

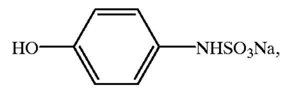

$H_2N-CH_2COSNa,$ $H_2N-(CH_2)_2COSK,$ $H_2N-(CH_2)_3COSNa,$ $H_2N-(CH_2)_4COSLi,$ $H_2N-(CH_2)_5COSNa,$ $H_2N-(CH_2)_6COSNa,$ $H_2N-(CH_2)_7COSK,$ $H_2N-(CH_2)_8COSNa,$ $H_2N-(CH_2)_9COSNa,$ $H_2N-(CH_2)_{10}COSNH_4,$ $H_2N-(CH_2)_{11}COSNa,$ $H_2N-(CH_2)_{12}COSNa,$ $H_2N-CH_2\underset{\underset{\displaystyle CH_3}{|}}{C}HCOSNa,$ $H_2N-CH_2\underset{\underset{\displaystyle C_2H_5}{|}}{C}HCOSNa,$ $H_2N-CH_2\underset{\underset{\displaystyle C_3H_7}{|}}{C}HCOSLi,$ $H_2N-CH_2\underset{\underset{\displaystyle C_4H_9}{|}}{C}HCOSNa,$ $H_2N-CH_2\underset{\underset{\displaystyle OH}{|}}{C}HCOSNa,$ $H_2N-CH_2\underset{\underset{\displaystyle N(CH_3)_2}{|}}{C}HCOSNa,$ $H_2N-CH_2\underset{\underset{\displaystyle OCH_3}{|}}{C}HCOSNH_4,$ $H_2N-CH_2\underset{\underset{\displaystyle OC_2H_5}{|}}{C}HCOSNa,$ $H_2N-CH_2\underset{\underset{\displaystyle SCH_3}{|}}{C}HCOSNa,$ $H_2N-CH_2\underset{\underset{\displaystyle OCH_2CH_2OCH_3}{|}}{C}HCOSNa,$ -continued
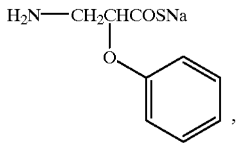
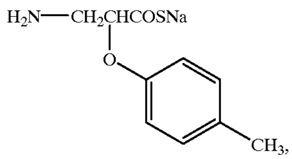
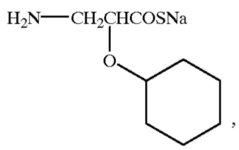
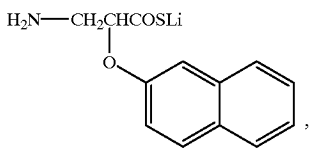
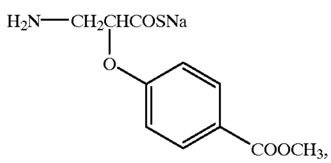
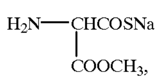
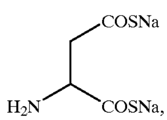
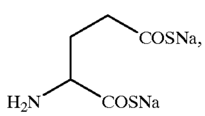
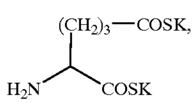
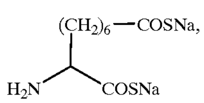
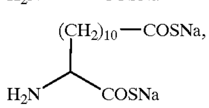
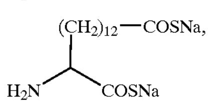
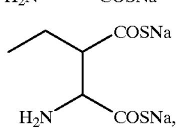
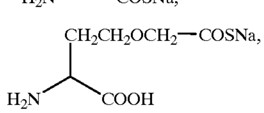
-continued
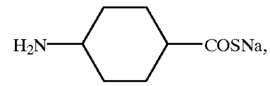
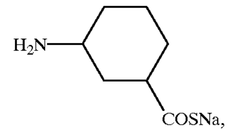
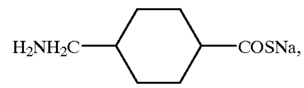
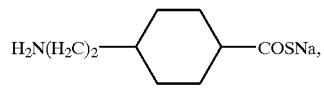
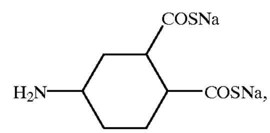
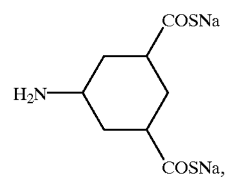
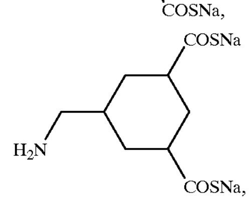
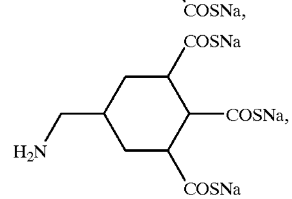
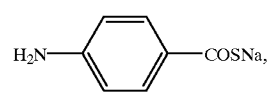
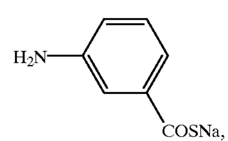
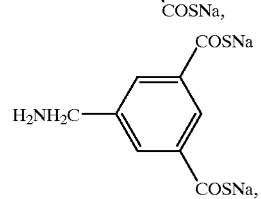
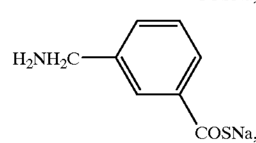
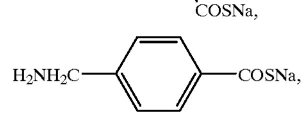

-continued

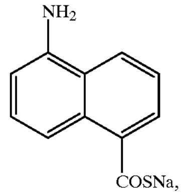

$HS-CH_2COSNa$, $HS-(CH_2)_2COSNa$, $HS-(CH_2)_3COSNa$, $HS-CH_2CHCOSNa$, (with $CH_3$ branch on CH)

$HS-CH_2CHCOSNa$, (with $C_2H_5$ branch on CH)

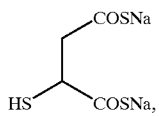

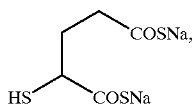

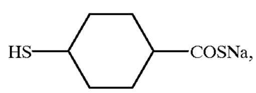

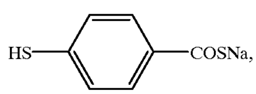

$HO-CH_2COSNa$, $HO-(CH_2)_2COSNa$, $HO-(CH_2)_3COSNa$, $HO-CH_2CHCOSNa$, (with $CH_3$ branch on CH)

$HO-CH_2CHCOSNa$, (with $C_2H_5$ branch on CH)

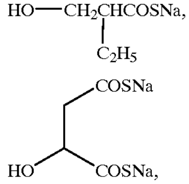

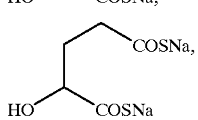

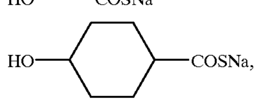

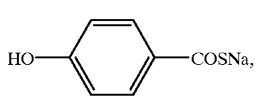

$H_2N-CH_2CSSNa$, $H_2N-(CH_2)_2CSSK$, $H_2N-(CH_2)_3CSSNa$, $H_2N-(CH_2)_4CSSLi$,

-continued $H_2N-(CH_2)_5CSSNa$, $H_2N-(CH_2)_6CSSNa$, $H_2N-(CH_2)_7CSSK$, $H_2N-(CH_2)_8CSSNa$, $H_2N-(CH_2)_9CSSNa$, $H_2N-(CH_2)_{10}CSSNH_4$, $H_2N-(CH_2)_{11}CSSNa$, $H_2N-(CH_2)_{12}CSSNa$, $H_2N-CH_2CHCSSNa$, (with $CH_3$ branch on CH)

$H_2N-CH_2CHCSSNa$, (with $C_2H_5$ branch on CH)

$H_2N-CH_2CHCSSLi$, (with $C_3H_7$ branch on CH)

$H_2N-CH_2CHCSSNa$, (with $C_4H_9$ branch on CH)

$H_2N-CH_2CHCSSNa$, (with $OH$ branch on CH)

$H_2N-CH_2CHCSSNa$, (with $N(CH_3)_2$ branch on CH)

$H_2N-CH_2CHCSSNH_4$, (with $OCH_3$ branch on CH)

$H_2N-CH_2CHCSSNa$, (with $OC_2H_5$ branch on CH)

$H_2N-CH_2CHCSSNa$, (with $SCH_3$ branch on CH)

$H_2N-CH_2CHCSSNa$ (with $OCH_2CH_2OCH_3$ branch on CH),

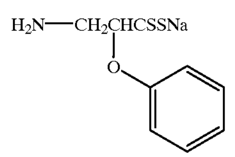

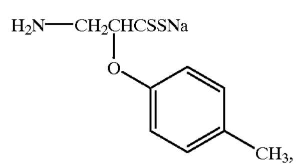

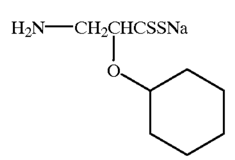

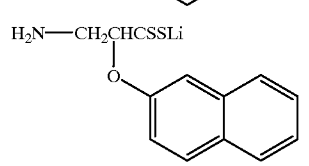

-continued
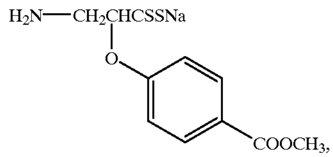
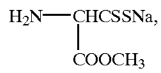
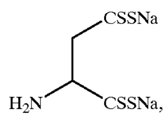
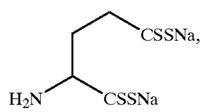
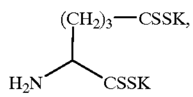
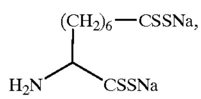
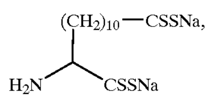
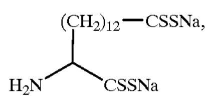
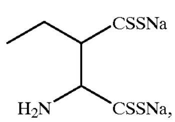
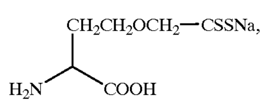
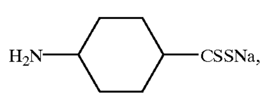
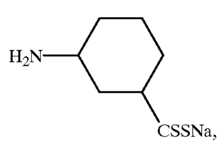
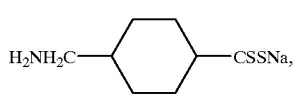
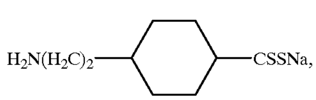
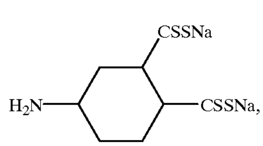
-continued
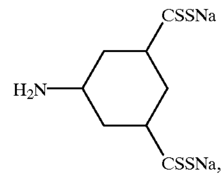
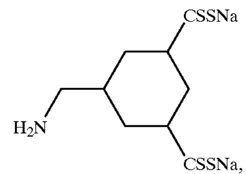
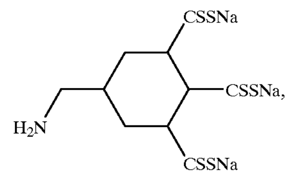
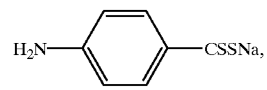
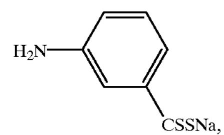
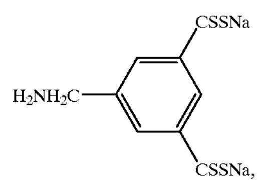
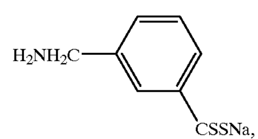
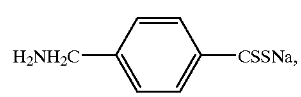
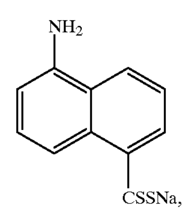
HS—$CH_2CSSNa$,
HS—$(CH_2)_2CSSNa$,
HS—$(CH_2)_3CSSNa$,
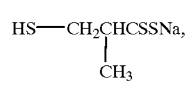
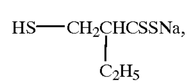

-continued

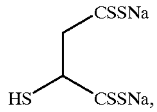

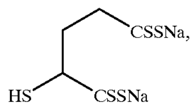

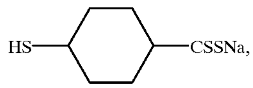

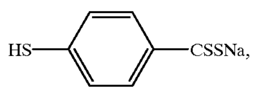

HO—$CH_2CSSNa$,

HO—$(CH_2)_2CSSNa$,

HO—$(CH_2)_3CSSNa$,

HO—$CH_2CHCSSNa$,
 |
 $CH_3$

HO—$CH_2CHCSSNa$,
 |
 $C_2H_5$

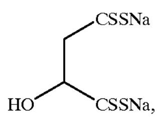

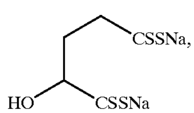

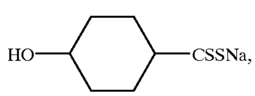

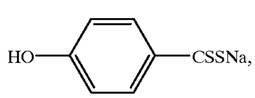

$H_2N$—$CH_2OPO_3Na$, $H_2N$—$(CH_2)_2OPO_3K$, $H_2N$—$(CH_2)_3OPO_3Na$, $H_2N$—$(CH_2)_4OPO_3Li$, $H_2N$—$(CH_2)_5OPO_3Na$, $H_2N$—$(CH_2)_6OPO_3Na$, $H_2N$—$(CH_2)_7OPO_3K$, $H_2N$—$(CH_2)_8OPO_3Na$, $H_2N$—$(CH_2)_9OPO_3Na$, $H_2N$—$(CH_2)_{10}OPO_3NH_4$, $H_2N$—$(CH_2)_{11}OPO_3Na$, $H_2N$—$(CH_2)_{12}OPO_3Na$, $H_2N$—$CH_2CHOPO_3Na$,
 |
 $CH_3$ $H_2N$—$CH_2CHOPO_3Na$,
 |
 $C_2H_5$

-continued $H_2N$—$CH_2CHOPO_3Li$,
 |
 $C_3H_7$ $H_2N$—$CH_2CHOPO_3Na$,
 |
 $C_4H_9$ $H_2N$—$CH_2CHOPO_3Na$,
 |
 OH $H_2N$—$CH_2CHOPO_3Na$,
 |
 $N(CH_3)_2$ $H_2N$—$CH_2CHOPO_3NH_4$,
 |
 $OCH_3$ $H_2N$—$CH_2CHOPO_3Na$,
 |
 $OC_2H_5$ $H_2N$—$CH_2CHOPO_3Na$,
 |
 $SCH_3$ $H_2N$—$CH_2CHOPO_3Na$
 |
 $OCH_2CH_2OCH_3$,

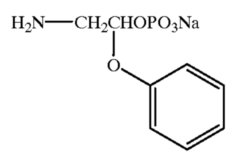

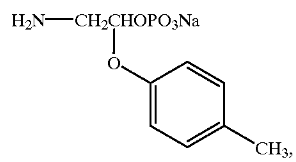

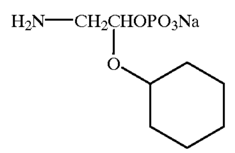

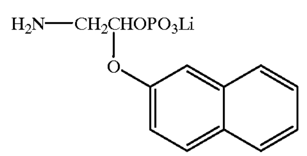

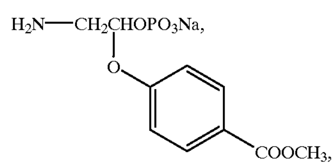

$H_2N$—$CHOPO_3Na$,
 |
 $COOCH_3$

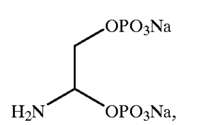

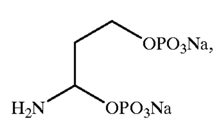

-continued
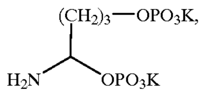
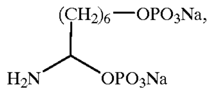
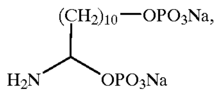
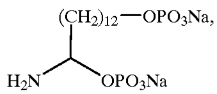
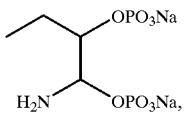
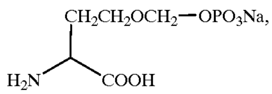
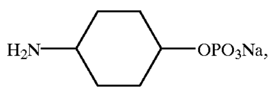
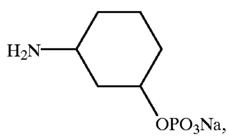
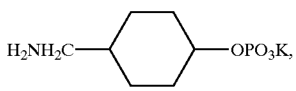
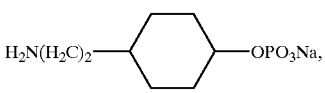
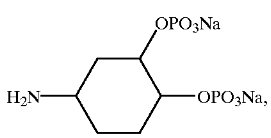
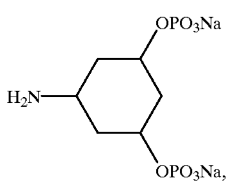
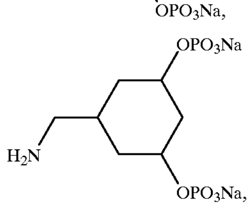
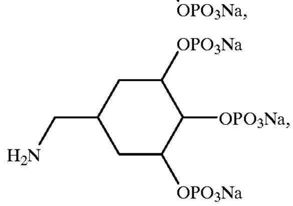
-continued
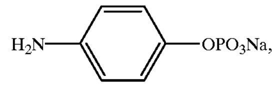
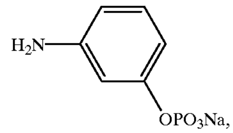
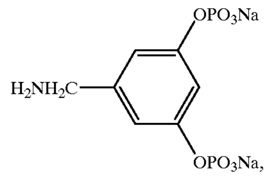
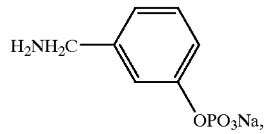
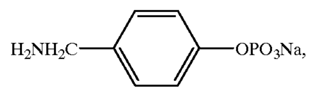
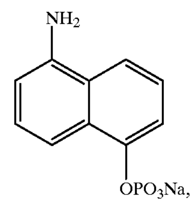
HS—$CH_2OPO_3Na$,
HS—$(CH_2)_2OPO_3Na$,
HS—$(CH_2)_3OPO_3Na$,
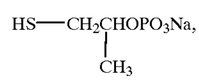
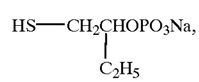
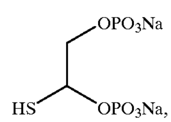
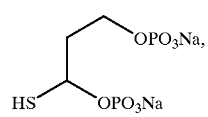
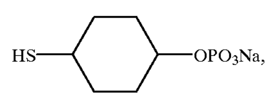
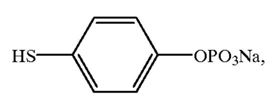
HO—$CH_2OPO_3Na$,
HO—$(CH_2)_2OPO_3Na$,
HO—$(CH_2)_3OPO_3Na$, -continued

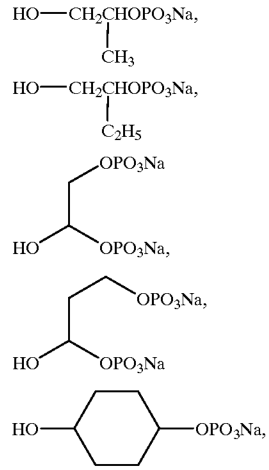

and

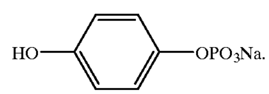

These reaction reagents can be used either singly or in combination.

Next, examples of reaction reagents usable upon introduction of pendant groups, which contain glycino groups, will be mentioned. These illustrative reaction reagents can include basic amino acids such as lysine and ornithine, C-substituted derivatives of basic amino acids, such as their esters, aspartic acid-L-phenyl-alanine dimer (aspartame), allo-threonine, ergo-thioneine, kynurenine, cysteine, 3,4-dihydroxyphenylalanine, 3,5-diiodotyrosine, serine, thyroxine, thyrosine, tryptophan, threonine, histidine, hydroxylysine, and homoserine.

Among these, those containing an amino group, which has high reactivity with an imide ring and can react with the imide ring under mild conditions, that is, basic amino acids, such as lysine and ornithine, and C-substituted derivatives of basic amino acids, such as basic amino acid esters, are preferred.

Basic amino acid esters, alkaline metal salts of basic amino acids and the like can react as bifunctional compounds so that they tend to become cross-linking groups because the two amino groups of them have high reactivity. Therefore, it is necessary to s top the reaction after the reaction of the one group but before the second reaction. In conclusion, it is difficult to exactly control the cross-linking reaction and introduction reaction of pendant groups, and it is not usable for manufacturing polymers wherein the cross-linking degrees thereof must be exactly controlled. In order to distinguish pendant groups from cross-linking groups, it is preferable to use pendant groups such as lysine and ornithine having lower reactivity and to use cross-linking groups having higher reactivity.

These reaction reagents can be used either singly or in combination.

Examples of reaction reagents, each of which is usable in a reaction for the introduction of pendant groups containing cationic groups, will next be shown.

$H_2N{-}CH_2N^+(CH_3)_3{\bullet}I^-$, $H_2N{-}(CH_2)_2N^+(CH_3)_3{\bullet}I^-$,

-continued $H_2N{-}(CH_2)_3N^+(CH_3)_3{\bullet}Br^-$, $H_2N{-}(CH_2)_4N^+(CH_3)_3{\bullet}Cl^-$, $H_2N{-}(CH_2)_5N^+(CH_3)_3{\bullet}I^-$, $H_2N{-}(CH_2)_6N^+(CH_3)_3{\bullet}I^-$, $H_2N{-}(CH_2)_7N^+(CH_3)_3{\bullet}I^-$, $H_2N{-}(CH_2)_8N^+(CH_3)_3{\bullet}I^-$, $H_2N{-}(CH_2)_9N^+(CH_3)_3{\bullet}I^-$, $H_2N{-}(CH_2)_{10}N^+(CH_3)_3{\bullet}I^-$, $H_2N{-}(CH_2)_{11}N^+(CH_3)_3{\bullet}I^-$, $H_2N{-}(CH_2)_{12}N^+(CH_3)_3{\bullet}I^-$,

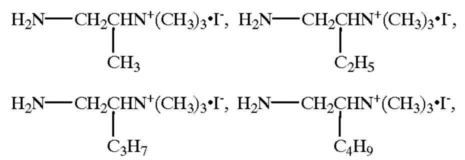

$H_2N{-}CH_2N^+(C_2H_5)_3{\bullet}I^-$, $H_2N{-}(CH_2)_2N^+(C_3H_7)_3{\bullet}I^-$, $H_2N{-}(CH_2)_3N^+(C_4H_9)_3{\bullet}I^-$, $H_2N{-}(CH_2)_3N^+(C_4H_9)_3{\bullet}(SO_4)_{1/2}^-$,

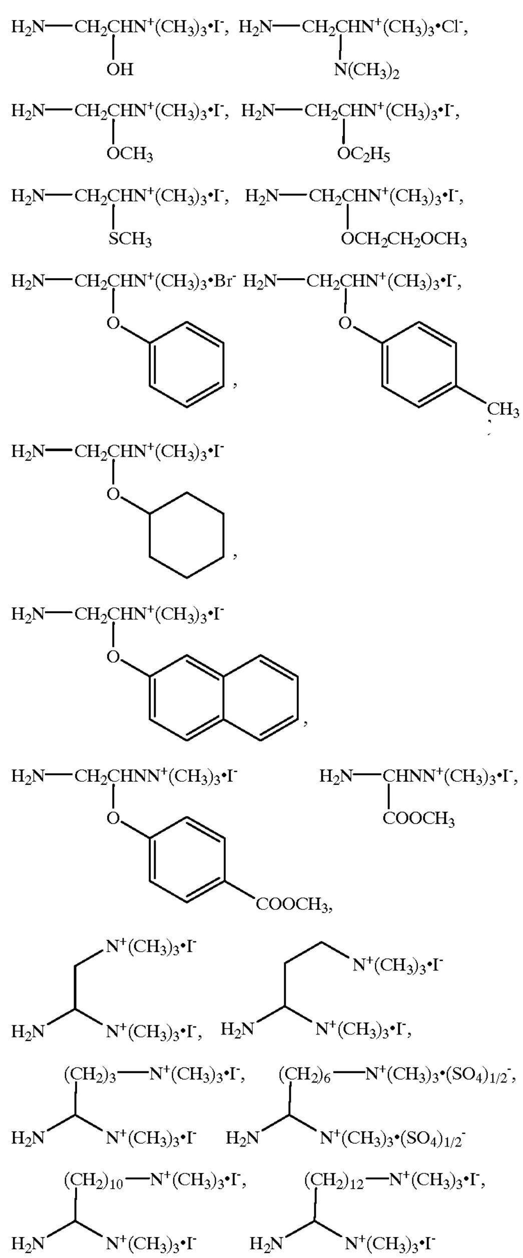

-continued

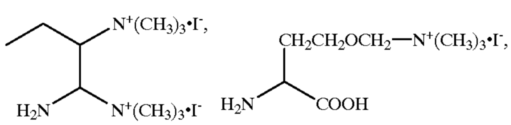

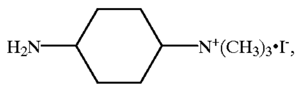

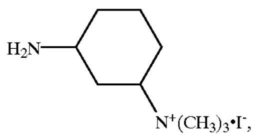

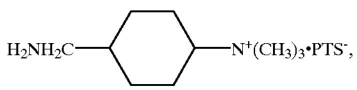

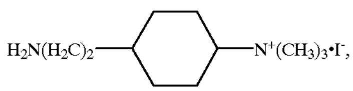

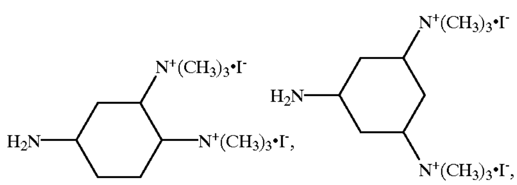

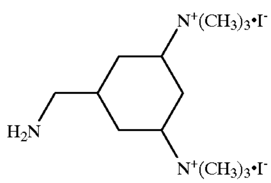

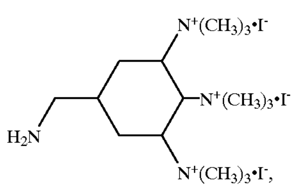

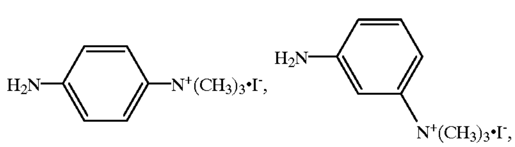

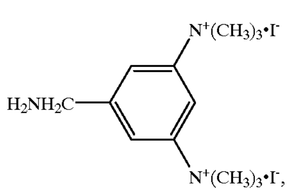

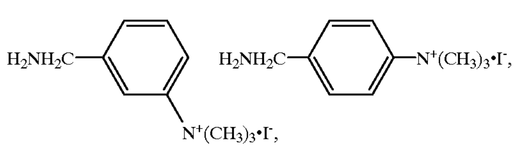

-continued

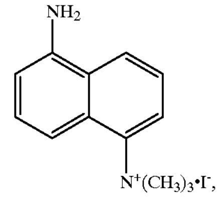

$HS-CH_2N^{+}(CH_3)_3\cdot I^{-}$, $HS-(CH_2)_2N^{+}(CH_3)_3\cdot I^{-}$, $HS-(CH_2)_3N^{+}(CH_3)_3\cdot I^{-}$,

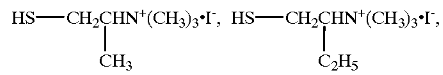

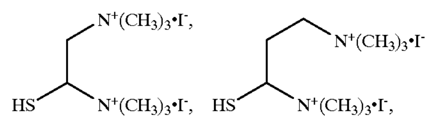

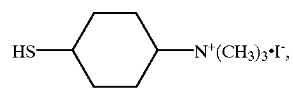

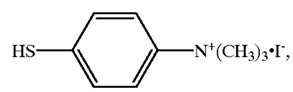

$HO-CH_2N^{+}(CH_3)_3\cdot I^{-}$, $HO-(CH_2)_2N^{+}(CH_3)_3\cdot I^{-}$, $HO-(CH_2)_3N^{+}(CH_3)_3\cdot I^{-}$, $HO-(CH_2)_3N^{+}(CH_3)_3\cdot I^{-}$,

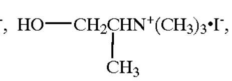

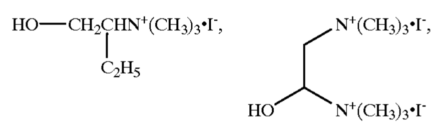

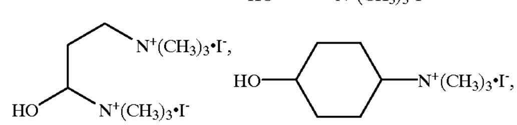

and

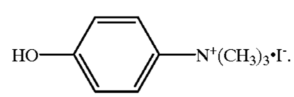

Further examples of reaction reagents, which can be used for the introduction of cationic groups, include guanidine and salts thereof, aminoguanidine and salts thereof, and arginine, which are reaction reagents containing a guanidyl group.

The reaction reagents can be used either singly or in combination.

In addition, examples of reaction reagents, which are usable upon introduction of pendant groups containing betaine groups, will be shown below.

$H_2N-CH_2N^{+}(CH_3)_2-CH_2COO^{-}$, $H_2N-(CH_2)_2N^{+}(CH_3)_2-CH_2COO^{-}$, $H_2N-(CH_2)_3N^{+}(CH_3)_2-CH_2COO^{-}$, $H_2N-(CH_2)_4N^{+}(CH_3)_2-CH_2COO^{-}$, $H_2N-(CH_2)_5N^{+}(CH_3)_2-CH_2COO^{-}$, $H_2N-(CH_2)_6N^{+}(CH_3)_2-CH_2COO^{-}$,

-continued $H_2N-(CH_2)_7N^+(CH_3)_2-CH_2COO^-$, $H_2N-(CH_2)_8N^+(CH_3)_2-CH_2COO^-$, $H_2N-(CH_2)_9N^+(CH_3)_2-CH_2COO^-$, $H_2N-(CH_2)_{10}N^+(CH_3)_2-CH_2COO^-$, $H_2N-(CH_2)_{11}N^+(CH_3)_2-CH_2COO^-$, $H_2N-(CH_2)_{12}N^+(CH_3)_2-CH_2COO^-$, $H_2N-CH_2N^+(C_2H_5)_2-CH_2COO^-$, $H_2N-(CH_2)_2N^+(C_3H_7)_2-CH_2COO^-$, $H_2N-(CH_2)_3N^+(C_4H_9)_2-CH_2COO^-$, $H_2N-CH_2N^+(CH_3)_2-(CH_2)_2COO^-$, $H_2N-CH_2N^+(CH_3)_2-(CH_2)_3COO^-$, $H_2N-CH_2N^+(CH_3)_2-(CH_2)_4COO^-$, $H_2N-CH_2N^+(CH_3)_2-(CH_2)_5COO^-$, $H_2N-CH_2N^+(CH_3)_2-(CH_2)_6COO^-$, $H_2N-CH_2N^+(CH_3)_2-(CH_2)_7COO^-$, $H_2N-CH_2N^+(CH_3)_2-(CH_2)_8COO^-$, $H_2N-CH_2N^+(CH_3)_2-(CH_2)_9COO^-$, $H_2N-CH_2N^+(CH_3)_2-(CH_2)_{10}COO^-$, $H_2N-CH_2CHN^+(CH_3)_2-CH_2COO^-$,
$CH_3$ $H_2N-CH_2CHN^+(CH_3)_2-CH_2COO^-$,
$C_2H_5$ $H_2N-CH_2CHN^+(CH_3)_2-CH_2COO^-$,
$C_3H_7$ $H_2N-CH_2CHN^+(CH_3)_2-CH_2COO^-$,
$C_4H_9$ $H_2N-CH_2CHN^+(CH_3)_2-CH_2COO^-$,
OH $H_2N-CH_2CHN^+(CH_3)_2-CH_2COO^-$,
$N(CH_3)_2$ $H_2N-CH_2CHN^+(CH_3)_2-CH_2COO^-$,
$N(C_2H_5)_2$ $H_2N-CH_2CHN^+(CH_3)_2-CH_2COO^-$,
$OCH_3$ $H_2N-CH_2CHN^+(CH_3)_2-CH_2COO^-$,
$OC_2H_5$ $H_2N-CH_2CHN^+(CH_3)_2-CH_2COO^-$,
$SCH_3$ $H_2N-CH_2CHN^+(CH_3)_2-CH_2COO^-$,
$OCH_2CH_2OCH_3$ -continued

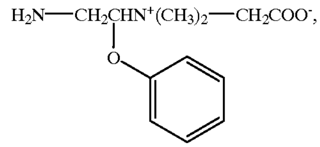

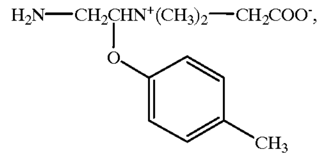

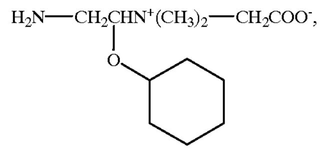

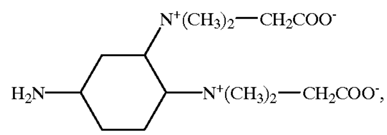

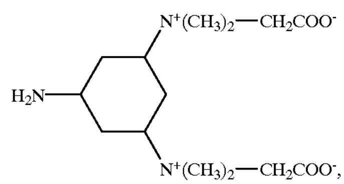

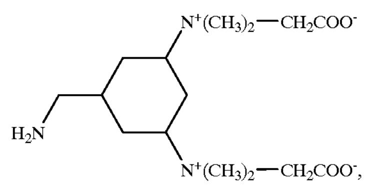

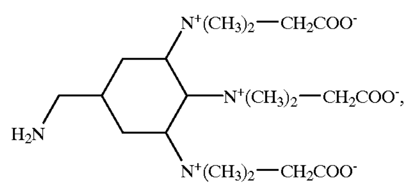

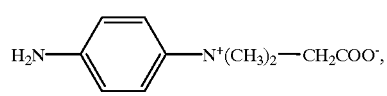

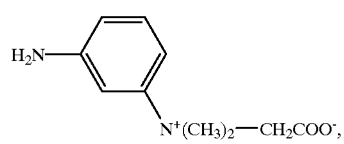

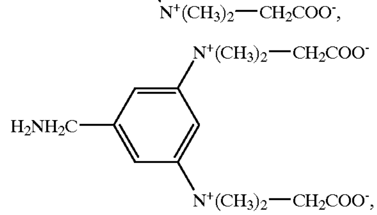

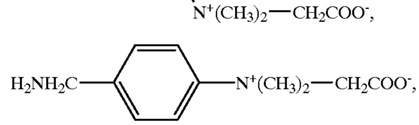

-continued

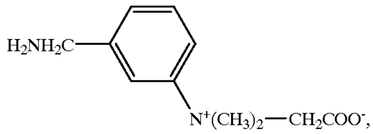

$H_2N-CH_2N^+(CH_3)_2-CH_2SO_3^-$, $H_2N-(CH_2)_2N^+(CH_3)_2-CH_2SO_3^-$, $H_2N-(CH_2)_3N^+(CH_3)_2-CH_2SO_3^-$, $H_2N-(CH_2)_4N^+(CH_3)_2-CH_2SO_3^-$, $H_2N-(CH_2)_5N^+(CH_3)_2-CH_2SO_3^-$, $H_2N-(CH_2)_6N^+(CH_3)_2-CH_2SO_3^-$, $H_2N-CH_2N^+(C_2H_5)_2-CH_2SO_3^-$, $H_2N-(CH_2)_2N^+(C_3H_7)_2-CH_2SO_3^-$, $H_2N-CH_2N^+(CH_3)_2-(CH_2)_2SO_3^-$, $H_2N-CH_2N^+(CH_3)_2-(CH_2)_3SO_3^-$, $H_2N-CH_2N^+(CH_3)_2-(CH_2)_4SO_3^-$, $H_2N-CH_2N^+(CH_3)_2-(CH_2)_5SO_3^-$,

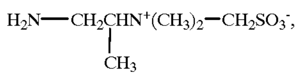

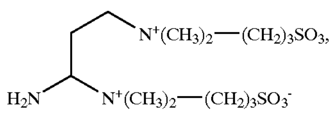

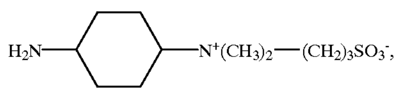

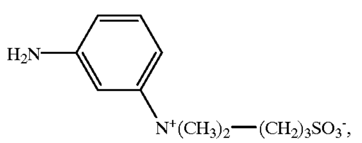

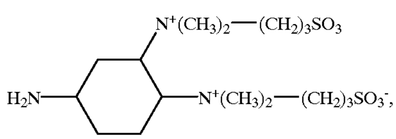

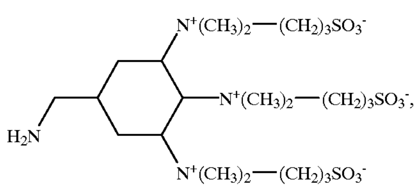

$H_2N-CH_2N^+(CH_3)_2-(CH_2)_2PO_3^-Na$, $H_2N-(CH_2)_2N^+(CH_3)_2-(CH_2)_2PO_3^-Na$, $H_2N-(CH_2)_3N^+(CH_3)_2-(CH_2)_2PO_3^-Na$, $H_2N-(CH_2)_4N^+(CH_3)_2-(CH_2)_2PO_3^-Na$, $H_2N-(CH_2)_5N^+(CH_3)_2-(CH_2)_2PO_3^-Na$, $H_2N-(CH_2)_6N^+(CH_3)_2-(CH_2)_2PO_3^-Na$, $H_2N-CH_2N^+(C_2H_5)_2-(CH_2)_2PO_3^-Na$, $H_2N-(CH_2)_2N^+(C_3H_7)_2-(CH_2)_2PO_3^-Na$, $H_2N-CH_2N^+(CH_3)(C_2H_5)-(CH_2)_2PO_3^-Na$,

-continued $H_2N-CH_2N^+(CH_3)_2-(CH_2)_3PO_3^-Na$, $H_2N-CH_2N^+(CH_3)_2-(CH_2)_4PO_3^-Na$, $H_2N-CH_2N^+(CH_3)_2-(CH_2)_5PO_3^-Na$,

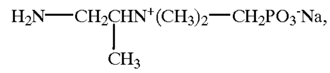

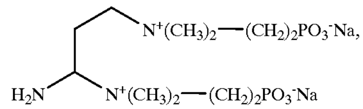

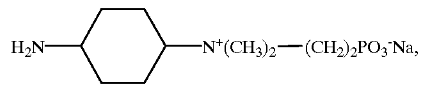

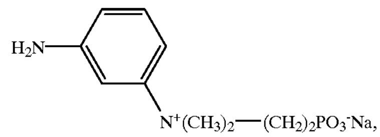

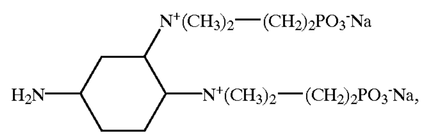

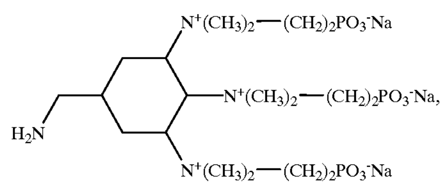

These reaction reagents can be used either singly or in combination.

The pendant groups can be introduced in a single step. As an alternative, it can be conducted by a multi-step method that substituent groups are once introduced and different substituent groups are reacted to convert the first-mentioned substituent groups into the pendant groups.

When an amine, thiol or alcohol containing a cationic group and an amine, thiol or alcohol containing an anionic group are used, no particular limitation is imposed on the ratio of cationic groups to anionic groups to be used. The resulting polymer is amphoteric when their ratio is close to 1 but is cationic or anionic when their ratio is greater than 1 or smaller than 1, although the ionic property of the resulting polymer varies depending on the reactivity of the reaction reagent. It is therefore desired to choose an appropriate ratio in accordance with the application purpose and the use environment.

Examples of reaction reagents, which are usable in the pendant-group-introducing reaction and contain precursors of cationic groups or betaine groups, will be described subsequently under (6).

After the pendant-introducing reaction, the reaction product may be taken out of the reaction system or, if necessary, may continuously be subjected to a cross-linking reaction, a substitution reaction into acidic groups, a cationization reaction or a betainization reaction. If the reaction product is taken out of the reaction system, the reaction product may be dried and then used in some instances.

Subsequent to the pendant-group-introducing reaction, a part of imide rings in the reaction product may be hydrolyzed in some instances.

(5-1) Method for reacting polysuccinimide with an amine or the like containing one or more specific functional group; and No particular limitation is imposed on a solvent to be used in a reaction for introducing pendant groups in polysuccinimide. Any solvent can be used, insofar as it can dissolve polysuccinimide or a polysuccinimide derivative or it can dissolve a reaction reagent which can form pendant groups. Solvents commonly employed in chemical reactions are all usable.

Among such solvents, one capable of dissolving polysuccinimide is preferred when pendant groups are introduced concurrently with cross-linking or prior to cross-linking. Specific examples are as exemplified above under (4-1) in connection with the cross-linking method of polysuccinimide.

When a cross-linking reaction has been conducted beforehand, the cross-linked product itself has already become insoluble practically in all solvents. A solvent capable of dissolving a reaction reagent, which can form pendant groups, is therefore preferred. Although the above-described solvents can be used as such reaction solvents, polar solvents are preferred especially for specific-functional-group-containing reaction reagents because these reaction reagents have high polarity. Among these, water, methanol, ethanol, propanol, isopropanol, acetone and the like are preferred, with water being particularly preferred.

However, when water is employed, the reaction mixture turns to a gel as the pendant-group-introducing reaction proceeds, thereby making it no longer possible to perform uniform stirring. In this case, use of a poor solvent, such as methanol, ethanol, isopropanol or acetone, in combination with water is preferred because the swelling degree of the gel is lowered to permit smooth stirring.

These solvents can be used either singly or in combination.

Further, with a view to dispersing the raw materials or reaction product in the pendant-group-introducing reaction or for a like purpose, a poor solvent or the like, which cannot dissolve or can only sparingly dissolve polysuccinimide, can be added as needed.

No particular limitation is imposed on the poor solvent. Solvents commonly employed in chemical reactions are all usable. Specific examples of poor solvents are as exemplified above in connection with the cross-linking method of polysuccinimide under (4-1). It is to be noted that whether these solvents act as poor solvents or good solvents is determined depending not only on the polysuccinimide but also on a polyaspartic acid derivative in which pendant groups have been introduced. Accordingly, whether these solvents act as poor solvents or good solvents also varies dependent on pendant groups to be introduced.

The concentration of polysuccinimide or cross-linked polysuccinimide upon production of a polysuccinimide derivative may preferably be from 0.1 to 50 wt. %, notably from 1 to 40 wt. %, although no particular limitation is imposed thereon.

The cross-linking reaction or the pendant-group-introducing reaction may be conducted by using a catalyst if necessary.

As the catalyst, a base catalyst or an acid catalyst is generally employed.

Illustrative of the base catalyst can be inorganic base reagents, for example, alkali metal hydroxides such as sodium hydroxide, potassium hydroxide and lithium hydroxide, alkali metal carbonates such as sodium carbonate, potassium carbonate and lithium carbonate, alkali metal hydrogencarbonates such as sodium hydrogencarbonate and potassium hydrogencarbonate, alkali metal acetates such as sodium acetate and potassium acetate, alkali metal salts such as sodium oxalate, and ammonia; and organic base reagents, for example, amines such as trimethylamine, triethylamine, tripropylamine, tributylamine, tripentylamine, trihexylamine, triethanolamine, tripropanolamine, tributanolamine, tripentanolamine, trihexanolamine, dimethylamine, diethylamine, dipropylamine, dibutylamine, dipentylamine, dihexylamine, dicyclohexylamine, dibenzylamine, ethylmethylamine, methylpropylamine, butylmethylamine, methylpentylamine, methylhexylamine, pyridine, picoline and quinoline.

Specific examples of the acid catalyst can include inorganic acids such as hydrochloric acid, hydrobromic acid, hydroiodic acid, sulfuric acid, sulfurous acid, nitric acid, nitrous acid, carbonic acid and phosphoric acid; carboxylic acids such as formic acid, acetic acid, propionic acid, oxalic acid and benzoic acid; sulfonic acids such as methanesulfonic acid, trifluoromethanesulfonic acid, benzenesulfonic acid and toluenesulfonic acid; and phosphonic acids such as benzenephosphonic acid. They can be used either singly or in combination.

Upon reaction for introducing pendant groups, the reaction temperature may preferably be from 0 to 120° C. with 10 to 60° C. being particularly preferred, although no particular limitation is imposed thereon.

(5-2) Method for reacting an acidic polyamino acid with an amine or the like containing a specific functional group A method including dehydrating condensation of the above reaction reagent and an acidic polyamino acid is a general method for introducing pendant groups into an acidic polyamino acid.

In the case of acidic groups, the acidic groups themselves may react with an amine or the like under certain reaction conditions in the method that an acidic polyamino acid and an amine or the like containing an acidic group are subjected to dehydrating condensation. Namely, extension of side chain groups takes place but, as a consequence, hydrophilic groups become fewer, leading to a reduction in water absorption. The above reaction is therefore not preferred. There is however a case that stronger gel can be formed owing to an increased molecular weight.

Dehydrating condensation can be conducted by removing resulting water through its azeotropic distillation with a solvent, adding a molecular sieve as a dehydrating agent, conducting the reaction while using a dehydrating condensing agent, or using an enzyme. Further, it is also possible to combine aspartic acid and the cross-linking agent into an intimate mixture and then to conduct the reaction in a solid-phase state free of any solvent.

Examples of the condensing agent, the reaction temperature, the esterification, amidation or thioamidation method, and the like are as described above under (4-2) in connection with the cross-linking method of an acidic polyamino acid.

(5-3) Method for reacting a polyaspartate ester with an amine or the like containing a specific functional group As a method for cross-linking an acidic polyamino acid ester, it is general to react a cross-linking agent and the acidic polyamino acid ester in an organic solvent although the cross-linking method is not specifically limited thereto. Illustrative of usable esters can be esters with alcohols containing small groups such as methyl and ethyl, alcohols containing electron-attractive groups such as chloromethyl and dichloromethyl, and alcohols such as N-hydroxysuccinimide.

In some instances, a catalyst such as an acid catalyst, a base catalyst or the like may be used. A phase transfer catalyst may also be used provided that the reaction system becomes non-homogeneous or the raw materials are insoluble.

(6) Cationization Reaction and Betainization Reaction

Cationization reaction and betainization reaction in the present invention is a method for reacting a precursor which can form a cationic group and/or a betaine group in the pendant group of the polymer, with a cationizing agent or betainizing agent. The substituent group that can become a cationic group and/or a betaine group is called a "precursor" for the sake of convenience.

Hereinafter, introducing reaction of pendant group containing the precursor will be described. The reaction condition of the introducing reaction of pendant group containing the precursor may be the same as described in column (5-1), although no particular limitation is imposed on it.

Illustrative of the precursor which can form cationic groups can be those capable of forming ammonium, oxonium, sulfonium, selenonium, chloronium, bromonium or iodonium ions. From the standpoint of safety and production, precursors capable of forming ammonium ions are preferred. Examples of the precursors capable of forming ammonium ions can include primary amines, secondary amines, tertiary amines and cationizing agents. Although not limited specifically, primary amines, secondary amines and tertiary amines are preferred, with tertiary amines being particularly preferred.

Specific examples of tertiary amines will hereinafter be mentioned in terms of groups available therefrom: dimethylamino, diethylamino, dipropylamino, dibutylamino, dipentylamino, dihexylamino, diheptylamino dioctylamino, dinonylamino, didecylamino, diundecylamino, didodecylamino, ditridecylamino, ditetradecylamino, dipentadecylamino, dihexadecylamino, diheptyldecylamino, dioctyldecylamino, dimethylethylamino, dimethylcyclohexylamino, methylbenzylamino, dibenzylamino, methyl (methyloxycarbonylmethyl)amino, methyl (ethyloxycarbonylmethyl) amino, methyl (propyloxycarbonylmethyl)amino, methyl (butyloxycarbonylmethyl)amino, methyl (pentyloxycarbonylmethyl) amino, methyl (hexyloxycarbonylmethyl)amino, methyl (octyloxycarbonylmethyl) amino, methyl (phenyloxycarboylmethyl) amino, dimethyl (benzyloxycarbonylmethyl)amino, methyl (cyclohexyloxycarbonylmethyl) amino, methyl (naphtyloxycarbonylmethyl)amino, methyl (methyloxycarbonylmethyl)amino, bis (methyloxycarbonylmethyl)amino, methyl(ethyloxyethyl) amino, methyl(butyloxyethyl)amino, methyl (hexyloxyethyl)amino, methyl(phenyloxyethyl)amino, methyl (cyclohexyloxyethyl) amino, methyl (naphthyloxyethyl)amino, methyl(methyloxypropyl)amino, methyl(methyloxybutyl)amino, methyl(methyloxyoctyl) amino, methyl (methyloxyethyloxyethyl) amino, methyl (methyloxyethyloxybutyl)amino, methyl(methylthioethyl) amino, methyl(methylthiobutyl)amino, methyl (methylaminoethyl)amino, methyl (dimethylaminoethyl) amino, methyl(methylaminoethyl) amino, methyl (methylcarbonyloxyethyl)amino, methyl (methylcarbonylthioethyl)amino, methyl (methylthiocarbonylethyl)amino, methyl (N-acetylaminoethyl) amino, methyl(N,N-diacetylaminoethyl)amino, methyl (methylcarbonylthioethyl) amino, methyl (carbamonylethyl) amino, methyl(N-methylcarbamoylethyl)amino, methylphenylamino, and methyldiphenylamino.

Also included can be residual groups of nitrogen-containing cyclic compounds such as pyrrole, oxazole, isoxazole, thiazole, isothiazole, imidazole, pyrazole, frazane, pyridine, pyridazine, pyrimidine, pyrazine, pyrroline, pyrrolidine, imidazoline, imidazolidine, pyrazoline, pyrazolidine, piperidine, piperazine, morpholine, quinuclidine, indole, isoindole, indolidine, quinoline, isoquinoline, quinolidine, purine, indazole, quinazoline, cinnoline, quinoxaline, phthalazine, pteridine, carbazole, acridine, phenanthridine, phenazine, phenothiadine, phenoxadine, indoline, and isoindoline.

Among these, those having substituent group or groups of smaller molecular weight(s) are preferred because they having higher hydrophilicity and greater water absorption per unit weight. For example, dimethylamino, diethylamino, dipropylamino, dibutylamino and guanidyl groups are preferred.

No particular limitation is imposed on their substituting positions on pendant groups.

The reaction reagent usable in the reaction for introducing pendant groups which contain precursors capable of forming cationic groups can be an amine, thiol or alcohol which contains at least one cationic group. Its examples will hereinafter be shown. It is to be noted that, for the sake of convenience, they will be listed with cationic groups substituted by hydrogen atoms.

$H_2NCH_3$, $H_2NCH_2CH_3$, $H_2NCH_2CH_2CH_3$, $H_2NCH_2CH_2CH_2CH_3$, $H_2N(CH_2)_4CH_3$, $H_2N(CH_2)_5CH_3$, $H_2N(CH_2)_6CH_3$, $H_2N(CH_2)_7CH_3$, $H_2N(CH_2)_8CH_3$, $H_2N(CH_2)_9CH_3$, $H_2N(CH_2)_{10}CH_3$, $H_2N(CH_2)_{11}CH_3$, $H_2N(CH_2)_{12}CH_3$, $H_2N(CH_2)_{13}CH_3$, $H_2N(CH_2)_{14}CH_3$, $H_2N(CH_2)_{15}CH_3$, $H_2N(CH_2)_{16}CH_3$, $H_2N(CH_2)_{17}CH_3$, $H_2N(CH_2)_{18}CH_3$, $H_2NCH_2CH_2OCH_3$, $H_2N(CH_2CH_2O)_2CH_3$, $H_2N(CH_2CH_2O)_3CH_3$, $H_2N(CH_2CH_2O)_4CH_3$, $H_2N(CH_2CH_2O)_5CH_3$, $H_2N(CH_2CH_2O)_6CH_3$, $H_2NCH_2CH_2OCH_3$, $H_2N(CH_2CH_2CH_2O)2CH_3$, $H_2N(CH_2CH_2CH_2O)_3CH_3$, $H_2N(CH_2CH_2CH_2O)_4CH_3$, $H_2N(CH_2CH2CH_2O)_5CH_3$, $H_2N(CH_2CH_2CH_2O)_6CH_3$, $H_2NCH_2CH_2OCH_2CH_3$, $H_2N(CH_2CH_2O)_2CH_2CH_3$, $H_2N(CH_2CH_2O)_3CH_2CH_3$, $H_2N(CH_2CH_2O)_4CH_2CH_3$, $H_2N(CH_2CH_2O)_5CH_2CH_3$, $H_2N(CH_2CH_2O)_6CH_2CH_3$, $H_2NCH_2CH_{12}CH_2OCH_2CH_3$, $H_2N(CH_2CH_2CH_2O)_2CH_2CH_3$, $H_2N(CH_2CH_2CH_2O)_3CH_2CH_3$, $H_2N(CH_2CH_2CH_2O)_5CH_2CH_3$, $H_2N(CH_2CH_2CH_2O)_6CH_2CH_3$, $H_2NCH_2CH_2OCH_2CH_2CH_3$, $H_2N\ (CH_2CH_2O)_2CH_2$ $H_2NCH_2CH_2OCH_2CH_2CH_2CH_3$, $H_2N\ (CH_2CH_2O)_2CH_2CH_2CH_2CH_3$, $H_2NCH_2CH_2O(CH_2)_4CH_3$, $H_2NCH_2CH_2O(CH_2)_5CH_3$, $H_2NCH_2CH_2O(CH_2)_6CH_3$, $H_2NCH_2CH_2O(CH_2)_7CH_3$, $H_2NCH_2CH_2O(CH_2)_8CH_3$, $H_2NCH_2CH_2SCH_3$, $H_2NCH_2CHNHCH_3$, $H_2NCH_2CH_2N(CH_3)_2$, $HSCH_3$, $HSCH_2CH_3$, $HSCH_2CH_2CH_3$, $HSCH_2CH_2CH_2CH_3$, $HS(CH_2)_4CH_3$, $HS(CH_2)_5CH_3$, $HS(CH_2)_7CH_3$, $HS(CH_2)_8CH_3$, $HS(CH_2)_9CH_3$, $HS(CH_2)_{10}CH_3$, $HS(CH_2)_{11}CH_3$, $HS(CH_2)_{12}CH_3$, $HS(CH_2)_{13}CH_3$, $HS(CH_2)_{14}CH_3$, $HS(CH_2)_{15}CH_3$, $HS(CH_2)_{16}CH_3$ $HS(CH_2)_{17}CH_3$, $HS(CH_2)_{18}CH_3$, $HSCH_2CH_2OCH_3$, $HS(CH_2CH_2O)_2CH_3$, $HS(CH_2CH_2O)_3CH_3$, $HS(CH_2CH_2O)_4CH_3$, $HS(CH_2CH_2O)_5CH_3$, $HS(CH_2CH_2O)_6CH_3$, $HSCH_2CH_2CH_2OCH_3$, $HS(CH_2CH_2CH_2O)_2CH_3$, $HS(CH_2CH_2CH_2O)_3CH_3$, $HS(CH_2CH_2CH_2O)_4CH_3$, $HS(CH_2CH_2CH_2O)_5CH_3$, $HS(CH_2CH_2CH_2O)_6CH_3$, $HSCH_2CH_2OCH_2CH_3$, $HS(CH_2CH_2O)_2CH_2CH_3$, $HS(CH_2CH_2O)_3CH_2CH_3$, $HS(CH_2CH_2O)_4CH_2CH_3$, $HS(CH_2CH_2O)_5CH_2CH_3$, $HS(CH_2CH_2O)_6CH_2CH_3$, $HSCH_2CH_2CH_2OCH_2CH_3$, $HS(CH_2CH_2CH_2O)_2CH_2CH_3$, $HS(CH_2CH_2CH_2O)_3CH_2CH_3$, $HS(CH_2CH_2CH_2O)_4CH_2CH_3$, $HS(CH_2CH_2CH_2O)_5CH_2CH_3$, $HS(CH_2CH_2CH_2O)_6CH_2CH_3$, $HSCH_2CH_2OCH_2CH_2CH_3$, $HS(CH_2CH_2O)_2CH_2CH_2CH_3$, $HSCH_2CH_2OCH_2CH_2CH_2CH_3$, $HS(CH_2CH_2O)_2CH_2CH_2CH_3$, $HSCH_2CH_2O(CH_2)_4CH_3$, $HSCH_2CH_2O(CH_2)_5CH_3$, $HSCH_2CH_2O(CH_2)_6CH_3$, $HSCH_2CH_2O(CH_2)_7CH_3$, $HSCH_2CH_2O(CH_2)_8CH_3$, $HSCH_2CH_2SCH_3$, $HSCH_2CHNHCH_3$, $HSCH_2CH_2N(CH_3)_2$, $HOCH_3$, $HOCH_2CH_3$, $HOCH_2CH_2CH_3$, $HOCH_2CH_2CH_2CH_3$, $HO(CH_2)_4CH_3$, $HO(CH_2)_5CH_3$, $HO(CH_2)_7CH_3$, $HO(CH_2)_8CH_3$, $HO(CH_2)_9CH_3$, $HO(CH_2)_{10}CH_3$, $HO(CH_2)_{11}CH_3$, $HO(CH_2)_{12}CH_3$, $HO(CH_2)_{13}CH_3$, $HO(CH_2)_{14}CH_3$, $HO(CH_2)_{15}CH_3$, $HO(CH_2)_{16}CH_3$, $HO(CH_2)_{17}CH_3$, $HO(CH_2)_{18}CH_3$, $HOCH_2CH_2OCH_3$, $HO(CH_2CH_2O)_2CH_3$, $HO(CH_2CH_2O)_3CH_3$, $HO(CH_2CH_2O)_4CH_3$, $HO(CH_2CH_2O)_5CH_3$, $HO(CH_2CH_2O)_6CH_3$, $HOCH_2CH_2CH_2OCH_3$, $HO(CH_2CH_2CH_2O)_2CH_3$, $HO(CH_2CH_2CH_2O)_3CH_3$, $HO(CH_2CH_2CH_2O)_4CH_3$, $HO(CH_2CH_2CH_2O)_5CH_3$, $HO(CH_2CH_2CH_2O)_6CH_3$, $HOCH_2CH_2OCH_2CH_2CH_3$, $HO(CH_2CH_2O)_2CH_2CH_3$, $HO(CH_2CH_2O)_3CH_2CH_3$, $HO(CH_2CH_2O)_4CH_2CH_3$, $HO(CH_2CH_2O)_3CH_2CH_3$, $HO(CH_2CH_2O)_6CH_2CH_3$, $HOCH_2CH_2CH_2CH_2CH_3$, $HO(CH_2CH_2CH_2O)CH_2CH_3$, $HO(CH_2CH_2CH_2O)_3CH_2CH_3$, $HO(CH_2CH_2CH_2O)_4CH_2CH_3$, $HO(CH_2CH_2CH_2O)_5CH_2CH_3$, $HO(CH_2CH_2CH_2O)_6CH_2CH_3$, $HOCH_2CH_2OCH_2CH_2CH_3$, $HO(CH_2CH_2O)_2CH_2CH_2CH_3$, $HOCH_2CH_2OCH_2CH_2CH_2CH_3$, $HO(CH_2CH_2O)_2CH_2CH_2CH_2CH_3$, $HOCH_2CH_2O(CH_2)_4CH_3$, $HOCH_2CH_2O(CH_2)_5CH_3$, $HOCH_2CH_2O(CH_2)_6CH_3$, $HOCH_2CH_2O(CH_2)_7CH_3$, $HOCH_2CH_2O(CH_2)_8CH_3$, $HOCH_2CH_2SCH_3$, $HOCH_2CH_2NHCH_3$, $HOCH_2CH_2N(CH_3)_2$,

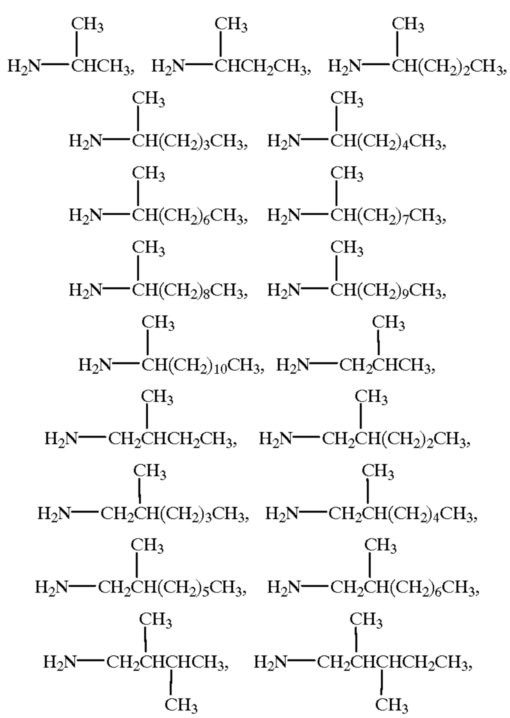

-continued

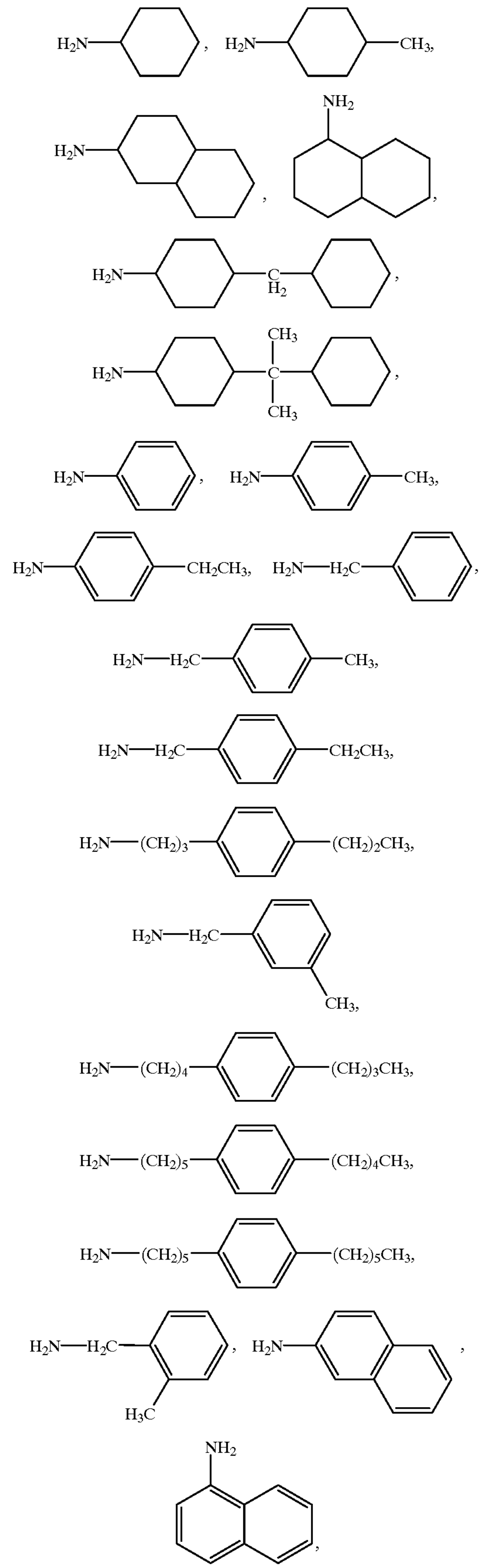

-continued

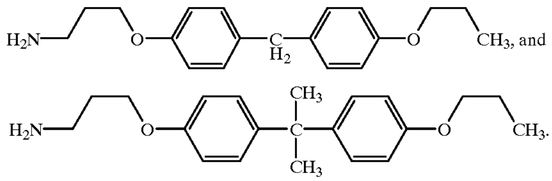

(6-1) Cationization Reaction

A description will next be made about a cationization reaction in which a precursor, which can form cationic groups, and a cationizing agent are reacted.

Incidentally, pendant groups which are contained in a polymer may contain either a precursor, which can form cationic groups, or a cationizing agent. In other words, it is possible to react a cationizing agent with a polymer containing a precursor, which can form cationic groups, in its pendant groups or to react a precursor, which can form cationic groups, with a polymer containing a cationizing agent.

As an illustrative method, amino, alkylamino or dialkylamino groups in pendant groups of a cross-linked polymer can be cationized using an alkylating agent.

It is to be noted that such cationizing agents are not preferred to renain because many of then have high toxicity. As a consequence, in view of the possibility that unreacted groups may remain, it is more preferred to react a cationizing agent with pendant groups which contain a precursor which can form cationic groups.

Examples of the cationizing agent can include, but are not particularly limited to, those making use of substitution reactions, such as chlorides, bromides, iodides, sulfonate esters, sulfate esters, alkyl metals and azides; and those making use of addition reactions, such as reactive unsaturated compounds, epoxy compounds, aziridine and thiirane.

Illustrative can be alkyl chlorides such as chloromethane, chloroethane, chloropropane, 2-chloropropane, 1-chlorobutane, 2-chlorobutane, 1-chloropentane, 2-chloropentane, 3-chloropentane, 1-chlorohexane, 2-chlorohexane, 3-chlorohexane, 1-chlorooctane, 1-chlorodecane, and 1-chlorotetradecane; alkyl bromides such as bromomethane, bromoethane, bromopropane, 2-bromopropane, 1-bromobutane, 2-bromobutane, 1-bromopentane, 2-bromopentane, 3-bromopentane, 1-bromohexane, 2-bromohexane, 3-bromohexane, 1-bromooctane, 1-bromodecane, and 1-bromotetradecane; alkyl iodides such as iodomethane, iodoethane, iodopropane, 2-iodopropane, 1-iodobutane, 2-iodobutane, 1-iodopentane, 2-iodopentane, 3-iodopentane, 1-iodohexane, 2-iodohexane, 3-iodohexane, 1-iodooctane, 1-iododecane, and 1-iodotetradecane; sulfate monoesters such as methyl sulfate, ethyl sulfate, propyl sulfate, butyl sulfate, pentyl sulfate, hexyl sulfate, octyl sulfate, decyl sulfate, and tetradecyl sulfate; sulfate diesters such as dimethyl sulfate, diethyl sulfate, dipropyl sulfate, dibutyl sulfate, dipentyl sulfate, dihexyl sulfate, dioctyl sulfate, didecyl sulfate, and ditetradecyl sulfate; and sulfonate esters such as methyl methanesulfonate, ethyl methanesulfonate, propyl methanesulfonate, pentyl methanesulfonate, hexyl methanesulfonate, octyl methanesulfonate, decyl methanesulfonate, tetradecyl methanesulfonate, methyl ethanesulfonate, ethyl ethanesulfonate, propyl ethanesulfonate, pentyl ethanesulfonate, hexyl ethanesulfonate, octyl ethanesulfonate, decyl ethanesulfonate, tetradecyl ethanesulfonate, methyl trifluoromethanesulfonate, ethyl trifluoromethanesulfonate, propyl trifluoromethanesulfonate, pentyl trifluoromethanesulfonate, hexyl trifluoromethanesulfonate, octyl trifluoromethanesulfonate, decyl trifluoromethanesulfonate, tetradecyl trifluoromethanesulfonate, methyl benzenesulfonate, ethyl benzenesulfonate, propyl benzenesulfonate, pentyl benzenesulfonate, hexyl benzenesulfonate, octyl benzenesulfonate, decyl benzenesulfonate, tetradecyl benzenesulfonate, methyl p-toluenesulfonate, ethyl p-toluenesulfonate, propyl p-toluenesulfonate, pentyl p-toluenesulfonate, hexyl p-toluenesulfonate, octyl p-toluenesulfonate, decyl p-toluenesulfonate, and tetradecyl p-toluenesulfonate.

In addition, epoxy compounds such as ethylene oxide, propylene oxide and epichlorohydrin can also be used.

Among these, those capable of forming cationic groups of lower molecular weights are preferred and moreover, those having high reactivity and permitting easier post-reaction removal are preferred.

Here, it is possible to use a cationizing agent of bifunctionality or higher to perform both cross-linking and cationization. Examples of such a cationizing agent can include those making use of substitution reactions, such as dichlorides, dibromides, diiodides, disulfonate esters, disulfate ester, dialkyl metals, and diazide; and those making use of addition reactions, such as dual-reactive, unsaturated compounds, diepoxy compounds, diaziridine, and dithiirane.

After the reaction for the introduction of pendant groups containing cationic groups or subsequent to the cationization reaction, the counter ions of the cationic groups can be subjected to salt interchange.

Examples of ions usable in the salt interchange can include those similar to the above-described specific examples of counter ions as the ammonium salt of a glycino group.

Upon cationization reaction, the reaction temperature may preferably be from 0 to 140° C. with 20 to 80° C. being particularly preferred, although no particular limitation is imposed thereon.

(6-2) Betainization Reaction

The term "betainization reaction" as used herein means to react precursors, which can form betaine groups, with a betainizing agent. For example, a betainizing agent may be reacted to a polymer which contains pendant groups having precursors which can be converted into betaine groups. In this case, the polymer may be in a cross-linked or uncross-linked form. Typically, tertiary amino groups which are contained in pendant groups of a cross-linked polymer can be betainized by using a betainizing agent containing one or more anionic groups.

Illustrative betainizing agents can include, but are not particularly limited to, those making use of substitution reactions, such as chlorides, bromides, iodides, sulfonate esters, sulfate esters, alkyl metals and azides; and those making use of addition reactions, such as reactive unsaturated compounds, epoxy compounds, aziridine and thiirane.

Examples can include chloroacetic acid, bromoacetic acid, iodoacetic acid, 3-chloropropionic acid, 3-bromopropionic acid, 3-iodopropionic acid, 4-chlorobutanoic acid, 4-bromobutanoic acid, 4-iodobutanoic acid, 5-chloropentanoic acid, 5-bromopentanoic acid, 5-iodopentanoic acid, 6-chlorohexanoic acid, 6-bromohexanoic acid, 6-iodohexanoic acid, chlorosulfonic acid, bromosulfonic acid, iodosulfonic acid, 3-bromopropionesulfonic acid, 3-iodopropionesulfonic acid, 4-chlorobutanesulfonic acid, 4-bromobutanesulfonic acid, 4-iodobutanesulfonic acid, 5-chloropentanesulfonic acid, 5-bromopentanesulfonic acid, 5-iodopentanesulfonic acid, 6-chlorohexanesulfonic acid, 6-bromohexanesulfonic acid, 6-iodohexanesulfonic acid, chlorophosphonic acid, bromophosphonic acid, iodophosphonic acid, 3-chloropropionephosphonic acid, 3-bromopropionephosphonic acid, 3-iodopropionephosphonic acid, 4-chlorobutanephosphonic acid, 4-bromobutanephosphonic acid and 4-iodobutanephosphonic acid, and salts thereof; and propanesultone and butanesultone.

Further, epoxy compounds such as ethylene oxide, propylene oxide and epichlorohydrin are also usable.

Among these, those capable of providing betaine groups the own molecular weights of which are not high are preferred, and those having high reactivity and permitting easy post-reaction elimination are preferred.

Upon betainization reaction, the reaction temperature may preferably be from 0 to 140° C. with 20 to 80° C. being particularly preferred, although no particular limitation is imposed thereon.

After the reaction for the introduction of pendant groups containing betaine groups or after the betainization reaction, anionic groups in the betaine groups may be rendered nonionic as needed by acidifying the reaction system.

Illustrative acids, which can be used to make the anionic groups nonionic, can include inorganic acids such as hydrochloric acid, hydrobromic acid, hydroiodic acid, sulfuric acid, sulfurous acid, nitric acid, nitrous acid and phosphoric acid; carboxylic acids such as formic acid, acetic acid, propionic acid, and benzoic acid; sulfonic acids such as methanesulfonic acid, trifluoromethanesulfonic acid, benzensulfonic acid and toluenesulfonic acid; and benzenephosphonic acid. In this case, the acid must be stronger than the anions in the pendant groups.

(7) After-treatment After the Reaction

No particular limitation is imposed on the drying temperature for the polymer after the completion of the cross-linking reaction, the pendant-group-introducing reaction, the cationization reaction or the betainization reaction. In general, however, the drying temperature is preferably from 20 to 150° C., notably from 40 to 100° C.

Further, no particular limitation is imposed on the drying method of these polymers. They can be dried by a method known to the public such as hot-air drying, specific vapor drying, microwave drying, vacuum drying, drum drier drying, or drying by azeotropic dehydration in a hydrophobic organic solvent. The drying temperature is preferably from 20 to 200° C., more preferably from 50 to 120° C.

The thus-obtained polymer may then be subjected to surface cross-linking if necessary.

(8) Shape and Particle Size of Cross-linked Acidic Polyamino Acid Polymer

The cross-linked polyamino acid polymer can be used in various forms such as crushed pieces of irregular shapes, spheres, grains, granules, granulated particles, flakes, lumps, pearls, fine powder, fibers, rods, films and sheets. Depending on the application purpose, a preferred form can be chosen. It can also be in the form of a fibrous base material, a porous body, an expanded body or a granulated material.

No particular limitation is imposed on the particle size of the cross-linked polyamino acid superabsorbent polymer, although its particle size varies depending on the application purpose.

In the case of disposable diapers, for example, an average size of from 100 to 1,000 μm is preferred, with a range of from 150 to 600 μm being more preferred, because a fast absorption speed and avoidance of gel blocking are desired.

When employed in a form kneaded in a resin such as a waterstopping material or for like purposes, a range of from 1 to 10 μm is preferred. In the case of a water-holding material for agricultural and horticultural applications, a range of from 100 μm to 5 mm is preferred in view of its dispersibility in soil. In any case, the particle size varies depending on the application purpose.

(9) Method of Use of the Cross-linked Acidic Polyamino Acid Polymer

No particular limitation is imposed on the method of use of the cross-linked acidic polyamino acid polymer. It can be used either singly or in combination with another material.

When using the cross-linked acidic polyamino acid polymer in combination with another resin, it can be kneaded in a thermoplastic resin, followed by molding by injection molding or the like; it can be mixed with constituent monomer(s) of the resin and, if necessary, an initiator, followed by polymerization by light, heat or the like; it can be dispersed along with a resin in a solvent, followed by casting and solvent removal; it can be mixed with a prepolymer, followed by cross-linking; and it can be mixed with a resin, followed by cross-linking.

No particular limitation is imposed on the molded or otherwise formed product of the polymer according to the present invention. It can be used in the form of solid matters, sheets, films, fibers, nonwoven fabrics, expanded bodies, rubber and the like. Further, no particular limitation is imposed on their molding or forming methods.

The acidic polyamino acid polymer according to the present invention can be used by itself or in the form of a composite material combined with another material. Although no particular limitation is imposed on the structure of the composite material, it can be formed into a sandwich structure by holding it between pulp layers, nonwoven fabrics or the like; it can be formed into a multilayer structure by using a resin sheet or film as a base material; or it can be formed into a double-layer structure by casting it on a resin sheet.

Further, the superabsorbent polymer according to the present invention can also be blended with two or more other superabsorbent resins as needed. It is also possible to add, as needed, inorganic compounds such as salt, colloidal silica, white carbon, ultrafine silica and titanium oxide powder; and organic compounds such as chelating compounds. moreover, it is also possible to mix oxidizing agents, antioxidants, reducing agents, ultraviolet absorbers, antibacterial agents, fungicides, mildewproofing agents, fertilizers, perfumes, deodorants, pigments and the like.

The resin according to the present invention can also be used in the form of a gel or solid matter. It is used in a gel form, for example, when employed in water-holding materials for agricultural and horticultural applications, life prolonging agents for cut flowers, gel-type aromatics, gel-type deodorants and the like; and it is used in a solid form when employed as an absorbent for disposable diapers.

(9) Application Purposes of the Cross-linked Acidic Polyamino Acid Polymer

No particular limitation is imposed on the application purposes of the cross-linked acidic polyamino acid polymer. It can be used in any application fields where conventional superabsorbent resins are usable.

Illustrative applications can include sanitary products such as sanitary napkins, disposable diapers, breast milk pads, and disposable dustcloths; medical products such as wound-protecting dressing materials, medical underpads, and cataplasms; daily necessaries such as pet sheets, portable toilets, gel-type aromatics, gel-type deodorants, sweatabsorbing fibers, and disposable pocket heaters; toiletry products such as shampoos, hair-setting gels, and moisturizers; agricultural and horticultural products such as agricultural and horticultural water-holding materials, life-prolonging agents for cut flowers, floral forms (fixing bases for cut flowers), seedling nursery beds, solution culture vegetation sheets, seed tapes, fluidized seedling media, and dew-preventing agricultural sheets; food packaging materials such as freshness-retaining materials for food trays, and drip absorbent sheets; materials for use during transportation, such as cold insulators, and water absorbent sheets for use during the transportation of fresh vegetables; construction and civil engineering materials such as dew-preventing construction materials, sealing materials for civil engineering and construction, lost circulation preventives for the shield tunneling method, concrete admixtures, gaskets and packings; materials relating to electric and electronic equipments, such as sealing materials for electronic equipments and optical fibers, waterstopping materials for communication cables, and ink jet recording papers; water treatment materials, such as sludge solidifiers, and dehydrating agents for gasoline and oils; textile-printing sizing materials; water-swelling toys; artificial snow; sustained-release fertilizers; sustained-release agrichemicals; sustained-release drugs; humidity regulating materials; and antistatic agents.

The present invention will hereinafter be described more specifically by Examples. It should however be borne in mind that the present invention is not limited only to the Examples. In the following Examples and Comparative Examples, all designations of "part" or "parts" mean "part by weight" or "parts by weight".

The water absorption and biodegradability in each Example were measured by the following methods:

(1) Tea Bag Method

The measurement of water absorption was conducted using distilled water and physiological saline as liquids to be absorbed. Specifically, about 0.03 part of a superabsorbent polymer was placed in a tea bag made of nonwoven fabric (80 mm×50 mm) in the case of distilled water, whereas about 0.1 part of the superabsorbent polymer was filled in a similar tea bag in the case of saline. Each tea bag was immersed in an excess amount of the corresponding liquid, in which the polymer was allowed to swell for 1 hour. The tea bag was then pulled out. After the liquid was allowed to drip away for 1 minute, the weight of the tea bag with the swollen polymer contained therein was measured. The above procedures were likewise repeated using, as a blank, a similar tea bag only. The weight of the blank and the weight of the superabsorbent polymer were subtracted from the weight of the tea bag with the swollen polymer contained therein. A value obtained by dividing the difference with the weight of the superabsorbent polymer was recorded as a water absorption (g/one-gram resin). Incidentally, the physiological saline was a 0.9 wt. % aqueous solution of sodium chloride.

(2) Measurement of Biodegradability

Biodegradability was measured by the compost method. The compost method was conducted following the procedures of ISO CD 14855 which is a modification of ASTM D-5338.92.

Specifically, the amount of carbon which was contained in a test sample was first measured by an elemental analysis. Next, 15 parts of the test sample were added to 800 parts of an inoculum, followed by biodegradation at 58° C. for 40 days. The amount of produced carbon dioxide was measured. The proportion of the amount of the produced carbon dioxide relative to an amount of carbon dioxide, which has been obtained by converting the amount of the carbon contained in the test sample, was expressed as a biodegradability (%). It is to be noted that easily-biodegradable samples include those capable of promoting degradation of the carbon contained in an inoculum. In such a case, the biodegradability (%) may take a value greater than 100%.

(A) Examples for cases in each of which $R_1$ has an acidic group (carboxyl group):

EXAMPLE A1

An aqueous solution of 3.00 parts of hexamethylenediamine in 10 parts of distilled water was added under a nitrogen gas stream to a solution of 100 parts of polysuccinimide having a weight average molecular weight of 96,000 in 400 parts of DMF. After the resulting mixture was stirred at room temperature for 30 minutes, the stirring was stopped and the contents were then allowed to react for 20 hours.

The reaction product was transferred into a mixer equipped with stirring blades having cutting edges, followed by the addition of 400 parts of distilled water and 400 parts of methanol. A gel so formed was finely cut at 8,000 rpm for 5 minutes, and an aqueous solution of 174.2 parts of sodium glutamate in 500 parts of distilled water was added dropwise over 2 hours. After the dropwise addition, the resultant mixture was stirred for 24 hours. Using a 7 wt. % aqueous solution of hydrochloric acid, the mixture was neutralized to pH 7. Subsequent to the neutralization, the product was poured into 300 parts of methanol. After stirring for 1 hour, a precipitate was collected by suction filtration and was then dried at 60° C., whereby 270 parts of a superabsorbent polymer were obtained.

The water absorption of the superabsorbent polymer was 890 times in the case of distilled water and 73 times in the case of the physiological saline. On the other hand, the biodegradability (%) was 103%, thereby exhibiting good biodegradability.

EXAMPLE A2

The procedures of Example A1 were repeated similarly except that the amount of the aqueous solution of sodium glutamate was reduced to a half, 82.4 parts of a 25 wt. % aqueous solution of caustic soda were added over 2 hours, and the reaction was conducted for 24 hours. After drying, 232 parts of a superabsorbent polymer were obtained. The water absorption of the superabsorbent polymer was 830 times in the case of distilled water and 70 times in the case of the physiological saline. On the other hand, the biodegradability (%) was 105%, thereby exhibiting good biodegradability.

EXAMPLE A3

The procedures of Example A1 were repeated similarly except that an aqueous solution of sodium aspartate, which had been prepared by dissolving 137.1 parts of aspartic acid and 82.4 parts of caustic soda in 500 parts of distilled water, was used instead of the aqueous solution of sodium glutamate. After drying, 285 parts of a superabsorbent polymer were obtained. The water absorption of the superabsorbent polymer was 910 times in the case of distilled water and 74 times in the case of the physiological saline. On the other hand, the biodegradability (%) was 102%, thereby exhibiting good biodegradability.

EXAMPLE A4

The procedures of Example A1 were repeated similarly except that an aqueous solution of glycine soda, which had been prepared by dissolving 77.3 parts of glycine and 42.1 parts of caustic soda in 300 parts of distilled water, was used instead of the aqueous solution of sodium glutamate. After drying, 196 parts of a superabsorbent polymer were obtained. The water absorption of the superabsorbent polymer was 780 times in the case of distilled water and 69 times in the case of the physiological saline. On the other hand, the biodegradability (%) was 105%, thereby exhibiting good biodegradability.

EXAMPLE A5

The procedures of Example A1 were repeated similarly except that an aqueous solution of 106.2 parts of 4-amino-n-butyric acid and 42.1 parts of caustic soda in 500 parts of distilled water was used instead of the aqueous solution of sodium glutamate. After drying, 215 parts of a superabsorbent polymer were obtained. The water absorption of the superabsorbent polymer was 760 times in the case of distilled water and 68 times in the case of the physiological saline. On the other hand, the biodegradability (%) was 99, thereby exhibiting good biodegradability.

EXAMPLE A6

The procedures of Example A1 were repeated similarly except that an aqueous solution of 135.1 parts of 6-amino-n-caproic acid and 42.1 parts of caustic soda in 500 parts of distilled water was used instead of the aqueous solution of sodium glutamate. After drying, 251 parts of a superabsorbent polymer were obtained. The water absorption of the superabsorbent polymer was 730 times in the case of distilled water and 66 times in the case of the physiological saline. On the other hand, the biodegradability (%) was 97, thereby exhibiting good biodegradability.

(B) Examples for cases in each of which R, has an acidic group (sulfonic group):

EXAMPLE B1

An aqueous solution of 3.00 parts of hexamethylenediamine in 10 parts of distilled water was added under a nitrogen gas stream to a solution of 100 parts of polysuccinimide having a weight average molecular weight of 96,000 in 400 parts of DMF. After the resulting mixture was stirred at room temperature for 30 minutes, the stirring was stopped and the contents were then allowed to react for 20 hours.

The reaction product was transferred into a mixer equipped with stirring blades having cutting edges, followed by the addition of 400 parts of distilled water and 400 parts of methanol. A gel so formed was finely cut at 8,000 rpm for 5 minutes, and an aqueous solution of 128.9 parts of taurine and 42.1 parts of caustic soda in 500 parts of distilled water was added dropwise over 2 hours. After the dropwise addition, the product was poured into 300 parts of methanol. After stirring for 1 hour, a precipitate was collected by suction filtration and was then dried at 60° C., whereby 246 parts of a superabsorbent polymer were obtained.

The water absorption of the superabsorbent polymer was 1,050 times in the case of distilled water and 81 times in the case of the physiological saline. On the other hand, the biodegradability (%) was 102%, thereby exhibiting good biodegradability.

EXAMPLE B2

The procedures of Example B1 were repeated similarly except that the amount of the aqueous solution of taurine soda was reduced to a half, 82.4 parts of a 25 wt. % aqueous solution of caustic soda were added over 2 hours, and the reaction was conducted for 24 hours. After drying, 175 parts of a superabsorbent polymer were obtained. The water absorption of the superabsorbent polymer was 960 times in the case of distilled water and 77 times in the case of the physiological saline. On the other hand, the biodegradability (%) was 104%, thereby exhibiting good biodegradability.

EXAMPLE B3

The procedures of Example B1 were repeated similarly except that an aqueous solution of 157.8 parts of 4-aminobutanesulfonic acid and 42.1 parts of caustic soda in 500 parts of distilled water was used instead of the aqueous solution of taurine soda. After drying, 276 parts of a superabsorbent polymer were obtained. The water absorption of the superabsorbent polymer was 950 times in the case of distilled water and 78 times in the case of the physiological saline. On the other hand, the biodegradability (%) was 102%, thereby exhibiting good biodegradability.

EXAMPLE B4

The procedures of Example B1 were repeated similarly except that an aqueous solution of 192.9 parts of 4-(1'-aminomethyl)benzenesulfonic acid and 42.1 parts of caustic soda in 500 parts of distilled water was used instead of the aqueous solution of taurine soda. After drying, 292 parts of a superabsorbent polymer were obtained. The water absorption of the superabsorbent polymer was 890 times in the case of distilled water and 74 times in the case of the physiological saline. On the other hand, the biodegradability (%) was 96%, thereby exhibiting good biodegradability.

EXAMPLE B5

The procedures of Example B1 were repeated similarly except that an aqueous solution of 174.3 parts of cysteinic acid and 84.2 parts of caustic soda in 500 parts of distilled water was used instead of the aqueous solution of taurine soda. After drying, 235 parts of a superabsorbent polymer were obtained. The water absorption of the superabsorbent polymer was 1,010 times in the case of distilled water and 79 times in the case of the physiological saline. On the other hand, the biodegradability (%) was 94%, thereby exhibiting good biodegradability.

EXAMPLE B6

The procedures of Example B1 were repeated similarly except that an aqueous solution of 178.4 parts of 4-aminobenzenesulfonic acid and 42.1 parts of caustic soda in 500 parts of distilled water was used instead of the aqueous solution of taurine soda. After drying, 251 parts of a superabsorbent polymer were obtained. The water absorption of the superabsorbent polymer was 860 times in the case of distilled water and 69 times in the case of the physiological saline. On the other hand, the biodegradability (%) was 97%, thereby exhibiting good biodegradability.

(C) Examples for cases in each of which $R_1$ has an acidic group [an acidic group other than the acidic groups described above under (A) and (B)]:

EXAMPLE C1

An aqueous solution of 2.50 parts of hexamethylenediamine in 10 parts of distilled water was added under a nitrogen gas stream to a solution of 100 parts of polysuccinimide having a weight average molecular weight of 96,000 in 400 parts of DMF. After the resulting mixture was stirred at room temperature for 30 minutes, the stirring was stopped and the contents were then allowed to react for 20 hours.

The reaction product was transferred into a mixer equipped with stirring blades having cutting edges, followed by the addition of 400 parts of distilled water and 400 parts of methanol. A gel so formed was finely cut at 8,000 rpm for 5 minutes, and an aqueous solution of 127.8 parts of 2-aminoethylphosphonic acid and 164.8 parts of a 25% aqueous solution of sodium hydroxide in 400 parts of distilled water was added dropwise over 2 hours. After the dropwise addition, the resultant mixture was stirred for 24 hours. To a slurry so obtained, 191.9 parts of methyl p-toluene-sulfonate were added dropwise over 4 hours. Subsequent to stirring for 24 hours, the product was poured into 800 parts of methanol. After stirring for 1 hour, a precipitate was collected by suction filtration and was a then dried at 60° C., whereby 220 parts of a superabsorbent polymer were obtained.

The water absorption of the superabsorbent polymer was 340 times in the case of distilled water and 59 times in the case of the physiological saline. On the other hand, the biodegradability (%) was 99%, thereby exhibiting good biodegradability.

EXAMPLE C2

The procedures of Example C1 were repeated similarly except that 144.4 parts of 2-aminoethylsulfamic acid were used instead of 2-aminoethylphosphonic acid. After drying, 222 parts of a superabsorbent polymer were obtained. The water absorption of the superabsorbent polymer was 480 times in the case of distilled water and 62 times in the case of the physiological saline. on the other hand, the biodegradability (%) was 98%, thereby exhibiting good biodegradability.

EXAMPLE C3

The procedures of Example C1 were repeated similarly except that 108.3 parts of 2-aminoethylthiocarboxylic acid were used instead of 2-aminoethylphosphonic acid. After drying, 208 parts of a superabsorbent polymer were obtained. The water absorption of the superabsorbent polymer was 490 times in the case of distilled water and 63 times in the case of the physiological saline. On the other hand, the biodegradability (%) was 93%, thereby exhibiting good biodegradability.

EXAMPLE C4

The procedures of Example C1 were repeated similarly except that 144.3 parts of 2-aminoethyl phosphate were used instead of 2-aminoethylphosphonic acid. After drying, 194 parts of a superabsorbent polymer were obtained. The water absorption of the superabsorbent polymer was 310 times in the case of distilled water and 57 times in the case of the physiological saline. On the other hand, the biodegradability (%) was 102%, thereby exhibiting good biodegradability.

EXAMPLE C5

The procedures of Example C1 were repeated similarly except that 118.5 parts of 2-aminoethyldithiocarboxylic acid were used instead of 2-aminoethylphosphonic acid. After drying, 212 parts of a superabsorbent polymer were obtained. The water absorption of the superabsorbent polymer was 460 times in the case of distilled water and 60 times in the case of the physiological saline. On the other hand, the biodegradability (%) was 92%, thereby exhibiting good biodegradability.

(D) Examples for cases in each of which $R_1$ has a glycino group:

EXAMPLE D1

In 40 parts of distilled water, 7.2 parts of lysine methyl ester dihydrochloride and 22.6 parts of lysine monohydrochloride were dissolved as a cross-linking agent and a pendant-group reagent, respectively. To the resultant solution, 7.8 parts of caustic soda were added little by little for neutralization, whereby an aqueous solution of lysine was prepared. On the other hand, 100 parts of polysuccinimide having a weight average molecular weight of 96,000 were dissolved in 400 parts of DMF under a nitrogen gas stream, followed by the addition of the aqueous solution of lysine. After the thus-prepared mixture was stirred at room temperature for 1 hour, the stirring was stopped and the contents were then allowed to react for 20 hours. Methanol (4,000 parts) was added to the reaction mixture to disintegrate the same. A precipitate so obtained was collected by filtration and was then washed with methanol and water. The precipitate was suspended in a mixture of 900 parts of distilled water and 2,700 parts of methanol, followed by the dropwise addition of 137 parts of a 27 wt. % aqueous solution of caustic soda over 2 hours. After the dropwise addition, the resultant mixture was stirred for 2 hours. Using a 7 wt. % aqueous solution of hydrochloric acid, the mixture was neutralized to pH 7. After the neutralization, 3,000 parts of methanol were added. A resultant precipitate was dried at 60° C., whereby 145 parts of a superabsorbent polymer were obtained.

The water absorption of the superabsorbent polymer was 490 times in the case of distilled water and 62 times in the case of the physiological saline. On the other hand, the biodegradability (%) was 103%, thereby exhibiting good biodegradability.

EXAMPLE D2

The procedures of Example D1 were repeated similarly except that polysuccinimide having an average molecular weight of 155,000 was used instead of the polysuccinimide. After drying, 146 parts of a superabsorbent polymer were obtained. The water absorption of the superabsorbent polymer was 550 times in the case of distilled water and 64 times in the case of the physiological saline. On the other hand, the biodegradability (%) was 100%, thereby exhibiting good biodegradability.

EXAMPLE D3

The procedures of Example D1 were repeated similarly except that the pH after the hydrolytic reaction was changed to 8.5. After drying, 152 parts of a superabsorbent polymer were obtained. The water absorption of the superabsorbent polymer was 510 times in the case of distilled water and 62 times in the case of the physiological saline. On the other hand, the biodegradability (%) was 104%, thereby exhibiting good biodegradability.

EXAMPLE D4

The procedures of Example D1 were repeated similarly except that the amount of the lysine hydrochloride was changed to 94.2 parts. After drying, 217 parts of a superabsorbent polymer were obtained. The water absorption of the superabsorbent polymer was 570 times in the case of distilled water and 66 times in the case of the physiological saline. On the other hand, the biodegradability (%) was 103%, thereby exhibiting good biodegradability.

EXAMPLE D5

The procedures of Example D1 were repeated similarly except that the amount of the lysine hydrochloride was changed to 188.3 parts. After drying, 302 parts of a superabsorbent polymer were obtained. The water absorption of the superabsorbent polymer was 610 times in the case of distilled water and 68 times in the case of the physiological saline. On the other hand, the biodegradability (%) was 103%, thereby exhibiting good biodegradability.

EXAMPLE D6

The procedures of Example D1 were repeated similarly except that the amount of the lysine methyl ester dihydrochloride was changed to 12 parts. After drying, 148 parts of a superabsorbent polymer were obtained. The water absorption of the superabsorbent polymer was 360 times in the case of distilled water and 59 times in the case of the physiological saline. On the other hand, the biodegradability (%) was 99%, thereby exhibiting good biodegradability.

EXAMPLE D7

The procedures of Example D1 were repeated similarly except that 3.6 parts of hexamethylenediamine were used instead of lysine methyl ester dihydrochloride. After drying, 141 parts of a superabsorbent polymer were obtained. The water absorption of the superabsorbent polymer was 380 times in the case of distilled water and 59 times in the case of the physiological saline. On the other hand, the biodegradability (%) was 102%, thereby exhibiting good biodegradability.

EXAMPLE D8

The procedures of Example D1 were repeated similarly except that 4.2 parts of m-xylylenediamine were used instead of lysine methyl ester dihydrochloride. After drying, 143 parts of a superabsorbent polymer were obtained. The water absorption of the superabsorbent polymer was 360 times in the case of distilled water and 58 times in the case of the physiological saline. On the other hand, the biodegradability (%) was 97%, thereby exhibiting good biodegradability.

EXAMPLE D9

The procedures of Example D1 were repeated similarly except that 173 parts of a 30 wt. % aqueous solution of caustic potash were used as an alkaline solution for use in the alkaline ring-opening reaction of imide rings. After drying, 160 parts of a superabsorbent polymer were obtained. The water absorption of the superabsorbent polymer was 450 times in the case of distilled water and 56 times in the case of the physiological saline. On the other hand, the biodegradability (%) was 97%, thereby exhibiting good biodegradability.

EXAMPLE D10

In Example D1, the pH after the reaction was changed to 2 and the resulting precipitate was collected by filtration. The precipitate was suspended in a mixture of 900 parts of distilled water and 2,700 parts of methanol, followed by the addition of 195 parts of 20 wt. % aqueous ammonia. The thus-prepared mixture stirred for 20 hours. The reaction mixture was poured into 3,000 parts of methanol, and a precipitate so formed was collected by filtration and then dried, whereby 126 parts of a superabsorbent polymer were obtained. The water absorption of the superabsorbent polymer was 500 times in the case of distilled water and 63 times in the case of the physiological saline. On the other hand, the biodegradability (%) was 105%, thereby exhibiting good biodegradability.

EXAMPLE D11

The procedures of Example D10 were repeated similarly except that 185 parts of triethanolamine were used instead of the aqueous ammonia. After drying, 230 parts of a superabsorbent polymer were obtained. The water absorption of the superabsorbent polymer was 280 times in the case of distilled water and 35 times in the case of the physiological saline. On the other hand, the biodegradability (%) was 97%, thereby exhibiting good biodegradability.

EXAMPLE D12

In 100 parts of distilled water, 25 parts of polysuccinimide were suspended. An 8% aqueous solution of caustic soda was then added dropwise to bring the pH of the suspension into a range of from 10 to 11. After the dropwise addition, dilute hydrochloric acid was added until the pH of the resultant solution dropped to 2. Further, 200 parts of acetone were added. The resulting precipitate was collected by suction filtration, washed with 50 parts of methanol and then dried at 60° C., whereby 29 parts of polyaspartic acid were obtained.

The thus-obtained polyaspartic acid (25 parts) and ethylene glycol diglycidyl ether (1.9 parts) were dissolved in 100 parts of distilled water. Under a reduced pressure of 30 mmHg, the thus-prepared solution was heated at 60° C. for 5 hours to drive off water. Further, under atmospheric pressure, the contents were allowed to react at 200° C. for 30 minutes. The resulting polymer was added to a mixture of 900 parts of distilled water and 2,700 parts of methanol, to which an 8% aqueous solution of caustic soda was added to adjust the pH of the resulting mixture to 7. The mixture was stirred for 10 hours. After the stirring, 3,000 parts of methanol were charged. The resulting precipitate was collected by filtration and then dried at 60° C. for 10 hours, whereby 140 parts of a superabsorbent polymer were obtained.

The water absorption of the superabsorbent polymer was 220 times in the case of distilled water and 33 times in the case of the physiological saline.

(E) Examples for cases in each of which $R_1$ has a cationic group:

EXAMPLE E1

An aqueous solution of 3.00 parts of hexamethylenediamine in 10 parts of distilled water was added under a nitrogen gas stream to a solution of 100 parts of polysuccinimide having a weight average molecular weight of 96,000 in 400 parts of DMF. After the resulting mixture was stirred at room temperature for 30 minutes, the stirring was stopped and the contents were then allowed to react for 20 hours.

The reaction product was transferred into a mixer equipped with stirring blades having cutting edges, followed by the addition of 400 parts of distilled water and 400 parts of methanol. A gel so formed was finely cut at 8,000 rpm for 5 minutes, and 105.3 parts of dimethylaminopropylamine were added dropwise over 2 hours. After the dropwise addition, the resultant mixture was stirred for 24 hours. To a slurry so obtained, 191.9 parts of methyl p-toluenesulfonate were added dropwise over 4 hours. Subsequent to stirring for 24 hours, the product was poured into 800 parts of methanol. After stirring for 1 hour, a precipitate was collected by suction filtration and was then dried at 60° C., whereby 354 parts of a superabsorbent polymer were obtained.

The water absorption of the superabsorbent polymer was 540 times in the case of distilled water and 75 times in the case of the physiological saline. On the other hand, the biodegradability (%) was 96%, thereby exhibiting good biodegradability.

EXAMPLE E2

The procedures of Example E1 were repeated similarly except that a solution of 111.8 parts of methyl chloroacetate in 300 parts of distilled water was used instead of methyl p-toluenesulfonate. After drying, 294 parts of a superabsorbent polymer were obtained. The water absorption of the superabsorbent polymer was 680 times in the case of distilled water and 77 times in the case of the physiological saline. On the other hand, the biodegradability (t) was 98%, thereby exhibiting good biodegradability.

EXAMPLE E3

The procedures of Example E1 were repeated similarly except that the amount of hexamethylenediamine was changed to 2.5 parts. After drying, 318 parts of a superabsorbent polymer were obtained. The water absorption of the superabsorbent polymer was 780 times in the case of distilled water and 78 times in the case of the physiological saline. On the other hand, the biodegradability (%) was 98%, thereby exhibiting good biodegradability.

EXAMPLE E4

The procedures of Example E3 were repeated similarly except that, after the addition of dimethylaminopropylamine and the subsequent stirring, an aqueous solution of 156.2 parts of trimethylglycidylammonium chloride in 300 parts of water was added dropwise over 4 hours and the thus-obtained mixture was stirred for 24 hours. After drying, 317 parts of a superabsorbent polymer were obtained. The water absorption of the superabsorbent polymer was 880 times in the case of distilled water and 79 times in the case of the physiological saline. On the other hand, the biodegradability (%) was 95%, thereby exhibiting good biodegradability.

EXAMPLE E5

An aqueous solution of 2.5 parts of hexamethylenediamine in 10 parts of distilled water was added under a nitrogen gas stream to a solution of 100 parts of polysuccinimide having a weight average molecular weight of 113,000 in 400 parts of DMF. After the resulting mixture was stirred at room temperature for 30 minutes, the stirring was stopped and the contents were then allowed to react for 20 hours.

The reaction product was transferred into a mixer equipped with stirring blades having cutting edges, followed by the addition of 400 parts of distilled water and 400 parts of methanol. To the thus-prepared mixture, an aqueous solution of 217.0 parts of L-arginine hydrochloride and 85.0 parts of caustic soda was added dropwise over 2 hours. After the dropwise addition, the resultant mixture was stirred for 24 hours. The product was poured into 800 parts of methanol. After stirring for 1 hour, a precipitate was collected by suction filtration and was then dried at 60° C., whereby 268 parts of a superabsorbent polymer were obtained.

The water absorption of the superabsorbent polymer was 850 times in the case of distilled water and 78 times in the case of the physiological saline. On the other hand, the biodegradability (%) was 105%, thereby exhibiting good biodegradability.

EXAMPLE E6

The procedures of Example E5 were repeated similarly except that an aqueous guanidine solution, which had been prepared by dissolving 98.4 parts of guanidine hydrochloride in 200 parts of distilled water, was used instead of the aqueous solution of arginine and caustic soda. After drying, 195 parts of a superabsorbent polymer were obtained. The water absorption of the superabsorbent polymer was 900 times in the case of distilled water and 81 times in the case of the physiological saline. On the other hand, the biodegradability (%) was 105%, thereby exhibiting good biodegradability.

EXAMPLE E7

The procedures of Example E5 were repeated similarly except that an aqueous aminoguanidine solution, which had been prepared by dissolving 114.0 parts of aminoguanidine hydrochloride in 200 parts of distilled water, was used instead of the aqueous solution of arginine and caustic soda. After drying, 210 parts of a superabsorbent polymer were obtained. The water absorption of the superabsorbent polymer was 890 times in the case of distilled water and 79 times in the case of the physiological saline. On the other hand, the biodegradability (%) was 96%, thereby exhibiting good biodegradability.

(F) Examples for cases in each of which $R_1$ has a betaine group:

EXAMPLE F1

An aqueous solution of 2.39 parts of hexamethylenediamine in 10 parts of distilled water was added under a nitrogen gas stream to a solution of 100 parts of polysuccinimide having a weight average molecular weight of 96,000 in 400 parts of DMF. After the resulting mixture was stirred at room temperature for 30 minutes, the stirring was stopped and the contents were then allowed to react for 20 hours.

The reaction product was transferred into a mixer equipped with stirring blades having cutting edges, followed by the addition of 400 parts of distilled water and 400 parts of methanol. A gel so formed was finely cut at 8,000 rpm for 5 minutes, and 105.3 parts of dimethylaminopropylamine were added dropwise over 2 hours. After the dropwise addition, the resultant mixture was stirred for 24 hours. To a slurry so obtained, 136.6 parts of potassium chloroacetate were added dropwise over 4 hours. Subsequent to stirring for 24 hours, the product was poured into 800 parts of methanol. After stirring for 1 hour, a precipitate was collected by suction filtration and was then dried at 60° C., whereby 285 parts of a superabsorbent polymer were obtained.

The water absorption of the superabsorbent polymer was 540 times in the case of distilled water and 72 times in the case of the physiological saline. On the other hand, the biodegradability (%) was 94%, thereby exhibiting good biodegradability.

EXAMPLE F2

The procedures of Example F1 were repeated similarly except that a solution of 140.3 parts of butanesultone in 300 parts of distilled water was used instead of potassium chloroacetate. After drying, 274 parts of a superabsorbent polymer were obtained. The water absorption of the superabsorbent polymer was 480 times in the case of distilled water and 67 times in the case of the physiological saline. On the other hand, the biodegradability (%) was 93%, thereby exhibiting good biodegradability.

EXAMPLE F3

The procedures of Example F1 were repeated similarly except that a solution of 193.6 pats of 3-bromoethanephosphonic acid and 164.8 parts of a 25% aqueous solution of sodium hydroxide in 300 parts of distilled water was used instead of potassium chloroacetate. After drying, 274 parts of a superabsorbent polymer were obtained. The water absorption of the superabsorbent polymer was 410 times in the case of distilled water and 65 times in the case of the physiological saline. On the other hand, the biodegradability (%) was 90%, thereby exhibiting good biodegradability.

EXAMPLE F4

An aqueous solution of 2.39 parts of hexamethylenediamine in 10 parts of distilled water was added under a nitrogen gas stream to a solution of 100 parts of polysuccinimide having a weight average molecular weight of 96,000 in 400 parts of DMF. After the resulting mixture was stirred at room temperature for 30 minutes, the stirring was stopped and the contents were then allowed to react for 20 hours.

The reaction product was transferred into a mixer equipped with stirring blades having cutting edges, followed by the addition of 400 parts of distilled water and 400 parts of methanol. A gel so formed was finely cut at 8,000 rpm for 5 minutes, and 52.7 parts of dimethylaminopropylamine and 57.2 parts of β-alanine sodium salt were added dropwise over 2 hours. After the dropwise addition, the resultant mixture was stirred for 24 hours. To a slurry so obtained, 95.9 parts of methyl p-toluenesulfonate were added dropwise over 4 hours. Subsequent to stirring for 24 hours, the product was poured into 800 parts of methanol. After stirring for 1 hour, a precipitate was collected by suction filtration and was then dried at 60° C., whereby 284 parts of a superabsorbent polymer were obtained.

The water absorption of the superabsorbent polymer was 440 times in the case of distilled water and 66 times in the case of the physiological saline. On the other hand, the biodegradability (%) was 96%, thereby exhibiting good biodegradability.

EXAMPLE F5

An aqueous solution of 2.5 parts of hexamethylenediamine in 10 parts of distilled water was added under a nitrogen gas stream to a solution of 100 parts of polysuccinimide having a weight average molecular weight of 113,000 in 400 parts of DMF. After the resulting mixture was stirred at room temperature for 30 minutes, the stirring was stopped and the contents were then allowed to react for 20 hours.

The reaction product was transferred into a mixer equipped with stirring blades having cutting edges, followed by the addition of 400 parts of distilled water and 400 parts of methanol. A gel so formed was finely cut at 8,000 rpm for 5 minutes, and 52.7 parts of dimethylaminopropylamine were added dropwise over 2 hours. After the dropwise addition, the resultant mixture was stirred for 24 hours. To a slurry so obtained, 95.9 parts of methyl p-toluenesulfonate were added dropwise over 4 hours. Subsequent to stirring for 24 hours, 206 parts of a 20% aqueous solution of sodium hydroxide were added over 2 hours. After the dropwise addition, the resultant mixture was stirred for 24 hours. The product was poured into 800 parts of methanol. After stirring for 1 hour, a precipitate was collected by suction filtration and was then dried at 60° C., whereby 288 parts of a superabsorbent polymer were obtained.

The water absorption of the superabsorbent polymer was 350 times in the case of distilled water and 63 times in the case of the physiological saline. On the other hand, the biodegradability (%) was 100%, thereby exhibiting good biodegradability.

COMPARATIVE EXAMPLE 1

Using a cross-linked polyacrylic acid resin ("AQUALIC CAW", trade name; product of Nippon Shokubai Co., Ltd.), its water absorption was measured in the same manner as in the individual Examples. The water absorption was 350 times in the case of distilled water and 55 times in the case of the physiological saline. A biodegradability test was also conducted. The biodegradability (%) was found to be 2.8%. No biodegradability was therefore exhibited practically.

COMPARATIVE EXAMPLE 2

Commercially-available various disposable diapers ("MERRY'S", trade mark, product of Kao Corporation; "ULTRA MOONEY", trade mark, product of UNI-CHARM CORPORATION; and "elleair friend", trade mark, product of Daio Paper Corp.) were individually torn apart to obtain superabsorbent polymers. Using these polymers, their water absorptions were measured in the same manner as in the individual Examples. Their water absorptions were found to be 320 times, 400 times and 740 times in the case of distilled water and 59 times, 74 times and 75 times in the case of the physiological saline. Biodegradability tests were also conducted. Their biodegradabilities (%) were found to be 6%, 2.6% and 1.2%, respectively. No biodegradability was therefore exhibited practically.

COMPARATIVE EXAMPLE 3

Under a nitrogen gas stream, 6 parts of lysine methyl ester dihydrochloride were dissolved as a cross-linking agent in 200 parts of DMF, followed by the neutralization with 6 parts of triethylamine. To the resulting solution, a solution of 50 parts of polysuccinimide having a weight average molecular weight of 130,000 in 250 parts of DMF was added. After stirring the resultant mixture for 1 hour at room temperature, 12 parts of triethylamine were added dropwise, and the contents were allowed to react at room temperature for 40 hours. The reaction mixture was poured into ethanol and the resultant precipitate was dried, whereby 50 parts of a cross-linked polymer were obtained. Twenty-six parts of the thus-obtained polymer were suspended in 5,000 parts of distilled water. While controlling the suspension at pH 9–11 by dropwise addition of a 2N aqueous NaOH solution, hydrolysis of remaining imide rings was conducted. The resulting reaction suspension was poured into ethanol, and the resulting precipitate was collected by filtration and then dried, whereby 28 parts of a superabsorbent polymer was obtained.

Using this superabsorbent polymer, a biodegradability test was conducted in a similar manner as in the respective Examples. The biodegradability (%) was found to be 103%, whereby good biodegradability was exhibited. Its water absorption was also measured. It was however found to be as low as 160 times in the case of distilled water and 48 times in the case of the physiological saline.

COMPARATIVE EXAMPLE 4

One hundred parts of polysuccinimide were suspended in water of pH 10. The suspension was heated at 60° C. for 1 hour, followed by the neutralization with 10 N HCl. To the thus-obtained solution, 70 parts of L-aspartic acid were added, followed by the addition of 50 parts of lysine hydrochloride. Under a nitrogen gas stream, the contents were allowed to react at 220° C. for 12 hours. The resultant reaction mixture was suspended in distilled water, and the reaction product was collected by filtration. The reaction product was resuspended in distilled water and then collected by filtration. This operation was repeated twice further so that the reaction product was washed. Subsequent to lyophilization, 225 parts of a superabsorbent polymer were obtained.

Using this superabsorbent polymer, a biodegradability test was conducted in a similar manner as in Example 1. The biodegradability (%) was found to be 103%, whereby good biodegradability was exhibited. Its water absorption was also measured. It was however found to be as low as 158 times in the case of distilled water and 47 times in the case of the physiological saline.

What is claimed is:

1. A cross-linked polymer having, in a molecule thereof, recurring units represented by the following formula (1):

(1)

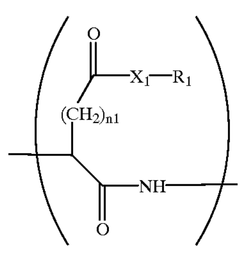

and/or

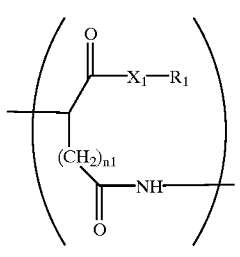

wherein $R_1$ is a pendant group having at least one functional group selected from the group consisting of acidic groups and salts thereof, a glycino group and salts thereof, cationic groups and betaine groups; $X_1$ is NH, $NR_1'$, $R_1'$ being an alkyl, aralkyl or aryl group, O or S; and $n_1$ is 1 or 2.

2. A cross-linked polymer according to claim 1, wherein $n_1$ in the formula (1) is 1.

3. A cross-linked polymer according to claim 1, wherein $X_1$ in the formula (1) is NH.

4. A cross-linked polymer according to claim 1, wherein $R_1$ in the formula (1) is a pendant group having at least one acidic group selected from the group consisting of carboxyl, sulfonic, thiocarboxylic, dithiocarboxylic, thiocarbonic, phosphoric, phosphonic, phosphinic, sulfuric, sulfurous, sulfinic, amidosulfuric, sulfamic and boric groups.

5. A cross-linked polymer according to claim 1, wherein $R_1$ in the formula (1) is a pendant group having at least one acidic group selected from the group consisting of carboxyl, sulfonic, phosphonic, sulfamic, thiocarboxylic, dithiocarboxylic and phosphoric groups.

6. A cross-linked polymer according to claim 1, wherein $R_1$ in the formula (1) is a pendant group having a glycino group, which is a tautomer represented by the following formula (2), or a salt thereof:

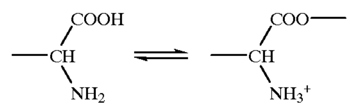

Glycino group (2)

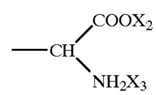

Salt of glycino group wherein $X_2$ is a hydrogen, alkali metal, ammonium, phosphonium or sulfonium; $X_3$ is hydrogen or a protonic acid; and $X_2$ or $X_3$ may be omitted.

7. A cross-linked polymer according to claim 1, wherein $R_1$ in the formula (1) is a pendant group having a quaternary ammonio group or a guanidyl group as a cationic group.

8. A cross-linked polymer according to claim 1, wherein $R_1$ in the formula (1) has a betaine group which contains a moiety represented by the following formula (3):

(3)

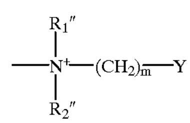

wherein Y is an anionic group, $R_1''$ and $R_2''$ are each independently an alkyl, aralkyl or aryl group, and m is an integer of from 1 to 10.

9. A cross-linked polymer according to claim 1, wherein $R_1$ in the formula (1) has a betaine group containing a quaternary ammonio group.

10. A cross-linked polymer according to claim 1, wherein $R_1$ in the formula (1) has a betaine group containing a group selected from carboxyl, sulfonic and phosphonic groups.

11. A cross-linked polymer according to claim 1, wherein the recurring units represented by the formula (1) account, in number, for 1 to 99.8% of entire recurring units which make up the molecule.

12. A cross-linked polymer according to claim 1, which is an acidic polyamino acid polymer with a backbone formed of recurring units, each of which is composed of a polyglutamic acid or polyaspartic acid, as basic skeletons.

* * * * *